(12) United States Patent
Makhdumi et al.

(10) Patent No.: US 10,586,227 B2
(45) Date of Patent: Mar. 10, 2020

(54) SNAP MOBILE PAYMENT APPARATUSES, METHODS AND SYSTEMS

(71) Applicant: VISA INTERNATIONAL SERVICE ASSOCIATION, San Francisco, CA (US)

(72) Inventors: Uzma Makhdumi, Foster City, CA (US); Ayman Hammad, Pleasanton, CA (US); Igor Karpenko, Sunnyvale, CA (US); Miroslav Gavrilov, Santa Clara, CA (US); Abhinav Shrivastava, Redmond, WA (US); Mark Carlson, Half Moon Bay, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 14/698,317

(22) Filed: Apr. 28, 2015

(65) Prior Publication Data
US 2015/0248664 A1 Sep. 3, 2015

Related U.S. Application Data

(63) Continuation-in-part of application No. 13/398,817, filed on Feb. 16, 2012.
(Continued)

(51) Int. Cl.
*G06Q 30/06* (2012.01)
*G06Q 20/32* (2012.01)
(Continued)

(52) U.S. Cl.
CPC ......... *G06Q 20/3274* (2013.01); *G06Q 20/20* (2013.01); *G06Q 20/204* (2013.01);
(Continued)

(58) Field of Classification Search
CPC .. G06Q 30/06; G06Q 30/0253; G06Q 20/102; G06Q 20/3278; G06Q 20/00; G07C 13/00
(Continued)

(56) References Cited

U.S. PATENT DOCUMENTS

| 789,106 A | 5/1905 | Seymour |
| 4,896,363 A | 1/1990 | Taylor |

(Continued)

FOREIGN PATENT DOCUMENTS

| CN | 1841425 A | 10/2006 |
| CN | 101025806 A | 8/2007 |

(Continued)

OTHER PUBLICATIONS

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.
(Continued)

*Primary Examiner* — Daniel S Felten
(74) *Attorney, Agent, or Firm* — Loeb & Loeb LLP

(57) ABSTRACT

The SNAP MOBILE PAYMENT APPARATUSES, METHODS AND SYSTEMS ("SNAP") transform real-time-generated merchant-product Quick Response codes via SNAP components into virtual wallet card-based transaction purchase notifications. Payment information and VAS data can also be provided based on location. A request for payment information can be received. A location can be determined, and a merchant associated with the location can also be determined. Payment information and/or VAS data can be selected based on the merchant and/or location, and can be provided for a payment transaction.

21 Claims, 56 Drawing Sheets

Related U.S. Application Data

(60) Provisional application No. 61/985,213, filed on Apr. 28, 2014, provisional application No. 61/443,624, filed on Feb. 16, 2011, provisional application No. 61/512,248, filed on Jul. 27, 2011, provisional application No. 61/522,213, filed on Aug. 10, 2011, provisional application No. 61/527,576, filed on Aug. 25, 2011.

(51) Int. Cl.
 *G06Q 20/20* (2012.01)
 *G06Q 20/36* (2012.01)

(52) U.S. Cl.
 CPC ..... *G06Q 20/3276* (2013.01); *G06Q 20/3674* (2013.01); *G06Q 30/06* (2013.01)

(58) Field of Classification Search
 USPC ........ 382/165; 707/3; 705/27.1, 14.51, 26.1; 235/375; 455/411
 See application file for complete search history.

(56) References Cited

U.S. PATENT DOCUMENTS

| | | |
|---|---|---|
| 5,177,342 A | 1/1993 | Adams |
| 5,221,838 A | 6/1993 | Gutman |
| 5,237,164 A | 8/1993 | Takada |
| 5,311,594 A | 5/1994 | Penzias |
| 5,383,113 A | 1/1995 | Kight |
| 5,384,449 A | 1/1995 | Peirce |
| 5,446,890 A | 8/1995 | Renslo |
| 5,459,656 A | 10/1995 | Fields |
| 5,500,513 A | 3/1996 | Langhans |
| 5,510,777 A | 4/1996 | Pilc |
| 5,521,362 A | 5/1996 | Powers |
| 5,526,409 A | 6/1996 | Conrow |
| 5,530,438 A | 6/1996 | Bickham |
| 5,536,045 A | 7/1996 | Adams |
| 5,590,038 A | 12/1996 | Pitroda |
| 5,613,012 A | 3/1997 | Hoffman |
| 5,615,110 A | 3/1997 | Wong |
| 5,615,264 A | 3/1997 | Kazmierczak |
| 5,621,201 A | 4/1997 | Langhans |
| 5,649,118 A | 7/1997 | Carlisle |
| 5,655,007 A | 8/1997 | McAllister |
| 5,748,737 A | 5/1998 | Daggar |
| 5,781,438 A | 7/1998 | Lee |
| 5,796,832 A | 8/1998 | Kawan |
| 5,815,657 A | 9/1998 | Williams |
| 5,850,446 A | 12/1998 | Berger |
| 5,878,337 A | 3/1999 | Joao |
| 5,883,810 A | 3/1999 | Franklin |
| 5,884,271 A | 3/1999 | Pitroda |
| 5,892,838 A | 4/1999 | Brady |
| 5,903,830 A | 5/1999 | Joao |
| 5,914,472 A | 6/1999 | Foladare |
| 5,943,624 A | 8/1999 | Fox |
| 5,953,710 A | 9/1999 | Fleming |
| 5,956,699 A | 9/1999 | Wong |
| 5,963,924 A | 10/1999 | Williams |
| 6,000,832 A | 12/1999 | Franklin |
| 6,006,200 A | 12/1999 | Boies |
| 6,014,635 A | 1/2000 | Harris |
| 6,044,360 A | 3/2000 | Picciallo |
| 6,052,675 A | 4/2000 | Checchio |
| 6,064,990 A | 5/2000 | Goldsmith |
| 6,092,053 A | 7/2000 | Boesch |
| 6,160,903 A | 12/2000 | Hamid |
| 6,163,771 A | 12/2000 | Walker |
| 6,182,894 B1 | 2/2001 | Hackett |
| 6,195,447 B1 | 2/2001 | Ross |
| 6,202,052 B1 | 3/2001 | Miller |
| 6,202,933 B1 | 3/2001 | Poore |
| 6,226,624 B1 | 5/2001 | Watson |
| 6,227,447 B1 | 5/2001 | Campisano |
| 6,236,981 B1 | 5/2001 | Hill |
| 6,263,447 B1 | 7/2001 | French |
| 6,267,292 B1 | 7/2001 | Walker |
| 6,327,578 B1 | 12/2001 | Linehan |
| 6,336,099 B1 | 1/2002 | Barnett |
| 6,339,766 B1 | 1/2002 | Gephart |
| 6,341,724 B2 | 1/2002 | Campisano |
| 6,381,584 B1 | 4/2002 | Ogram |
| 6,385,596 B1 | 5/2002 | Wiser |
| 6,385,655 B1 | 5/2002 | Smith |
| 6,422,462 B1 | 7/2002 | Cohen |
| 6,425,523 B1 | 7/2002 | Shem-Ur |
| 6,456,984 B1 | 9/2002 | Demoff |
| 6,473,500 B1 | 10/2002 | Risafi |
| 6,529,725 B1 | 3/2003 | Joao |
| 6,535,855 B1 | 3/2003 | Cahill |
| 6,560,581 B1 | 5/2003 | Fox |
| 6,592,044 B1 | 7/2003 | Wong |
| 6,601,761 B1 | 8/2003 | Katis |
| 6,636,833 B1 | 10/2003 | Flitcroft |
| 6,735,572 B2 | 5/2004 | Landesmann |
| 6,748,367 B1 | 6/2004 | Lee |
| 6,805,287 B2 | 10/2004 | Bishop |
| 6,853,982 B2 | 2/2005 | Smith |
| 6,857,073 B2 | 2/2005 | French |
| 6,865,522 B1 | 3/2005 | Gastiger |
| 6,873,974 B1 | 3/2005 | Schutzer |
| 6,879,965 B2 | 4/2005 | Fung |
| 6,891,953 B1 | 5/2005 | DeMello |
| 6,898,598 B2 | 5/2005 | Himmel |
| 6,901,387 B2 | 5/2005 | Wells |
| 6,925,439 B1 | 8/2005 | Pitroda |
| 6,931,382 B2 | 8/2005 | Laage |
| 6,934,528 B2 | 8/2005 | Loureiro |
| 6,938,019 B1 | 8/2005 | Uzo |
| 6,941,285 B2 | 9/2005 | Sarcanin |
| 6,944,595 B1 | 9/2005 | Graser |
| 6,980,670 B1 | 12/2005 | Hoffman |
| 6,990,470 B2 | 1/2006 | Hogan |
| 6,991,157 B2 | 1/2006 | Bishop |
| 6,999,943 B1 | 2/2006 | Johnson |
| 7,024,383 B1 | 4/2006 | Mancini |
| 7,028,052 B2 | 4/2006 | Chapman |
| 7,047,041 B2 | 5/2006 | Vanska |
| 7,051,002 B2 | 5/2006 | Keresman, III |
| 7,051,929 B2 | 5/2006 | Li |
| 7,069,249 B2 | 6/2006 | Stolfo |
| 7,089,208 B1 | 8/2006 | Levchin |
| 7,096,003 B2 | 8/2006 | Joao |
| 7,103,576 B2 | 9/2006 | Mann |
| 7,111,789 B2 | 9/2006 | Rajasekaran |
| 7,113,930 B2 | 9/2006 | Eccles |
| 7,117,172 B1 | 10/2006 | Black |
| 7,136,835 B1 | 11/2006 | Flitcroft |
| 7,155,411 B1 | 12/2006 | Blinn |
| 7,167,903 B2 | 1/2007 | Percival |
| 7,177,835 B1 | 2/2007 | Walker |
| 7,177,848 B2 | 2/2007 | Hogan |
| 7,180,457 B2 | 2/2007 | Trott |
| 7,194,437 B1 | 3/2007 | Britto |
| 7,206,847 B1 | 4/2007 | Alberth |
| 7,209,561 B1 | 4/2007 | Shankar |
| 7,212,979 B1 | 5/2007 | Matz |
| 7,228,011 B1 | 6/2007 | Queeno |
| RE39,736 E | 7/2007 | Morrill |
| 7,264,154 B2 | 9/2007 | Harris |
| 7,266,557 B2 | 9/2007 | Aschen |
| 7,268,667 B2 | 9/2007 | Beenau |
| 7,268,668 B2 | 9/2007 | Beenau |
| 7,287,692 B1 | 10/2007 | Patel |
| 7,290,704 B1 | 11/2007 | Ball |
| 7,292,999 B2 | 11/2007 | Hobson |
| 7,313,546 B2 | 12/2007 | Alarcon-Luther |
| 7,318,049 B2 | 1/2008 | Iannacci |
| 7,337,119 B1 | 2/2008 | Geschwender |
| 7,337,144 B1 | 2/2008 | Blinn |
| 7,343,149 B2 | 3/2008 | Benco |
| 7,343,351 B1 | 3/2008 | Bishop |

(56) References Cited

U.S. PATENT DOCUMENTS

| | | | |
|---|---|---|---|
| 7,349,885 B2 | 3/2008 | Gangi |
| 7,350,230 B2 | 3/2008 | Forrest |
| 7,353,382 B2 | 4/2008 | Labrou |
| 7,356,505 B2 | 4/2008 | March |
| 7,357,310 B2 | 4/2008 | Calabrese |
| 7,359,880 B2 | 4/2008 | Abel |
| 7,373,669 B2 | 5/2008 | Eisen |
| 7,379,899 B1 | 5/2008 | Junger |
| 7,379,919 B2 | 5/2008 | Hogan |
| 7,392,222 B1 | 6/2008 | Hamilton |
| RE40,444 E | 7/2008 | Linehan |
| 7,395,242 B2 | 7/2008 | Blinn |
| 7,398,250 B2 | 7/2008 | Blinn |
| 7,413,113 B1 | 8/2008 | Zhu |
| 7,415,443 B2 | 8/2008 | Hobson |
| 7,415,469 B2 | 8/2008 | Singh |
| 7,427,021 B2 | 9/2008 | Kemper |
| 7,444,676 B1 | 10/2008 | Asghari-Kamrani |
| 7,450,966 B2 | 11/2008 | Vanska |
| 7,469,151 B2 | 12/2008 | Khan |
| 7,477,780 B2 | 1/2009 | Boncyk |
| 7,499,889 B2 | 3/2009 | Golan |
| 7,500,607 B2 | 3/2009 | Williams |
| 7,505,935 B2 | 3/2009 | Mendiola |
| 7,533,064 B1 | 5/2009 | Boesch |
| 7,536,318 B1 | 5/2009 | Wolfe |
| 7,536,335 B1 | 5/2009 | Weston |
| 7,536,360 B2 | 5/2009 | Stolfo |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,140 B2 | 8/2009 | Weichert |
| 7,571,142 B1 | 8/2009 | Flitcroft |
| 7,580,898 B2 | 8/2009 | Brown |
| 7,584,153 B2 | 9/2009 | Brown |
| 7,593,858 B2 | 9/2009 | Matz |
| 7,593,896 B1 | 9/2009 | Flitcroft |
| 7,603,311 B1 | 10/2009 | Yadav-Ranjan |
| 7,606,560 B2 | 10/2009 | Labrou |
| 7,627,531 B2 | 12/2009 | Breck |
| 7,627,895 B2 | 12/2009 | Gifford |
| 7,630,937 B1 | 12/2009 | Mo |
| 7,634,295 B2 | 12/2009 | Hayaashi |
| 7,644,037 B1 | 1/2010 | Ostrovsky |
| 7,644,859 B1 | 1/2010 | Zhu |
| 7,650,314 B1 | 1/2010 | Saunders |
| 7,660,749 B2 | 2/2010 | Koski |
| 7,664,733 B2 | 2/2010 | Erol |
| 7,668,754 B1 | 2/2010 | Bridgelall |
| 7,669,760 B1 * | 3/2010 | Zettner ............... G06Q 20/102 235/375 |
| 7,676,434 B2 | 3/2010 | Evans |
| 7,685,037 B2 | 3/2010 | Reiners |
| 7,685,067 B1 | 3/2010 | Britto |
| 7,698,221 B2 | 4/2010 | Blinn |
| 7,702,578 B2 | 4/2010 | Fung |
| 7,707,113 B1 | 4/2010 | Dimartino |
| 7,707,120 B2 | 4/2010 | Dominguez |
| 7,708,194 B2 | 5/2010 | Vawter |
| 7,708,198 B2 | 5/2010 | Gangi |
| 7,712,655 B2 | 5/2010 | Wong |
| 7,712,658 B2 | 5/2010 | Gangi |
| 7,720,436 B2 | 5/2010 | Hamynen |
| 7,734,527 B2 | 6/2010 | Uzo |
| 7,739,194 B2 | 6/2010 | Blinn |
| 7,742,984 B2 | 6/2010 | Mohsenzadeh |
| 7,753,265 B2 | 7/2010 | Harris |
| 7,770,789 B2 | 8/2010 | Oder |
| 7,774,076 B2 | 8/2010 | Skowronek |
| 7,783,569 B2 | 8/2010 | Abel |
| 7,784,684 B2 | 8/2010 | Labrou |
| 7,784,685 B1 | 8/2010 | Hopkins |
| 7,793,851 B2 | 9/2010 | Mullen |
| 7,797,215 B1 | 9/2010 | Zerenner |
| 7,801,826 B2 | 9/2010 | Labrou |
| 7,801,829 B2 | 9/2010 | Gray |
| 7,802,719 B2 | 9/2010 | Johnson |
| 7,805,376 B2 | 9/2010 | Smith |
| 7,805,378 B2 | 9/2010 | Berardi |
| 7,810,720 B2 | 10/2010 | Lovett |
| 7,818,264 B2 | 10/2010 | Hammad |
| 7,819,307 B2 | 10/2010 | Lyons |
| 7,827,288 B2 | 11/2010 | Da |
| 7,828,206 B2 | 11/2010 | Hessburg |
| 7,828,220 B2 | 11/2010 | Mullen |
| 7,828,992 B2 | 11/2010 | Kilickiran |
| 7,835,960 B2 | 11/2010 | Breck |
| 7,837,125 B2 | 11/2010 | Biskupski |
| 7,841,523 B2 | 11/2010 | Oder |
| 7,841,539 B2 | 11/2010 | Hewton |
| 7,844,530 B2 | 11/2010 | Ziade |
| 7,844,550 B2 | 11/2010 | Walker |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,870,027 B1 | 1/2011 | Tannenbaum |
| 7,873,579 B2 | 1/2011 | Hobson |
| 7,873,580 B2 | 1/2011 | Hobson |
| 7,877,299 B2 | 1/2011 | Bui |
| 7,878,400 B2 | 2/2011 | Harris |
| 7,890,370 B2 | 2/2011 | Whitsitt |
| 7,890,393 B2 | 2/2011 | Talbert |
| 7,891,563 B2 | 2/2011 | Oder |
| 7,895,119 B2 | 2/2011 | Praisner |
| 7,896,238 B2 | 3/2011 | Fein |
| 7,899,744 B2 | 3/2011 | Bishop |
| 7,904,360 B2 | 3/2011 | Evans |
| 7,908,216 B1 | 3/2011 | Davis |
| 7,908,227 B2 | 3/2011 | Zizzimopoulos |
| 7,922,082 B2 | 4/2011 | Muscato |
| 7,926,714 B1 | 4/2011 | Zhu |
| 7,931,195 B2 | 4/2011 | Mullen |
| 7,933,779 B2 | 4/2011 | Rooks |
| 7,937,324 B2 | 5/2011 | Patterson |
| 7,938,318 B2 | 5/2011 | Fein |
| 7,942,337 B2 | 5/2011 | Jain |
| 7,954,705 B2 | 6/2011 | Mullen |
| 7,959,076 B1 | 6/2011 | Hopkins |
| 7,962,418 B1 | 6/2011 | Wei |
| 7,967,196 B1 | 6/2011 | Bierbaum |
| 7,971,782 B1 | 7/2011 | Shams |
| 7,996,259 B1 | 8/2011 | Distefano, III |
| 7,996,288 B1 | 8/2011 | Stolfo |
| 8,016,192 B2 | 9/2011 | Messerges |
| 8,020,763 B1 | 9/2011 | Kowalchyk |
| 8,024,260 B1 | 9/2011 | Hogl |
| 8,025,223 B2 | 9/2011 | Saunders |
| 8,028,041 B2 | 9/2011 | Olliphant |
| 8,032,438 B1 | 10/2011 | Barton |
| 8,041,338 B2 | 10/2011 | Chen |
| 8,046,256 B2 | 10/2011 | Chien |
| 8,050,997 B1 | 11/2011 | Nosek |
| 8,060,413 B2 | 11/2011 | Castell |
| 8,060,448 B2 | 11/2011 | Jones |
| 8,060,449 B1 | 11/2011 | Zhu |
| 8,073,565 B2 | 12/2011 | Johnson |
| 8,074,876 B2 | 12/2011 | Foss |
| 8,074,877 B2 | 12/2011 | Mullen |
| 8,074,879 B2 | 12/2011 | Harris |
| 8,082,210 B2 | 12/2011 | Hansen |
| 8,090,351 B2 * | 1/2012 | Klein ................... G07C 13/00 455/411 |
| 8,095,113 B2 | 1/2012 | Kean |
| 8,104,679 B2 | 1/2012 | Brown |
| 8,108,261 B2 | 1/2012 | Carlier |
| RE43,157 E | 2/2012 | Bishop |
| 8,109,436 B1 | 2/2012 | Hopkins |
| 8,117,127 B1 | 2/2012 | Sanders |
| 8,121,942 B2 | 2/2012 | Carlson |
| 8,121,956 B2 | 2/2012 | Carlson |

(56) References Cited

U.S. PATENT DOCUMENTS

| | | |
|---|---|---|
| 8,126,449 B2 | 2/2012 | Beenau |
| 8,127,982 B1 | 3/2012 | Casey |
| 8,131,666 B2 | 3/2012 | OBrien |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,171,525 B1 | 5/2012 | Pelly |
| 8,175,235 B2 | 5/2012 | Mumford |
| 8,175,965 B2 | 5/2012 | Moore |
| 8,175,967 B2 | 5/2012 | OLeary |
| 8,175,968 B2 | 5/2012 | OLeary |
| 8,175,973 B2 | 5/2012 | Davis |
| 8,175,975 B2 | 5/2012 | Cai |
| 8,175,979 B2 | 5/2012 | Baentsch |
| 8,176,416 B1 | 5/2012 | Williams |
| 8,179,563 B2 | 5/2012 | King |
| 8,180,289 B1 | 5/2012 | Glickman |
| 8,180,705 B2 | 5/2012 | Kowalchyk |
| 8,180,804 B1 | 5/2012 | Narayanan |
| 8,190,513 B2 | 5/2012 | Felger |
| 8,190,523 B2 | 5/2012 | Patterson |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,196,813 B2 | 6/2012 | Vadhri |
| 8,200,582 B1 | 6/2012 | Zhu |
| 8,200,868 B1 * | 6/2012 | 't Hooft ............. H04M 1/7253 710/72 |
| 8,204,774 B2 | 6/2012 | Chwast |
| 8,204,829 B2 | 6/2012 | Alvarez |
| 8,205,791 B2 | 6/2012 | Randazza |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,489 B2 | 7/2012 | Patterson |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,385 B2 | 7/2012 | Chow |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,852 B2 | 7/2012 | Carlson |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,245,139 B2 | 8/2012 | Michelman |
| 8,249,925 B2 | 8/2012 | Broms |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,265,993 B2 | 9/2012 | Chien |
| 8,275,704 B2 | 9/2012 | Bishop |
| 8,280,777 B2 | 10/2012 | Mengerink |
| 8,281,991 B2 | 10/2012 | Wentker |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,321,364 B1 | 11/2012 | Gharpure |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,328,095 B2 | 12/2012 | Oder |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,336,088 B2 | 12/2012 | Raj |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |
| 8,346,666 B2 | 1/2013 | Lindelsee |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,376,225 B1 | 2/2013 | Hopkins |
| 8,380,177 B2 | 2/2013 | Laracey |
| 8,380,349 B1 | 2/2013 | Hickman |
| 8,386,078 B1 | 2/2013 | Hickman |

(56) References Cited

U.S. PATENT DOCUMENTS

| | | |
|---|---|---|
| 8,387,873 B2 | 3/2013 | Saunders |
| 8,396,750 B1 | 3/2013 | Hariharan |
| 8,396,810 B1 | 3/2013 | Cook |
| 8,401,539 B2 | 3/2013 | Beenau |
| 8,401,898 B2 | 3/2013 | Chien |
| 8,401,904 B1 | 3/2013 | Simakov |
| 8,402,555 B2 | 3/2013 | Grecia |
| 8,403,211 B2 | 3/2013 | Brooks |
| 8,412,586 B1 | 4/2013 | Foulser |
| 8,412,623 B2 | 4/2013 | Moon |
| 8,412,630 B2 | 4/2013 | Ross |
| 8,412,837 B1 | 4/2013 | Emigh |
| 8,417,633 B1 | 4/2013 | Chmara |
| 8,417,642 B2 | 4/2013 | Oren |
| 8,423,462 B1 | 4/2013 | Amacker |
| 8,429,521 B2 | 4/2013 | Lloyd |
| 8,437,633 B2 | 4/2013 | Chmara |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand |
| 8,504,478 B2 | 8/2013 | Saunders |
| 8,510,816 B2 | 8/2013 | Quach |
| 8,433,116 B2 | 9/2013 | Davis |
| 8,527,360 B2 * | 9/2013 | Groat ............... G06Q 20/20 705/14.23 |
| 8,533,860 B1 | 9/2013 | Grecia |
| 8,538,845 B2 | 9/2013 | Liberty |
| 8,555,079 B2 | 10/2013 | Shablygin |
| 8,560,004 B1 * | 10/2013 | Tsvetkov ............ H04M 1/67 310/328 |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,612,325 B2 * | 12/2013 | Stacy ............... G06Q 10/00 705/35 |
| 8,615,468 B2 | 12/2013 | Varadarajan |
| 8,620,754 B2 | 12/2013 | Fisher |
| 8,627,420 B2 * | 1/2014 | Furlan ............ H04L 12/2809 726/5 |
| 8,635,157 B2 | 1/2014 | Smith |
| 8,639,621 B1 | 1/2014 | Ellis |
| 8,646,059 B1 | 2/2014 | von Behren |
| 8,651,374 B2 | 2/2014 | Brabson |
| 8,656,180 B2 | 2/2014 | Shablygin |
| 8,661,495 B2 | 2/2014 | Reisman |
| 8,739,016 B1 | 5/2014 | Goldman |
| 8,751,391 B2 | 6/2014 | Freund |
| 8,762,263 B2 | 6/2014 | Gauthier |
| 8,793,186 B2 | 7/2014 | Patterson |
| 8,838,982 B2 | 9/2014 | Carlson |
| 8,856,539 B2 | 10/2014 | Weiss |
| 8,887,308 B2 | 11/2014 | Grecia |
| 8,893,009 B2 | 11/2014 | Raleigh |
| 9,065,643 B2 | 6/2015 | Hurry |
| 9,070,129 B2 | 6/2015 | Sheets |
| 9,082,119 B2 * | 7/2015 | Ortiz ............... G06Q 20/3278 |
| 9,100,826 B2 | 8/2015 | Weiss |
| 9,105,050 B2 | 8/2015 | Tietzen |
| 9,160,741 B2 | 10/2015 | Wentker |
| 9,195,750 B2 | 11/2015 | Hayden |
| 9,229,964 B2 | 1/2016 | Stevelinck |
| 9,245,267 B2 | 1/2016 | Singh |
| 9,249,241 B2 | 2/2016 | Dai |
| 9,256,871 B2 | 2/2016 | Anderson |
| 9,280,765 B2 | 3/2016 | Hammad |
| 9,307,342 B2 | 4/2016 | Sojoodi |
| 9,355,393 B2 | 5/2016 | Purves |
| 9,448,972 B2 | 9/2016 | Greenberg |
| 9,524,089 B1 | 12/2016 | Ghosh |
| 9,530,137 B2 | 12/2016 | Weiss |
| 9,582,598 B2 | 2/2017 | Kalgi |
| 9,626,351 B2 | 4/2017 | Davis |
| 9,710,807 B2 | 7/2017 | Theurer |
| 9,772,987 B2 | 9/2017 | Davis |
| 9,804,834 B1 | 10/2017 | Lopyrev |
| 9,904,537 B2 | 2/2018 | Lopyrev |
| 2001/0037297 A1 | 3/2001 | McNair |
| 2001/0029485 A1 | 10/2001 | Brody |
| 2001/0034720 A1 | 10/2001 | Armes |
| 2001/0054003 A1 | 12/2001 | Chien |
| 2001/0056359 A1 | 12/2001 | Abreu |
| 2001/0056409 A1 | 12/2001 | Bellovin |
| 2002/0002522 A1 | 1/2002 | Clift |
| 2002/0004783 A1 | 1/2002 | Paltenghe |
| 2002/0007320 A1 | 1/2002 | Hogan |
| 2002/0016749 A1 | 2/2002 | Borecki |
| 2002/0026575 A1 | 2/2002 | Wheeler |
| 2002/0029193 A1 | 3/2002 | Ranjan |
| 2002/0035548 A1 | 3/2002 | Hogan |
| 2002/0040325 A1 | 4/2002 | Takae |
| 2002/0052778 A1 | 5/2002 | Murphy |
| 2002/0069122 A1 | 6/2002 | Yun |
| 2002/0073045 A1 | 6/2002 | Rubin |
| 2002/0077976 A1 | 6/2002 | Meyer |
| 2002/0077978 A1 | 6/2002 | OLeary |
| 2002/0087894 A1 | 7/2002 | Foley |
| 2002/0099642 A1 | 7/2002 | Schwankl |
| 2002/0099647 A1 | 7/2002 | Howorka |
| 2002/0099656 A1 | 7/2002 | Poh Wong |
| 2002/0107755 A1 | 8/2002 | Steed |
| 2002/0111919 A1 | 8/2002 | Weller |
| 2002/0112014 A1 | 8/2002 | Bennett |
| 2002/0116271 A1 | 8/2002 | Mankoff |
| 2002/0116341 A1 | 8/2002 | Hogan |
| 2002/0120864 A1 | 8/2002 | Wu |
| 2002/0133467 A1 | 9/2002 | Hobson |
| 2002/0138290 A1 | 9/2002 | Metcalfe |
| 2002/0138445 A1 | 9/2002 | Laage |
| 2002/0141575 A1 | 10/2002 | Hird |
| 2002/0143614 A1 | 10/2002 | MacLean |
| 2002/0147913 A1 | 10/2002 | Lun Yip |
| 2002/0174030 A1 | 11/2002 | Praisner |
| 2002/0178370 A1 | 11/2002 | Gurevich |
| 2002/0194081 A1 | 12/2002 | Perkowski |
| 2003/0014307 A1 | 1/2003 | Heng |
| 2003/0018524 A1 | 1/2003 | Fishman |
| 2003/0026404 A1 | 2/2003 | Joyce |
| 2003/0028451 A1 | 2/2003 | Ananian |
| 2003/0028481 A1 | 2/2003 | Flitcroft |
| 2003/0055785 A1 | 3/2003 | Lahiri |
| 2003/0080185 A1 | 5/2003 | Werther |
| 2003/0097318 A1 | 5/2003 | Yu |
| 2003/0101134 A1 | 5/2003 | Liu |
| 2003/0126076 A1 | 7/2003 | Kwok |
| 2003/0130955 A1 | 7/2003 | Hawthorne |
| 2003/0144935 A1 | 7/2003 | Sobek |
| 2003/0174823 A1 | 9/2003 | Justice |
| 2003/0177361 A1 | 9/2003 | Wheeler |
| 2003/0179230 A1 | 9/2003 | Seidman |
| 2003/0191709 A1 | 10/2003 | Elston |
| 2003/0191711 A1 | 10/2003 | Jamison |
| 2003/0191945 A1 | 10/2003 | Keech |
| 2003/0195659 A1 | 10/2003 | Kasuga |

(56) References Cited

U.S. PATENT DOCUMENTS

| | | |
|---|---|---|
| 2003/0200142 A1 | 10/2003 | Hicks |
| 2003/0200184 A1 | 10/2003 | Dominguez |
| 2003/0212589 A1 | 11/2003 | Kish |
| 2003/0212642 A1 | 11/2003 | Weller |
| 2003/0216996 A1 | 11/2003 | Cummings |
| 2003/0220835 A1 | 11/2003 | Barnes |
| 2004/0010462 A1 | 1/2004 | Moon |
| 2004/0050928 A1 | 3/2004 | Bishop |
| 2004/0059682 A1 | 3/2004 | Hasumi |
| 2004/0068443 A1 | 4/2004 | Hopson |
| 2004/0078332 A1 | 4/2004 | Ferguson |
| 2004/0093281 A1 | 5/2004 | Silverstein |
| 2004/0103037 A1 | 5/2004 | Wetmore |
| 2004/0111698 A1 | 6/2004 | Soong |
| 2004/0128197 A1 | 7/2004 | Bam |
| 2004/0138999 A1 | 7/2004 | Friedman |
| 2004/0139008 A1 | 7/2004 | Mascavage |
| 2004/0143532 A1 | 7/2004 | Lee |
| 2004/0148255 A1 | 7/2004 | Beck |
| 2004/0158532 A1 | 8/2004 | Breck |
| 2004/0204128 A1 | 10/2004 | Zakharia |
| 2004/0210449 A1 | 10/2004 | Breck |
| 2004/0210498 A1 | 10/2004 | Freund |
| 2004/0215560 A1 | 10/2004 | Amalraj |
| 2004/0215963 A1 | 10/2004 | Kaplan |
| 2004/0230536 A1 | 11/2004 | Fung |
| 2004/0232225 A1 | 11/2004 | Bishop |
| 2004/0236646 A1 | 11/2004 | Wu |
| 2004/0254891 A1 | 12/2004 | Blinn |
| 2004/0260646 A1 | 12/2004 | Berardi |
| 2004/0267608 A1 | 12/2004 | Mansfield |
| 2004/0267655 A1 | 12/2004 | Davidowitz |
| 2004/0267878 A1 | 12/2004 | Osias |
| 2005/0010483 A1 | 1/2005 | Ling |
| 2005/0037735 A1 | 2/2005 | Courts |
| 2005/0038724 A1 | 2/2005 | Roever |
| 2005/0065819 A1 | 3/2005 | Pamela |
| 2005/0080730 A1 | 4/2005 | Sorrentino |
| 2005/0080747 A1 | 4/2005 | Anderson |
| 2005/0080821 A1 | 4/2005 | Breil |
| 2005/0097320 A1 | 5/2005 | Golan |
| 2005/0101309 A1 | 5/2005 | Croome |
| 2005/0102188 A1 | 5/2005 | Hutchison |
| 2005/0108178 A1 | 5/2005 | York |
| 2005/0114784 A1 | 5/2005 | Spring |
| 2005/0137969 A1 | 6/2005 | Shah |
| 2005/0144082 A1 | 6/2005 | Coolman |
| 2005/0171894 A1 | 8/2005 | Traynor |
| 2005/0171898 A1 | 8/2005 | Bishop |
| 2005/0184145 A1 | 8/2005 | Law |
| 2005/0187873 A1 | 8/2005 | Labrou |
| 2005/0192893 A1 | 9/2005 | Keeling |
| 2005/0192895 A1 | 9/2005 | Rogers |
| 2005/0199709 A1 | 9/2005 | Linlor |
| 2005/0220326 A1 | 10/2005 | Sim |
| 2005/0234817 A1 | 10/2005 | VanFleet |
| 2005/0246278 A1 | 11/2005 | Gerber |
| 2005/0246293 A1 | 11/2005 | Ong |
| 2005/0251446 A1 | 11/2005 | Jiang |
| 2005/0254714 A1 | 11/2005 | Anne |
| 2005/0256802 A1 | 11/2005 | Ammermann |
| 2005/0261967 A1 | 11/2005 | Barry |
| 2005/0269401 A1 | 12/2005 | Spitzer |
| 2005/0269402 A1 | 12/2005 | Spitzer |
| 2005/0273462 A1 | 12/2005 | Reed |
| 2006/0002607 A1 * | 1/2006 | Boncyk et al. ............... 382/165 |
| 2006/0020542 A1 | 1/2006 | Litle |
| 2006/0053056 A1 | 3/2006 | Alspach-Goss |
| 2006/0059277 A1 | 3/2006 | Zito |
| 2006/0069619 A1 | 3/2006 | Walker |
| 2006/0075235 A1 | 4/2006 | Renkis |
| 2006/0085328 A1 | 4/2006 | Cohen |
| 2006/0085477 A1 | 4/2006 | Phillips |
| 2006/0124729 A1 | 6/2006 | Martin |
| 2006/0129427 A1 | 6/2006 | Wennberg |
| 2006/0163349 A1 | 7/2006 | Neugebauer |
| 2006/0178918 A1 | 8/2006 | Mikurak |
| 2006/0178986 A1 | 8/2006 | Giordano |
| 2006/0178994 A1 | 8/2006 | Stolfo |
| 2006/0190347 A1 | 8/2006 | Cuervo |
| 2006/0195598 A1 | 8/2006 | Fujita |
| 2006/0208060 A1 | 9/2006 | Mendelovich |
| 2006/0212434 A1 | 9/2006 | Crawford |
| 2006/0226216 A1 | 10/2006 | Keithley |
| 2006/0235795 A1 | 10/2006 | Johnson |
| 2006/0237528 A1 | 10/2006 | Bishop |
| 2006/0247982 A1 | 11/2006 | Stolfo |
| 2006/0277143 A1 | 12/2006 | Almonte |
| 2006/0278704 A1 | 12/2006 | Saunders |
| 2006/0282332 A1 * | 12/2006 | Pfleging et al. ............... 705/24 |
| 2006/0293947 A1 | 12/2006 | Nicholson |
| 2007/0011025 A1 | 1/2007 | Cracchiolo |
| 2007/0016523 A1 | 1/2007 | Blair |
| 2007/0022007 A1 | 1/2007 | Lawe |
| 2007/0038515 A1 | 2/2007 | Postrel |
| 2007/0038516 A1 | 2/2007 | Apple |
| 2007/0055571 A1 | 3/2007 | Fox |
| 2007/0067215 A1 | 3/2007 | Agarwal |
| 2007/0087820 A1 | 4/2007 | Van |
| 2007/0094066 A1 | 4/2007 | Kumar |
| 2007/0100691 A1 | 5/2007 | Patterson |
| 2007/0100728 A1 | 5/2007 | Rotman |
| 2007/0106504 A1 | 5/2007 | Deng |
| 2007/0106607 A1 | 5/2007 | Seib |
| 2007/0106627 A1 | 5/2007 | Srivastava |
| 2007/0107044 A1 | 5/2007 | Yuen |
| 2007/0113289 A1 | 5/2007 | Blumenau |
| 2007/0125840 A1 | 6/2007 | Law |
| 2007/0129955 A1 | 6/2007 | Dalmia |
| 2007/0136193 A1 | 6/2007 | Starr |
| 2007/0136211 A1 | 6/2007 | Brown |
| 2007/0143204 A1 | 6/2007 | Claus |
| 2007/0150413 A1 | 6/2007 | Morgenstern |
| 2007/0156726 A1 | 7/2007 | Levy |
| 2007/0170247 A1 | 7/2007 | Friedman |
| 2007/0179885 A1 | 8/2007 | Bird |
| 2007/0180119 A1 | 8/2007 | Khivesara |
| 2007/0198435 A1 | 8/2007 | Siegal |
| 2007/0198587 A1 | 8/2007 | Kobayasfii |
| 2007/0208662 A1 | 9/2007 | Jeronimus |
| 2007/0208671 A1 | 9/2007 | Brown |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0233615 A1 | 10/2007 | Tumminaro |
| 2007/0239502 A1 | 10/2007 | Babu |
| 2007/0245414 A1 | 10/2007 | Chan |
| 2007/0276765 A1 | 11/2007 | Hazel |
| 2007/0288377 A1 | 12/2007 | Shaked |
| 2007/0291995 A1 | 12/2007 | Rivera |
| 2008/0004116 A1 | 1/2008 | Van |
| 2008/0004952 A1 | 1/2008 | Koli |
| 2008/0010096 A1 | 1/2008 | Patterson |
| 2008/0013335 A1 | 1/2008 | Tsutsumi |
| 2008/0015988 A1 | 1/2008 | Brown |
| 2008/0021829 A1 | 1/2008 | Kranzley |
| 2008/0027218 A1 | 1/2008 | Daugs |
| 2008/0027850 A1 | 1/2008 | Brittan |
| 2008/0029607 A1 | 2/2008 | Mullen |
| 2008/0035738 A1 | 2/2008 | Mullen |
| 2008/0048022 A1 | 2/2008 | Vawter |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0059370 A1 | 3/2008 | Sada |
| 2008/0065554 A1 | 3/2008 | Hogan |
| 2008/0065555 A1 | 3/2008 | Mullen |
| 2008/0077489 A1 | 3/2008 | Gilley |
| 2008/0086365 A1 | 4/2008 | Zollino |
| 2008/0090513 A1 | 4/2008 | Collins |
| 2008/0091553 A1 | 4/2008 | Koski |
| 2008/0091616 A1 | 4/2008 | Helwin |

(56) References Cited

U.S. PATENT DOCUMENTS

| | | |
|---|---|---|
| 2008/0097856 A1 | 4/2008 | Blagg |
| 2008/0103795 A1 | 5/2008 | Jakubowski |
| 2008/0114639 A1 | 5/2008 | Meek |
| 2008/0114737 A1 | 5/2008 | Neely |
| 2008/0126145 A1 | 5/2008 | Racklet, III |
| 2008/0133351 A1 | 6/2008 | White |
| 2008/0140568 A1 | 6/2008 | Henry |
| 2008/0140684 A1 | 6/2008 | OReilly |
| 2008/0147883 A1 | 6/2008 | Philyaw |
| 2008/0154623 A1 | 6/2008 | Derker |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0201232 A1 | 8/2008 | Walker |
| 2008/0201264 A1 | 8/2008 | Brown |
| 2008/0201265 A1 | 8/2008 | Hewton |
| 2008/0221945 A1 | 9/2008 | Pace |
| 2008/0223918 A1 | 9/2008 | Williams |
| 2008/0228646 A1 | 9/2008 | Myers |
| 2008/0229217 A1 | 9/2008 | Kembel |
| 2008/0235261 A1 | 9/2008 | Malek |
| 2008/0024561 A1 | 10/2008 | Fein |
| 2008/0243305 A1 | 10/2008 | Lee |
| 2008/0243702 A1 | 10/2008 | Hart |
| 2008/0245855 A1 | 10/2008 | Fein |
| 2008/0245861 A1 | 10/2008 | Fein |
| 2008/0270300 A1 | 10/2008 | Jones |
| 2008/0272188 A1 | 11/2008 | Keithley |
| 2008/0283591 A1 | 11/2008 | Oder |
| 2008/0288376 A1 | 11/2008 | Panthaki |
| 2008/0288889 A1 | 11/2008 | Hunt |
| 2008/0300980 A1 | 12/2008 | Benjamin |
| 2008/0301055 A1 | 12/2008 | Borgs |
| 2008/0302869 A1 | 12/2008 | Mullen |
| 2008/0302876 A1 | 12/2008 | Mullen |
| 2008/0313264 A1 | 12/2008 | Pestoni |
| 2008/0319905 A1 | 12/2008 | Carlson |
| 2009/0006181 A1 | 1/2009 | Ghosh |
| 2009/0006262 A1 | 1/2009 | Brown |
| 2009/0010488 A1 | 1/2009 | Matsuoka |
| 2009/0013266 A1 | 1/2009 | Gandhi |
| 2009/0018895 A1 | 1/2009 | Weinblatt |
| 2009/0024527 A1 | 1/2009 | Sellen |
| 2009/0024636 A1 | 1/2009 | Shiloh |
| 2009/0037255 A1 | 2/2009 | Chiu |
| 2009/0037326 A1 | 2/2009 | Chitti |
| 2009/0037333 A1 | 2/2009 | Flitcroft |
| 2009/0037388 A1 | 2/2009 | Cooper |
| 2009/0043702 A1 | 2/2009 | Bennett |
| 2009/0048934 A1 | 2/2009 | Haddad |
| 2009/0048971 A1 | 2/2009 | Hathaway |
| 2009/0061884 A1 | 3/2009 | Rajan |
| 2009/0063261 A1 | 3/2009 | Scribner |
| 2009/0064056 A1 | 3/2009 | Anderson |
| 2009/0076953 A1 | 3/2009 | Saville |
| 2009/0076966 A1 | 3/2009 | Bishop |
| 2009/0083065 A1 | 3/2009 | Unland |
| 2009/0089176 A1 | 4/2009 | Mccabe |
| 2009/0089193 A1 | 4/2009 | Paintin |
| 2009/0104888 A1 | 4/2009 | Cox |
| 2009/0106112 A1 | 4/2009 | Dalmia |
| 2009/0106151 A1 | 4/2009 | Nelsen |
| 2009/0106160 A1 | 4/2009 | Skowronek |
| 2009/0108080 A1 | 4/2009 | Meyer |
| 2009/0112775 A1 | 4/2009 | Chiulli |
| 2009/0119176 A1 | 5/2009 | Johnson |
| 2009/0119190 A1 | 5/2009 | Realini |
| 2009/0119211 A1 | 5/2009 | Johnson |
| 2009/0125429 A1 | 5/2009 | Takayama |
| 2009/0132347 A1 | 5/2009 | Anderson |
| 2009/0132366 A1 | 5/2009 | Lam |
| 2009/0132395 A1 | 5/2009 | Lam |
| 2009/0134217 A1 | 5/2009 | Flitcroft |
| 2009/0144104 A1 | 6/2009 | Johnson |
| 2009/0144201 A1 | 6/2009 | Gierkink |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0164344 A1 | 6/2009 | Shiftan |
| 2009/0170608 A1 | 7/2009 | Herrmann |
| 2009/0171778 A1 | 7/2009 | Powell |
| 2009/0173782 A1 | 7/2009 | Muscato |
| 2009/0182664 A1 | 7/2009 | Trombley |
| 2009/0187492 A1* | 7/2009 | Hammad ............ G06Q 10/087 705/26.1 |
| 2009/0200371 A1 | 8/2009 | Kean |
| 2009/0210300 A1 | 8/2009 | Cansler |
| 2009/0216910 A1 | 8/2009 | Duchesneau |
| 2009/0222347 A1 | 9/2009 | Whitten |
| 2009/0228211 A1 | 9/2009 | Rasanen |
| 2009/0233579 A1 | 9/2009 | Castell |
| 2009/0234751 A1 | 9/2009 | Chan |
| 2009/0240620 A1 | 9/2009 | Kendrick |
| 2009/0241159 A1 | 9/2009 | Campagna |
| 2009/0248583 A1 | 10/2009 | Chhabra |
| 2009/0248738 A1 | 10/2009 | Martinez |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271246 A1 | 10/2009 | Alvarez |
| 2009/0271265 A1 | 10/2009 | Lay |
| 2009/0276347 A1 | 11/2009 | Kargman |
| 2009/0281948 A1 | 11/2009 | Carlson |
| 2009/0288012 A1 | 11/2009 | Hertel |
| 2009/0294527 A1 | 12/2009 | Brabson |
| 2009/0307060 A1 | 12/2009 | Merz |
| 2009/0307135 A1 | 12/2009 | Gupta |
| 2009/0307139 A1 | 12/2009 | Mardikar |
| 2009/0308921 A1 | 12/2009 | Mullen |
| 2009/0313132 A1 | 12/2009 | McKenna |
| 2009/0319638 A1 | 12/2009 | Faith |
| 2009/0327045 A1 | 12/2009 | Olives |
| 2009/0327088 A1 | 12/2009 | Puthupparambil |
| 2009/0327131 A1 | 12/2009 | Beenau |
| 2010/0004989 A1 | 1/2010 | Bonalle |
| 2010/0005025 A1 | 1/2010 | Kumar |
| 2010/0008535 A1 | 1/2010 | Abulafia |
| 2010/0009663 A1 | 1/2010 | Chang |
| 2010/0010964 A1 | 1/2010 | Skowronek |
| 2010/0012728 A1 | 1/2010 | Rosset |
| 2010/0021149 A1 | 1/2010 | Mulder |
| 2010/0023386 A1 | 1/2010 | Avisar |
| 2010/0023455 A1 | 1/2010 | Dispensa |
| 2010/0023457 A1 | 1/2010 | Riviere |
| 2010/0036741 A1 | 2/2010 | Cleven |
| 2010/0036775 A1 | 2/2010 | Edens |
| 2010/0036884 A1 | 2/2010 | Brown |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0057548 A1 | 3/2010 | Edwards |
| 2010/0063903 A1 | 3/2010 | Whipple |
| 2010/0070359 A1 | 3/2010 | Heasley |
| 2010/0076873 A1 | 3/2010 | Taylor |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0088237 A1 | 4/2010 | Wankmueller |
| 2010/0094730 A1 | 4/2010 | Koski |

(56) References Cited

U.S. PATENT DOCUMENTS

| | | |
|---|---|---|
| 2010/0094755 A1 | 4/2010 | Kloster |
| 2010/0094878 A1 | 4/2010 | Soroca |
| 2010/0100480 A1 | 4/2010 | Altman |
| 2010/0106644 A1 | 4/2010 | Annan |
| 2010/0114664 A1 | 5/2010 | Jobin |
| 2010/0120408 A1 | 5/2010 | Beenau |
| 2010/0121707 A1 | 5/2010 | Goeldi |
| 2010/0125492 A1 | 5/2010 | Lin |
| 2010/0125495 A1 | 5/2010 | Smith |
| 2010/0125509 A1* | 5/2010 | Kranzley ............... G06Q 20/20 705/17 |
| 2010/0125803 A1 | 5/2010 | Johnson |
| 2010/0131347 A1 | 5/2010 | Sarptipi |
| 2010/0131415 A1 | 5/2010 | Sartipi |
| 2010/0133334 A1 | 6/2010 | Vadhri |
| 2010/0133339 A1 | 6/2010 | Gibson |
| 2010/0138026 A1 | 6/2010 | Kaushal |
| 2010/0138347 A1 | 6/2010 | Chen |
| 2010/0145860 A1 | 6/2010 | Pelegero |
| 2010/0153865 A1 | 6/2010 | Barnes |
| 2010/0155470 A1 | 6/2010 | Woronec |
| 2010/0161433 A1 | 6/2010 | White |
| 2010/0162126 A1 | 6/2010 | Donaldson |
| 2010/0174599 A1 | 7/2010 | Rosenblatt |
| 2010/0179855 A1 | 7/2010 | Chen |
| 2010/0185505 A1 | 7/2010 | Sprogoe |
| 2010/0185531 A1 | 7/2010 | Van |
| 2010/0185545 A1 | 7/2010 | Royyuru |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D |
| 2010/0211469 A1 | 8/2010 | Salmon |
| 2010/0211499 A1 | 8/2010 | Zanzot |
| 2010/0211505 A1 | 8/2010 | Saunders |
| 2010/0217613 A1 | 8/2010 | Kelly |
| 2010/0217682 A1 | 8/2010 | Chan |
| 2010/0223186 A1 | 9/2010 | Hogan |
| 2010/0228668 A1 | 9/2010 | Hogan |
| 2010/0235284 A1 | 9/2010 | Moore |
| 2010/0243728 A1 | 9/2010 | Wiesman |
| 2010/0250351 A1 | 9/2010 | Gillenson |
| 2010/0256976 A1 | 10/2010 | Atsmon |
| 2010/0258620 A1 | 10/2010 | Torreyson |
| 2010/0268645 A1 | 10/2010 | Martino |
| 2010/0276484 A1 | 11/2010 | Banerjee |
| 2010/0287048 A1 | 11/2010 | Ramer |
| 2010/0287229 A1 | 11/2010 | Hauser |
| 2010/0291904 A1 | 11/2010 | Musfeldt |
| 2010/0293032 A1 | 11/2010 | Engelsma |
| 2010/0299267 A1 | 11/2010 | Faith |
| 2010/0299292 A1 | 11/2010 | Collazo |
| 2010/0305848 A1 | 12/2010 | Stallman |
| 2010/0306075 A1 | 12/2010 | Drance |
| 2010/0306076 A1 | 12/2010 | Taveau |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0312724 A1 | 12/2010 | Pinckney |
| 2010/0325041 A1 | 12/2010 | Berardi |
| 2010/0332262 A1 | 12/2010 | Horvitz |
| 2010/0332283 A1 | 12/2010 | Ng |
| 2011/0004498 A1 | 1/2011 | Readshaw |
| 2011/0010292 A1 | 1/2011 | Giordano |
| 2011/0016047 A1 | 1/2011 | Wu |
| 2011/0016320 A1 | 1/2011 | Bergsten |
| 2011/0035273 A1 | 2/2011 | Parikh |
| 2011/0040640 A1 | 2/2011 | Erikson |
| 2011/0040655 A1 | 2/2011 | Hendrickson |
| 2011/0047017 A1 | 2/2011 | Lieblang |
| 2011/0047075 A1 | 2/2011 | Fourez |
| 2011/0047076 A1 | 2/2011 | Carlson |
| 2011/0078082 A1 | 3/2011 | Gupta |
| 2011/0082789 A1 | 4/2011 | Boyd |
| 2011/0083018 A1 | 4/2011 | Kesanupalli |
| 2011/0087596 A1 | 4/2011 | Dorsey |
| 2011/0087726 A1 | 4/2011 | Shim |
| 2011/0093335 A1 | 4/2011 | Fordyce |
| 2011/0093397 A1 | 4/2011 | Carlson |
| 2011/0099057 A1 | 4/2011 | Tenyer |
| 2011/0105183 A1 | 5/2011 | Hsiao |
| 2011/0106698 A1 | 5/2011 | Issacson |
| 2011/0109737 A1 | 5/2011 | Aben |
| 2011/0119300 A1 | 5/2011 | Marcade |
| 2011/0125597 A1 | 5/2011 | Oder |
| 2011/0137740 A1 | 6/2011 | Bhattacharya |
| 2011/0137742 A1 | 6/2011 | Parikh |
| 2011/0153437 A1 | 6/2011 | Archer |
| 2011/0153498 A1 | 6/2011 | Makhotin |
| 2011/0154466 A1 | 6/2011 | Harper |
| 2011/0161233 A1 | 6/2011 | Tieken |
| 2011/0178896 A1 | 7/2011 | Nakajima |
| 2011/0178926 A1 | 7/2011 | Lindelsee |
| 2011/0180598 A1 | 7/2011 | Morgan |
| 2011/0184827 A1 | 7/2011 | Hubert |
| 2011/0191244 A1 | 8/2011 | Dai |
| 2011/0208418 A1 | 8/2011 | Looney |
| 2011/0215146 A1 | 9/2011 | Shams |
| 2011/0218870 A1 | 9/2011 | Shams |
| 2011/0221692 A1 | 9/2011 | Seydoux |
| 2011/0238474 A1 | 9/2011 | Carr |
| 2011/0238511 A1 | 9/2011 | Park |
| 2011/0238573 A1 | 9/2011 | Varadarajan |
| 2011/0246290 A1 | 10/2011 | Howard |
| 2011/0246317 A1 | 10/2011 | Coppinger |
| 2011/0251892 A1* | 10/2011 | Laracey ............ G06Q 30/0253 705/14.51 |
| 2011/0258049 A1 | 10/2011 | Ramer |
| 2011/0258111 A1 | 10/2011 | Raj |
| 2011/0258123 A1 | 10/2011 | Dawkins |
| 2011/0270665 A1 | 11/2011 | Kim |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0282780 A1 | 11/2011 | French |
| 2011/0288684 A1 | 11/2011 | Farlow |
| 2011/0295745 A1 | 12/2011 | White |
| 2011/0296508 A1 | 12/2011 | Os |
| 2011/0302081 A1 | 12/2011 | Saunders |
| 2011/0312423 A1 | 12/2011 | Mosites |
| 2011/0320344 A1 | 12/2011 | Faith |
| 2011/0320345 A1 | 12/2011 | Taveau |
| 2012/0005026 A1 | 1/2012 | Khan |
| 2012/0011009 A1 | 1/2012 | Lindsey |
| 2012/0011063 A1 | 1/2012 | Killian |
| 2012/0016731 A1 | 1/2012 | Smith |
| 2012/0022943 A1 | 1/2012 | Howard |
| 2012/0023026 A1 | 1/2012 | Chen |
| 2012/0023417 A1 | 1/2012 | Nesladek |
| 2012/0023567 A1 | 1/2012 | Hammad |
| 2012/0028609 A1 | 2/2012 | Hruska |
| 2012/0030047 A1 | 2/2012 | Fuentes |
| 2012/0030101 A1 | 2/2012 | Boyd |
| 2012/0035998 A1 | 2/2012 | Chien |
| 2012/0036071 A1 | 2/2012 | Fulton |
| 2012/0041881 A1 | 2/2012 | Basu |
| 2012/0047237 A1 | 2/2012 | Arvidsson |
| 2012/0066065 A1 | 3/2012 | Switzer |
| 2012/0066078 A1 | 3/2012 | Kingston |
| 2012/0072311 A1 | 3/2012 | Khan |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0084132 A1 | 4/2012 | Khan |
| 2012/0084204 A1 | 4/2012 | Castell |
| 2012/0095852 A1 | 4/2012 | Bauer |
| 2012/0095865 A1 | 4/2012 | Doherty |
| 2012/0095895 A1 | 4/2012 | Aston |

(56) References Cited

U.S. PATENT DOCUMENTS

| | | |
|---|---|---|
| 2012/0101881 A1 | 4/2012 | Taylor |
| 2012/0110044 A1 | 5/2012 | Nagpal |
| 2012/0116902 A1 | 5/2012 | Cardina |
| 2012/0116966 A1 | 5/2012 | Tan |
| 2012/0118950 A1 | 5/2012 | Belk |
| 2012/0123838 A1 | 5/2012 | Sparks |
| 2012/0123882 A1 | 5/2012 | Carlson |
| 2012/0123940 A1 | 5/2012 | Killian |
| 2012/0124496 A1 | 5/2012 | Rose |
| 2012/0129514 A1 | 5/2012 | Beenau |
| 2012/0130794 A1 | 5/2012 | Strieder |
| 2012/0136780 A1 | 5/2012 | El-Awady |
| 2012/0143767 A1 | 6/2012 | Abadir |
| 2012/0143772 A1 | 6/2012 | Abadir |
| 2012/0158580 A1 | 6/2012 | Eram |
| 2012/0158589 A1 | 6/2012 | Katzin |
| 2012/0158593 A1 | 6/2012 | Garfinkle |
| 2012/0158792 A1 | 6/2012 | MacLaurin |
| 2012/0158893 A1 | 6/2012 | Boyns |
| 2012/0159163 A1 | 6/2012 | von Behren |
| 2012/0165978 A1 | 6/2012 | Li |
| 2012/0166333 A1 | 6/2012 | von Behren |
| 2012/0166655 A1 | 6/2012 | Maddali |
| 2012/0173431 A1 | 7/2012 | Ritchie |
| 2012/0173962 A1 | 7/2012 | Oh |
| 2012/0185386 A1 | 7/2012 | Salama |
| 2012/0190386 A1 | 7/2012 | Anderson |
| 2012/0197691 A1 | 8/2012 | Grigg |
| 2012/0197794 A1 | 8/2012 | Grigg |
| 2012/0197807 A1 | 8/2012 | Schlesser |
| 2012/0203662 A1 | 8/2012 | Morgan |
| 2012/0203664 A1 | 8/2012 | Torossian |
| 2012/0203665 A1 | 8/2012 | Morgan |
| 2012/0203666 A1 | 8/2012 | Torossian |
| 2012/0203673 A1 | 8/2012 | Morgan |
| 2012/0209749 A1 | 8/2012 | Hammad |
| 2012/0215640 A1 | 8/2012 | Ramer |
| 2012/0215648 A1 | 8/2012 | Rose |
| 2012/0215650 A1 | 8/2012 | Oba |
| 2012/0215684 A1 | 8/2012 | Kidron |
| 2012/0215688 A1 | 8/2012 | Musser |
| 2012/0215696 A1 | 8/2012 | Salonen |
| 2012/0221421 A1 | 8/2012 | Hammad |
| 2012/0221502 A1 | 8/2012 | Jerram |
| 2012/0226582 A1 | 9/2012 | Hammad |
| 2012/0231844 A1 | 9/2012 | Coppinger |
| 2012/0233004 A1 | 9/2012 | Bercaw |
| 2012/0233170 A1 | 9/2012 | Musgrove |
| 2012/0239417 A1 | 9/2012 | Pourfallah |
| 2012/0239556 A1 | 9/2012 | Magruder |
| 2012/0239560 A1 | 9/2012 | Pourfallah |
| 2012/0246070 A1 | 9/2012 | Vadhri |
| 2012/0246071 A1 | 9/2012 | Jain |
| 2012/0246079 A1 | 9/2012 | Wilson |
| 2012/0254108 A1 | 10/2012 | Wedewer |
| 2012/0259763 A1 | 10/2012 | Pessin |
| 2012/0265631 A1 | 10/2012 | Cronic |
| 2012/0265685 A1 | 10/2012 | Brudnicki |
| 2012/0271770 A1 | 10/2012 | Harris |
| 2012/0284035 A1 | 11/2012 | Gillin |
| 2012/0297446 A1 | 11/2012 | Webb |
| 2012/0300932 A1 | 11/2012 | Cambridge |
| 2012/0303425 A1 | 11/2012 | Katzin |
| 2012/0303503 A1 | 11/2012 | Cambridge |
| 2012/0303736 A1 | 11/2012 | Novotny |
| 2012/0303961 A1 | 11/2012 | Kean |
| 2012/0304273 A1 | 11/2012 | Bailey |
| 2012/0310725 A1 | 12/2012 | Chien |
| 2012/0310826 A1 | 12/2012 | Chatterjee |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2012/0317149 A1 | 12/2012 | Jagota |
| 2012/0323664 A1 | 12/2012 | Klems |
| 2012/0330874 A1 | 12/2012 | Jerram |
| 2013/0013499 A1 | 1/2013 | Kalgi |
| 2013/0017784 A1 | 1/2013 | Fisher |
| 2013/0018757 A1 | 1/2013 | Anderson |
| 2013/0019098 A1 | 1/2013 | Gupta |
| 2013/0024364 A1 | 1/2013 | Shrivastava |
| 2013/0024371 A1 | 1/2013 | Hariramani |
| 2013/0024916 A1 | 1/2013 | Evans |
| 2013/0030828 A1 | 1/2013 | Pourfallah |
| 2013/0031006 A1 | 1/2013 | McCullagh |
| 2013/0054337 A1 | 2/2013 | Brendell |
| 2013/0054466 A1 | 2/2013 | Muscato |
| 2013/0054470 A1 | 2/2013 | Campos |
| 2013/0054474 A1 | 2/2013 | Yeager |
| 2013/0080238 A1 | 3/2013 | Kelly |
| 2013/0081122 A1 | 3/2013 | Svigals |
| 2013/0090750 A1 | 4/2013 | Herrman |
| 2013/0091028 A1 | 4/2013 | Oder |
| 2013/0103574 A1 | 4/2013 | Conrad |
| 2013/0110658 A1 | 5/2013 | Lyman |
| 2013/0111599 A1 | 5/2013 | Gargiulo |
| 2013/0117170 A1 | 5/2013 | Coppinger |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144785 A1 | 6/2013 | Karpenko |
| 2013/0144888 A1 | 6/2013 | Faith |
| 2013/0144957 A1 | 6/2013 | Sherman |
| 2013/0145148 A1 | 6/2013 | Shablygin |
| 2013/0145172 A1 | 6/2013 | Shablygin |
| 2013/0151417 A1 | 6/2013 | Gupta |
| 2013/0159081 A1 | 6/2013 | Shastry |
| 2013/0159112 A1 | 6/2013 | Schultz |
| 2013/0159178 A1 | 6/2013 | Colon |
| 2013/0159184 A1 | 6/2013 | Thaw |
| 2013/0166332 A1 | 6/2013 | Hammad |
| 2013/0166402 A1 | 6/2013 | Parento |
| 2013/0166456 A1 | 6/2013 | Zhang |
| 2013/0166621 A1 | 6/2013 | Zhu |
| 2013/0173736 A1 | 7/2013 | Krzeminski |
| 2013/0179340 A1 | 7/2013 | Alba |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell |
| 2013/0212666 A1 | 8/2013 | Mattsson |
| 2013/0218640 A1 | 8/2013 | Kidder |
| 2013/0218657 A1 | 8/2013 | Salmon |
| 2013/0218698 A1 | 8/2013 | Moon |
| 2013/0218721 A1 | 8/2013 | Borhan |
| 2013/0218765 A1 | 8/2013 | Hammad |
| 2013/0218769 A1 | 8/2013 | Pourfallah |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |

(56) References Cited

U.S. PATENT DOCUMENTS

| | | |
|---|---|---|
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0325579 A1 | 12/2013 | Salmon |
| 2013/0332344 A1 | 12/2013 | Weber |
| 2013/0339240 A1 | 12/2013 | Anderson |
| 2013/0339253 A1 | 12/2013 | Sincai |
| 2013/0346302 A1 | 12/2013 | Purves |
| 2013/0346305 A1 | 12/2013 | Mendes |
| 2013/0346314 A1 | 12/2013 | Mogollon |
| 2014/0006198 A1 | 1/2014 | Daly |
| 2014/0006283 A1 | 1/2014 | Hogg |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi |
| 2014/0019352 A1 | 1/2014 | Shrivastava |
| 2014/0025581 A1 | 1/2014 | Caiman |
| 2014/0025585 A1 | 1/2014 | Caiman |
| 2014/0025958 A1 | 1/2014 | Caiman |
| 2014/0032417 A1 | 1/2014 | Mattsson |
| 2014/0032418 A1 | 1/2014 | Weber |
| 2014/0040127 A1 | 2/2014 | Chatterjee |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047517 A1 | 2/2014 | Ding |
| 2014/0047551 A1 | 2/2014 | Nagasundaram |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0095589 A1 | 4/2014 | Johnson |
| 2014/0108172 A1 | 4/2014 | Weber |
| 2014/0108197 A1 | 4/2014 | Smith |
| 2014/0114857 A1 | 4/2014 | Griggs |
| 2014/0136945 A1 | 5/2014 | Ligman |
| 2014/0143137 A1 | 5/2014 | Carlson |
| 2014/0164243 A1 | 6/2014 | Aabye |
| 2014/0188586 A1 | 7/2014 | Carpenter |
| 2014/0294701 A1 | 10/2014 | Dai |
| 2014/0297534 A1 | 10/2014 | Patterson |
| 2014/0310080 A1 | 10/2014 | Salmon |
| 2014/0310183 A1 | 10/2014 | Weber |
| 2014/0330721 A1 | 11/2014 | Wang |
| 2014/0330722 A1 | 11/2014 | Laxminarayanan |
| 2014/0331265 A1 | 11/2014 | Mozell |
| 2014/0337175 A1 | 11/2014 | Katzin |
| 2014/0337236 A1 | 11/2014 | Wong |
| 2014/0344153 A1 | 11/2014 | Raj |
| 2014/0365295 A1 | 12/2014 | Postrel |
| 2014/0372308 A1 | 12/2014 | Sheets |
| 2015/0019443 A1 | 1/2015 | Sheets |
| 2015/0019944 A1 | 1/2015 | Kalgi |
| 2015/0026049 A1 | 1/2015 | Theurer |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong |
| 2015/0052064 A1 | 2/2015 | Karpenko |
| 2015/0088756 A1 | 3/2015 | Makhotin |
| 2015/0089350 A1 | 3/2015 | Davis |
| 2015/0106239 A1 | 4/2015 | Gaddam |
| 2015/0112870 A1 | 4/2015 | Nagasundaram |
| 2015/0112871 A1 | 4/2015 | Kumnick |
| 2015/0120472 A1 | 4/2015 | Aabye |
| 2015/0127529 A1 | 5/2015 | Makhotin |
| 2015/0127547 A1 | 5/2015 | Powell |
| 2015/0140960 A1 | 5/2015 | Powell |
| 2015/0142673 A1 | 5/2015 | Nelsen |
| 2015/0161597 A1 | 6/2015 | Subramanian |
| 2015/0178724 A1 | 6/2015 | Ngo |
| 2015/0180836 A1 | 6/2015 | Wong |
| 2015/0186864 A1 | 7/2015 | Jones |
| 2015/0193222 A1 | 7/2015 | Pirzadeh |
| 2015/0195133 A1 | 7/2015 | Sheets |
| 2015/0199679 A1 | 7/2015 | Palanisamy |
| 2015/0199689 A1 | 7/2015 | Kumnick |
| 2015/0220917 A1 | 8/2015 | Aabye |
| 2015/0269566 A1 | 9/2015 | Gaddam |
| 2015/0302453 A1 | 10/2015 | Tietzen |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339767 A1 | 11/2015 | Chen |
| 2015/0356560 A1 | 12/2015 | Shastry |
| 2016/0028550 A1 | 1/2016 | Gaddam |
| 2016/0042263 A1 | 2/2016 | Gaddam |
| 2016/0065370 A1 | 3/2016 | Le Saint |
| 2016/0092696 A1 | 3/2016 | Guglani |
| 2016/0092872 A1 | 3/2016 | Prakash |
| 2016/0103675 A1 | 4/2016 | Aabye |
| 2016/0119296 A1 | 4/2016 | Laxminarayanan |
| 2016/0224976 A1 | 8/2016 | Basu |
| 2016/0291920 A1 | 10/2016 | Sirpal |
| 2016/0379192 A1 | 12/2016 | Purves |
| 2017/0046696 A1 | 2/2017 | Powell |
| 2017/0103387 A1 | 4/2017 | Weber |
| 2017/0134479 A1 | 5/2017 | Kalgi |
| 2017/0220818 A1 | 8/2017 | Nagasundaram |
| 2017/0228723 A1 | 8/2017 | Taylor |
| 2017/0300314 A1 | 10/2017 | Lopyrev |
| 2017/0346876 A1 | 11/2017 | Lim |
| 2018/0075081 A1 | 3/2018 | Chipman |

FOREIGN PATENT DOCUMENTS

| | | |
|---|---|---|
| CN | 101075316 A | 11/2007 |
| CN | 101231727 A | 7/2008 |
| CN | 101388125 A | 3/2009 |
| CN | 101840550 A | 9/2010 |
| CN | 102779304 | 11/2012 |
| CN | 102947847 | 2/2013 |
| EP | 0745961 A2 | 12/1996 |
| EP | 0855659 A1 | 7/1998 |
| EP | 1921578 A1 | 5/2008 |
| EP | 2156397 A1 | 2/2010 |
| JP | 2001344544 A | 12/2001 |
| JP | 2005004621 A | 1/2005 |
| JP | 2007328549 | 12/2007 |
| JP | 2008527495 A | 7/2008 |
| JP | 2008545210 A | 12/2008 |
| JP | 2009151730 A | 7/2009 |
| JP | 2009176259 | 8/2009 |
| JP | 2011186660 A | 9/2011 |
| JP | 2012027824 A | 2/2012 |
| KR | 20000058839 A | 10/2000 |
| KR | 20010055426 | 7/2001 |
| KR | 100432430 B1 | 5/2004 |
| KR | 20060117177 A | 11/2006 |
| KR | 20070104087 A | 10/2007 |
| SG | 2013069539 | 10/2013 |
| WO | 2000046769 A1 | 8/2000 |
| WO | 2001035304 A1 | 5/2001 |
| WO | 0165502 A2 | 9/2001 |
| WO | 2003001866 A1 | 1/2003 |

(56) References Cited

FOREIGN PATENT DOCUMENTS

| WO | 03023674 | A1 | 3/2003 |
|----|----------|----|--------|
| WO | 2003046697 | A2 | 6/2003 |
| WO | 2003071386 | A2 | 8/2003 |
| WO | 2003083737 | A1 | 10/2003 |
| WO | 2004042536 | A2 | 5/2004 |
| WO | 2006113834 | A2 | 10/2006 |
| WO | 2009032523 | A1 | 3/2009 |
| WO | 2010078522 | A1 | 7/2010 |
| WO | 2010148704 | A1 | 12/2010 |
| WO | 2010148737 | A1 | 12/2010 |
| WO | 2012068078 | A2 | 5/2012 |
| WO | 2012098556 | A1 | 7/2012 |
| WO | 2012142370 | A2 | 10/2012 |
| WO | 2012167941 | A1 | 12/2012 |
| WO | 2013048538 | A1 | 4/2013 |
| WO | 2013056104 | A1 | 4/2013 |
| WO | 2013119914 | A1 | 8/2013 |
| WO | 2013179271 | A2 | 12/2013 |

OTHER PUBLICATIONS

David Breitkopf, "ACS to Take Over Mich. WC Distribution Program", American Banker, New York, NY: Jul. 20, 2006, vol. 171. Issue 138, p. 6.
Gopalan, NP & Selvan, B Siva. TCP/IP Illustrated. Prentice-Hall. 2008. pp. 101-102, 175-176 and 235. 7 pages.
International Search Report and Written Opinion for PCT/US09/54921 dated Oct. 21, 2009. (2 pages).
International Search Report and Written Opinion for PCT/US11/57173 dated Mar. 15, 2012. (11 pages).
International Search Report and Written Opinion for PCT/US11/57179 dated Jan. 5, 2012. (7 pages).
International Search Report and Written Opinion for PCT/US12/37597 dated Sep. 21, 2012 (11 pages).
International Search Report and Written Opinion for PCT/US12/41437 dated Aug. 24, 2012. (11 pages).
International Search Report and Written Opinion for PCT/US2010/033229 dated Dec. 29, 2010, 8 pages.
International Search Report and Written Opinion for PCT/US2010/041860 dated Feb. 1, 2011. (9 pages).
International Search Report and Written Opinion for PCT/US2010/048344 dated Nov. 15, 2010. (9 pages).
International Search Report and Written Opinion for PCT/US2013/020411 dated May 21, 2013. 18 pages.
International Search Report and Written Opinion for PCT/US2013/024538, dated May 31, 2013. 15 pages.
International Search Report for PCT/US11/49393 dated Dec. 5, 2011. (2 pages).
International Search Report for PCT/US11/65305 dated Apr. 16, 2012. 2 pages.
International Search Report for PCT/US12/23856 dated Jun. 6, 2012. 3 pages.
International Search Report for PCT/US12/24772 dated Jul. 24, 2012. 3 pages.
International Search Report for PCT/US12/25530 dated Aug. 7, 2012. 4 pages.
International Search Report for PCT/US12/39638 dated Sep. 24, 2012. 4 pages.
International Search Report for PCT/US12/45875 dated Nov. 16, 2012. 4 pages.
International Search Report for PCT/US12/47092 dated Nov. 26, 2012. 11 pages.
International Search Report for PCT/US12/56759 dated Feb. 25, 2013. 12 pages.
International Search Report for PCT/US12/57528 dated Dec. 17, 2012. 8 pages.
International Search Report for PCT/US12/57577 dated Nov. 29, 2012. 2 pages.
International Search Report and Written Opinion for PCT/US12/66898 dated Feb. 11, 2013. 14 pages.
International Search Report PCT/US12/27620 dated Aug. 10, 2012. 3 pages.
Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.
Aissi et al., U.S. Appl. No. 61/738,832 (unpublished), Management of Sensitive Data filed Dec. 18, 2012.
Australian Patent Office, Patent Examination Report No. 2 in Australian Patent Application No. 2012217606, dated Jun. 15, 2016, 6 pages.
Cash et al., U.S. Appl. No. 15/041,495 (unpublished), Peer Forward Authorization of Digital Requests filed Feb. 11, 2016.
U.S. Appl. No. 12/940,664, entitled "System and Method for Determining Transaction Distance" filed Nov. 5, 2010.
Dizaj, Mohammad Vahid Alizadeh, Moghaddam, Rexa Askari, Momenebellah, Samad, New Mobile Payment Protocol: Mobile Pay Center Protocol 2 (MPCP2) by Using New Key Agreement Protocol: VAM, 3d International Conference on Electronics Computer Technology, vol. 2, Apr. 2011, pp. 12-18.
State Intellectual Property Office of the People's Republic of China, First Office Action in Chinese Application No. 201280018719.7, dated Jul. 4, 2016, 15 pages.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Gaddam et al., U.S. Appl. No. 62/053,736 (unpublished), Completing Transactions Without a User Payment Device, filed Sep. 22, 2014.
Galland et al., U.S. Appl. No. 62/128,709 (unpublished), Tokenizing Transaction Amounts, filed Mar. 5, 2015.
Gao, Jerry, Kulkarni, Vijay, Ranavat, Himanshu, Chang, Lee, Mei, Hsing, A2D Barcode-Based Mobile Payment System, 3d International Conference on Multimedia and Ubiquitous Engineering, Jun. 2009, pp. 320-329.
Hoverson et al., U.S. Appl. No. 62/038,174 (unpublished), Customized Payment Gateway, filed Aug. 15, 2014.
International Search Report and Written Opinion for PCT/US2014/030517, dated Aug. 18, 2014. (9 pages).
International Search Report and Written Opinion for PCT/US2012/026205, dated May 29, 2012. 8 pages.
Kalgi et al., U.S. Appl. No. 62/024,426 (unpublished), Secure Transactions Using Mobile Devices, filed Jul. 14, 2014.
Kinagi, U.S. Appl. No. 62/117,291 (unpublished), Token and Cryptogram Using Transaction Specific Information filed Feb. 17, 2015.
Le Saint et al., U.S. Appl. No. 15/008,388 (unpublished), Methods for Secure Credential Provisioning, filed Jan. 27, 2016.
U.S. Appl. No. 61/250,440, filed Oct. 9, 2009, entitled "Systems and Methods to Provide Loyalty Programs".
McGuire, U.S. Appl. No. 14/600,523 (unpublished), Secure Payment Processing Usnig Authorization Request, filed Jan. 20, 2015.
Patterson, U.S. Appl. No. 15/019,157 (unpublished), Token Processing Utilizing Multiple Authorizations, filed Feb. 9, 2016.
Patterson, U.S. Appl. No. 62/054,346 (unpublished), Mirrored Token Vault, filed Sep. 23, 2014.
Powell, U.S. Appl. No. 61/926,236 (unpublished), Methods and Systems for Provisioning Mobile Devices With Payment Credentials and Payment Token Identifiers filed Jan. 10, 2014.
Prakash et al., U.S. Appl. No. 14/955,716 (unpublished), Provisioning Platform for Machine-To-Machine Devices, filed Dec. 1, 2015.
Prakash et al., U.S. Appl. No. 62/037,033 (unpublished), Sharing Payment Token, filed Aug. 13, 2014.
Rangarajan et al., U.S. Appl. No. 61/751,763 (unpublished), Payments Bridge filed Jan. 11, 2013.
Sabba et al., U.S. Appl. No. 15/011,366 (unpublished), Token Check Offline, filed Jan. 29, 2016.
Sharma et al., U.S. Appl. No. 62/003,717 (unpublished), Mobile Merchant Application filed May 28, 2014.
Stubbs et al., U.S. Appl. No. 62/103,522 (unpublished), Methods and Systems for Wallet Provider Provisioning filed Jan. 14, 2015.

(56) References Cited

OTHER PUBLICATIONS

Wang, U.S. Appl. No. 62/000,288 (unpublished), Payment System Canonical Address Format, filed May 19, 2014.
Wang, U.S. Appl. No. 62/042,050 (unpublished), Payment Device Authentication and Authorization System, filed Aug. 26, 2014.
Wong et al., U.S. Appl. No. 14/966,948 (unpublished), Automated Access Data Provisioning filed Dec. 11, 2015.
Wong et al., U.S. Appl. No. 61/879,362 (unpublished), Systems and Methods for Managing Mobile Cardholder Verification Methods filed Sep. 18, 2013.
International Search Report and Written Opinion forPCT/US2013/031084, dated Jun. 4, 2013. 9 pages.
Written Opinion for PCT/US12/27620 dated Aug. 10, 2012. 5 pages.
European Patent Office, Supplementary European Search Report and European Search Opinion, in EP Application No. 12749451.6, dated Apr. 20, 2015, 7 pages.
International Search Report and Written Opinion for PCT/US13/46875, dated Oct. 24, 2013, 14 pages.
IP Australia, Patent Examination Report No. 1, Australian Application No. 2012220669, dated Sep. 8, 2014, 6 pages.
IP Australia, Patent Examination Report No. 2, Australian Application No. 2012220669, dated Jun. 8, 2016, 4 pages.
State Intellectual Property of the People's Republic of China, First Office Action in Chinese Application No. 201280019629, X, dated Aug. 1, 2016, 15 pages.
International Preliminary Report on Patentability dated Jan. 16, 2014 in related/ corresponding PCT Patent Appl. No. PCT/US2012/045601 filed Jul. 5, 2012. (7 pages).
Smartphone e-payment and Google AD send blog, 'Google Wallet on Smartphone', <http://stockpedia.blogspot.kr/2011/06/google-wallet.html> Jun. 10, 2011, pp. 1-3.
International Preliminary Report on Patentability dated Jan. 14, 2014 cited in related/corresponding International PCT Appl. No. PCT/US2012/045875 filed Jul. 7, 2012. (11 pages).
Petition for Inter Partes Review of U.S. Pat. No. 8,533,860 Challenging Claims 1-30 Under 35 U.S.C. 312 and 37 C.F.R. 42.104, filed Feb. 17, 2016, Before the USPTO Patent Trial and Appeal Board, IPR 2016-00600, 65 pages.
Vitt, Elizabeth et al. Data Integration Solutions for Master Data Management (Feb. 2006). https://technet.microsoft.com/en-us/library/aa964123(v=sql.90).aspx (19 pages).
Vitt, Elizabeth, et al. "Microsoft SQL Server 2005 Analysis Services Performance Guide." White Paper, White Paper (2007). (116 pages).
ShopSawy Blog, Feb. 2012. Retrieved from https://web.archive.org/web/20120212104611 /http://shopsawy.com:80/blog/.pp. 1-13.
Charland et al., Mobile Application Development: Web vs. Native, Apr. 2011, 9 pages.
Lee et al., osgGap: scene graph library for mobile based on hybrid web app framework, Nov. 2013, 4 pages.
Immaneni et al., Hybrid retrieval from the unified web, Mar. 2007, 5 pages.
McCarney et al., "Tapas: Design, Implementation, and Usability Evaluation of a Password Manager," Copyright 2012, ACM 978 1-4503-1312-4/12/12 (10 pages).
Lowry PB XML data mediation and collaboration: a proposed comprehensive architecture and query requirements for using XML to mediate heterogeneous data sources and targets, Proceedings of the 34th Hawaii International Conference on System Sciences—2001, Jan. 3, 2001; Jan. 3, 2001-Jan. 6, 2001, IEEE, pp. 1-9.
Gao et al., "A 2D Barcode-Based Mobile Payment System", (2009), XP031561633 (10 pages).
International Search Report and Written Opinion for PCT/US11/57180 dated Mar. 2012 (11 pages).
International Search Report and Written Opinion for PCT/US12/55636 dated Nov. 30, 2012. 2 pages.
International Search Report and Written Opinion for PCT/US12/65738 dated Apr. 19, 2013. 9 pages.
International Search Report and Written Opinion for PCT/US2012/027043 dated Jul. 13, 2012. 15 pages.
International Search Report and Written Opinion for PCT/US2012/045601 dated Feb. 1, 2013. 11 pages.
International Search Report and Written Opinion for PCT/US2012/069557 dated Feb. 22, 2013. 8 pages.
International Search Report and Writtten Opinion for PCT/US2011/039178 dated Sep. 2011 (7 pages).
International Search Report for PCT/US12/21000 dated May 15, 2012. 2 pages.
International Search Report and Written Opinion for PCT/US2010/046833 dated Apr. 26, 2011 (8 pages).
Dimmick, U.S. Appl. No. 14/952,444 (unpublished), Tokenization Request via Access Device, filed Nov. 25, 2015.
Dimmick, U.S. Appl. No. 14/952,514 (unpublished), Systems Communications With Non-Sensitive Identifiers, filed Nov. 25, 2015.
Li, U.S. Appl. No. 61/894,749 (unpublished), Methods and Systems for Authentication and Issuance of Tokens in a Secure Environment filed Oct. 23, 2013.
Powell, U.S. Appl. No. 61/892,407 (unpublished), Issuer Over-The-Air Update Method and System filed Oct. 17, 2013.
Stack Exchange, Why aren't there automated translators from one programming language to another, 2010 (5 pages).
International Preliminary Report on Patentability for PCT/US2010/033229 dated Dec. 29, 2010. (8 pages).
International Search Report and Written Opinion for PCT/US2012/057528, dated May 29, 2012. (8 pages).
Petition for Inter Partes Review of U.S. Pat. No. 8,887,308 Challenging Claim 1 Under 35 U.S.C. 312 and 37 C.F. R. 42.104, dated Mar. 3, 2016, before the USPTO Patent Trial and Appeal Board, IPR 2016-00602, 58 pages.
Petition for Inter Partes Review of U.S. Pat. No. 8,402,555 Challenging Claims 1-26 Under 35 U.S.C. 312 and 37 C.F.R. 42.104, dated Mar. 22, 2016, before the USPTO Patent Trial and Appeal Board, IPR 2016-00789, 65 pages.
Corrected Petition for Inter Partes Review of U.S. Pat. No. 8,533,860 Challenging Claims 1-30 Under 35 U.S.C. .sctn.312 and 37 C.F.R. sctn.42.104, dated Mar. 14, 2016, before the USPTO Patent Trial and Appeal Board, IPR 2016-00600, 65 pages.
ShopSavvy Blog. Feb. 2012. Retrieved from https://web.archive.Org/web/20120212104611/http://shopsavvy.com/blog. pp. 1-13 (Year: 2012).
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
International Search Report and Written Opinion for PCT/US2010/033547 dated Dec. 14, 2010 (3 pages).
International Search Report and Written Opinion for PCT/US2010/033861 dated Dec. 9, 2010 (7 pages).
International Search Report and Written Opinion for PCT/US2010/045445 dated Feb. 24, 2011 (3 pages).
International Search Report and Written Opinion for PCT/US2010/045500 dated Mar. 29, 2011 (3 pages).
International Search Report and Written Opinion for PCT/US2011/024941 dated Apr. 19, 2011 (6 pages).
International Search Report and Written Opinion for PCT/US2011/032093 dated Aug. 24, 2011 (11 pages).
International Search Report and Written Opinion for PCT/US2011/035268 dated Aug. 5, 2011 (3 pages).
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report and Written Opinion issued in connection with PCT/US11/42062 dated Sep. 29, 2011 (8 pages).
Office Action dated Feb. 28, 2018 for U.S. Appl. No. 14/242,403 (pp. 1-11).
Office Action dated Apr. 12, 2018 for U.S. Appl. No. 13/520,481 (pp. 1-8).
Australian Examination Report for AU2017203295 dated Apr. 19, 2018, 4 pages.

(56) References Cited

OTHER PUBLICATIONS

Ratha, N., and Bolle, R., 1. History of Fingerprint Pattern Recognition—1.1 Introduction; 1.2 The Development of Fingerprint Classification Systems "Automatic Fingerprint Recognition Systems," Springer-Verlag, (2004) (466 pages).
Office Action dated May 22, 2018 for U.S. Appl. No. 14/216,382 (pp. 1-8).
Chinese Office Action dated Oct. 10, 2017 for CN Application No. 201280019629.X, 7 pages.
Pan Kexian "Development of the Location-Based Service LBS Application of Intelligent Mobile Phone", Information Technologies, Oct. 25, 2009, pp. 134-137, cited on Oct. 10, 2017 in CN201280019629.
Yang Jingjing "Help Web: Life Search Forerunner"Scientific and Technological Information, Aug. 5, 2010, pp. 36-37, cited on Oct. 10, 2017 in CN201280019629.
Wang Lepeng et al. "Discuss of Foursquare Pattern and Its Deelopment Strategies in China" Scientific and Technological Information, Aug. 15, 2010, pp. 90-91, cited on Oct. 10, 2017 in CN201280019629.
Chinese Office Action dated Nov. 6, 2017 for CN Application No. 201280018719.7, 24 pages.
Notice of Allowance dated Jun. 27, 2018 for U.S. Appl. No. 13/542,443 (pp. 1-13).
Office Action dated Jun. 22, 2018 for U.S. Appl. No. 13/629,006 (pp. 1-8).
Office Action dated Jun. 21, 2018 for U.S. Appl. No. 14/216,351 (pp. 1-12).
Office Action dated Jun. 27, 2018 for U.S. Appl. No. 15/717,409 (pp. 1-7).
I. Malavolta, Web-based hybrid mobile apps: state of the practice and research opportunities, 2 pages (Year: 2016).
Notice of Allowance dated Jul. 23, 2018 for U.S. Appl. No. 15/406,325 (pp. 1-9).
Office Action dated Sep. 21, 2018 for U.S. Appl. No. 15/839,493 (pp. 1-21).
Office Action dated Oct. 4, 2018 for U.S. Appl. No. 13/758,472 (pp. 1-22).
Notice of Allowance dated Oct. 11, 2018 for U.S. Appl. No. 13/520,481 (pp. 1-9).
Brick-and-mortar retailers snatching customers away from E-tailers. (Feb. 16, 2012). PR Newswire Retrieved from https:// dialog.proguest.corn/professional/docview/1346330115?accountid=142257 (Year: 2012) 3 pages.
Notice of Allowance dated Oct. 10, 2018 for U.S. Appl. No. 14/242,403 (pp. 1-11).
Office Action dated Nov. 2, 2018 for U.S. Appl. No. 13/624,779 (pp. 1-18).
Office Action dated Dec. 3, 2018 for U.S. Appl. No. 14/935,122 (pp. 1-13).
Notice of Allowance dated Nov. 30, 2018 for U.S. Appl. No. 15/717,409 (pp. 1-8).
Chinese Office Action (with English language translation) for Application No. 201480023694.9, dated Jun. 26, 2019, 7 pages.
Notice of Allowance dated May 30, 2019 for U.S. Appl. No. 13/758,472 (pp. 1-10).
Office Action dated Jul. 10, 2019 for U.S. Appl. No. 13/398,817 (pp. 1-8).
Office Action dated Jun. 27, 2019 for U.S. Appl. No. 13/629,006 (pp. 1-7).
Office Action dated May 14, 2019 for U.S. Appl. No. 14/935,122 (pp. 1-11).
Office Action dated Dec. 27, 2018 for U.S. Appl. No. 13/398,817 (pp. 1-10).
Office Action dated Jan. 17, 2019 for U.S. Appl. No. 14/216,382 (pp. 1-7).
Ex Parte Quayle Action dated Jan. 18, 2019 for U.S. Appl. No. 16/182,288 (pp. 1-5).
Chinese Office Action (with English language translation) dated Jan. 30, 2019 for Application No. 201280019629.X, 10 pages.
Chinese Office Action (with English language translation) for Application No. 201480023694.9 dated Dec. 3, 2018, 17 pages.
Notice of Allowance dated Feb. 27, 2019 for U.S. Appl. No. 15/839,493 (pp. 1-9).
Notice of Allowance dated Apr. 12, 2019 for U.S. Appl. No. 16/182,288 (pp. 1-8).

\* cited by examiner

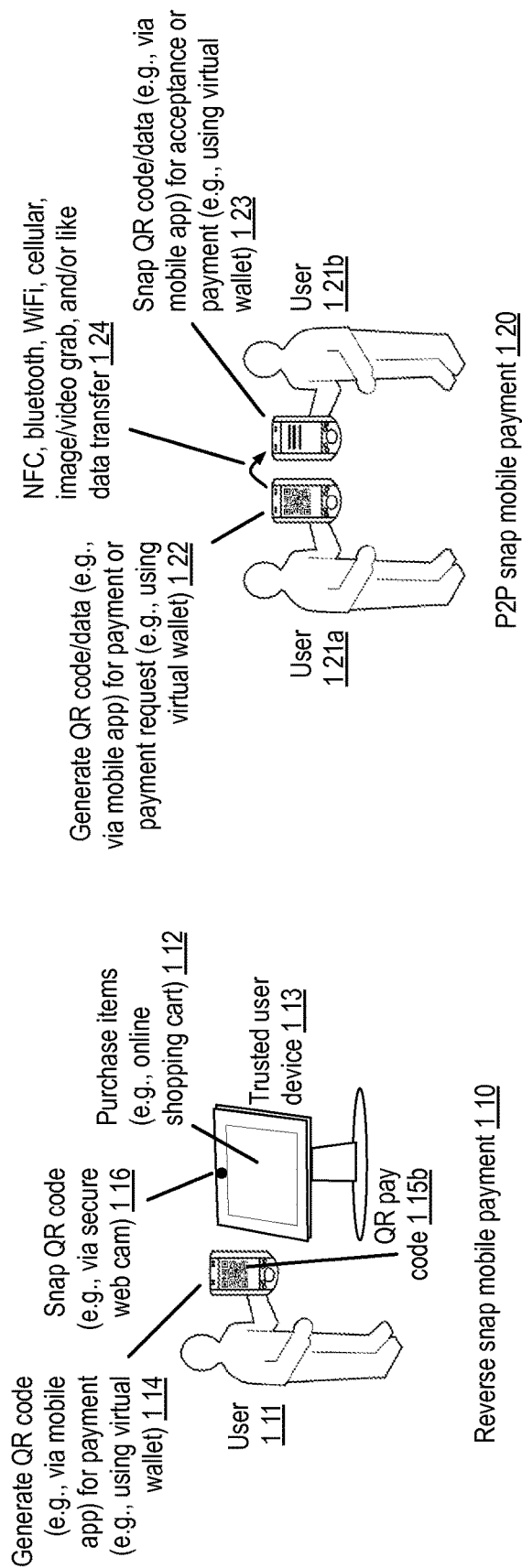
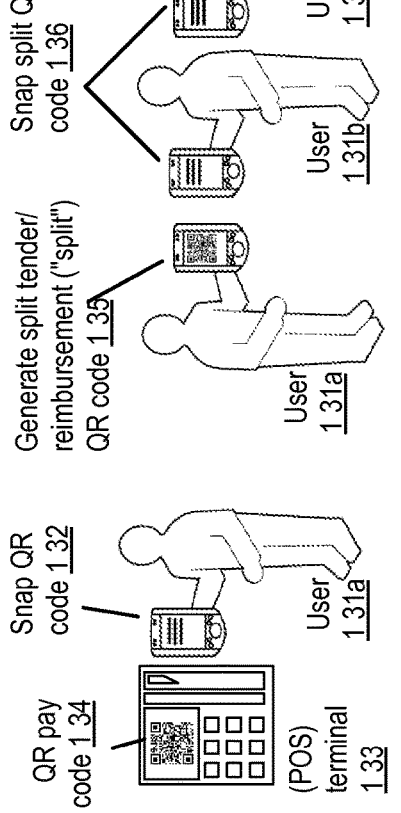
FIGURE 1B   Example(s): Snap Mobile Payment

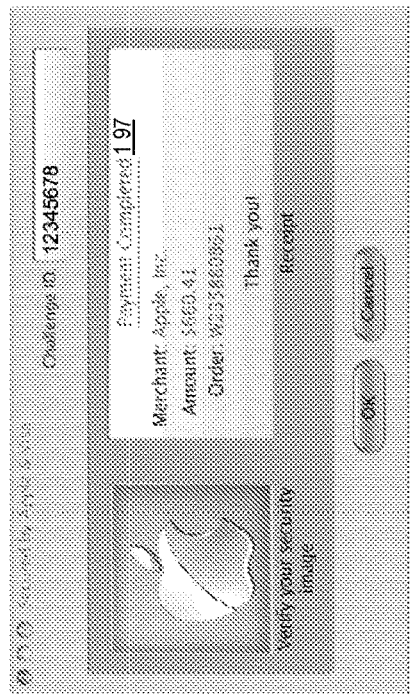
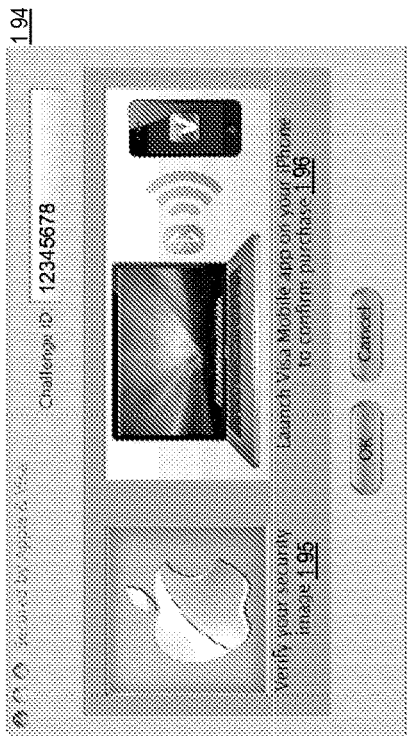
FIGURE 1F  Example(s): Snap Mobile Applications

Example: Snap Mobile Payment User Interface

Example: Snap Mobile Payment Web Interface

Example: Snap Mobile Payment POS Terminal Interface

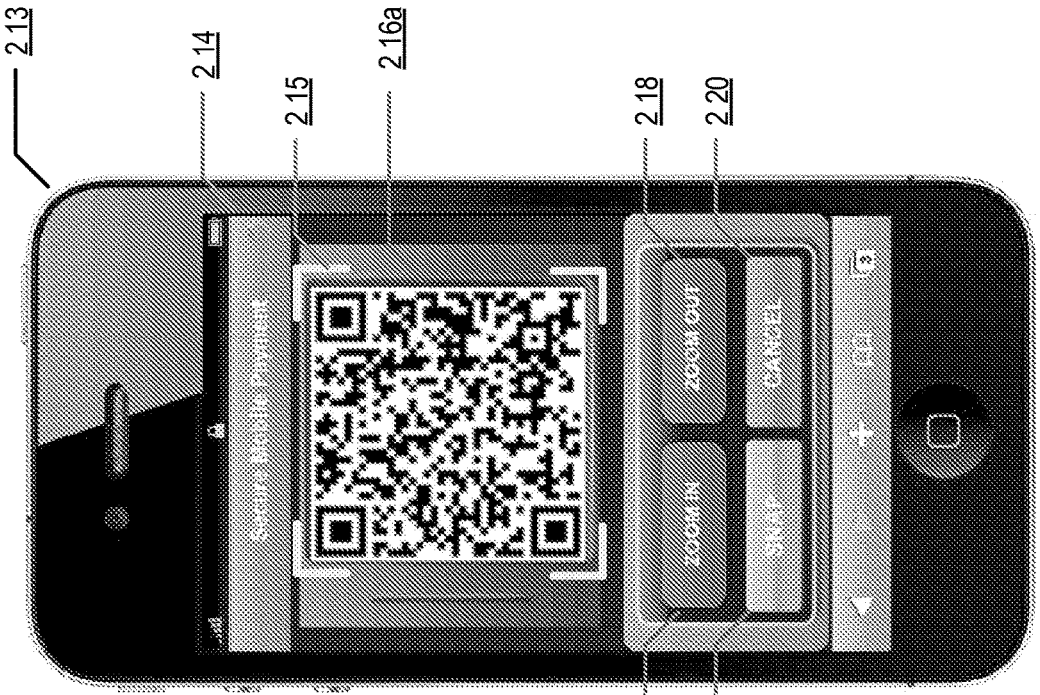

Example QR code data content 2 16b

```
<data>
    <merchant_id>AE783</merchant_id>
    <merchant_name>Acme, Inc.</merchant_name>
    <store_id>88234</store_id>
    <store_url>www.shop.acme.com</store_url>
    <terminal_id>userdevice1</terminal_id>
    <transaction_id>AFE1213344</transaction_id>
    <timestamp>2011-04-01:23:59:59</timestamp>
    <transaction_amount>$660.89</transaction_amount>
    <digital_sign>
        45e2085fa20496c91df574dc5652e145
    </digital_sign>
</data>
```

Example: Snap Mobile App Payment User Interface

FIGURE 2D

Example: Snap Mobile App Payment Web Receipt

Example: Snap Mobile App Payment Web Receipt

Example: One-Tap Mobile App: Payment Options

Example: One-Tap Mobile App - Payment Options on Website

Example: Snap mobile payment

Example: Snap Mobile Payment Execution ("SMPE") component 500

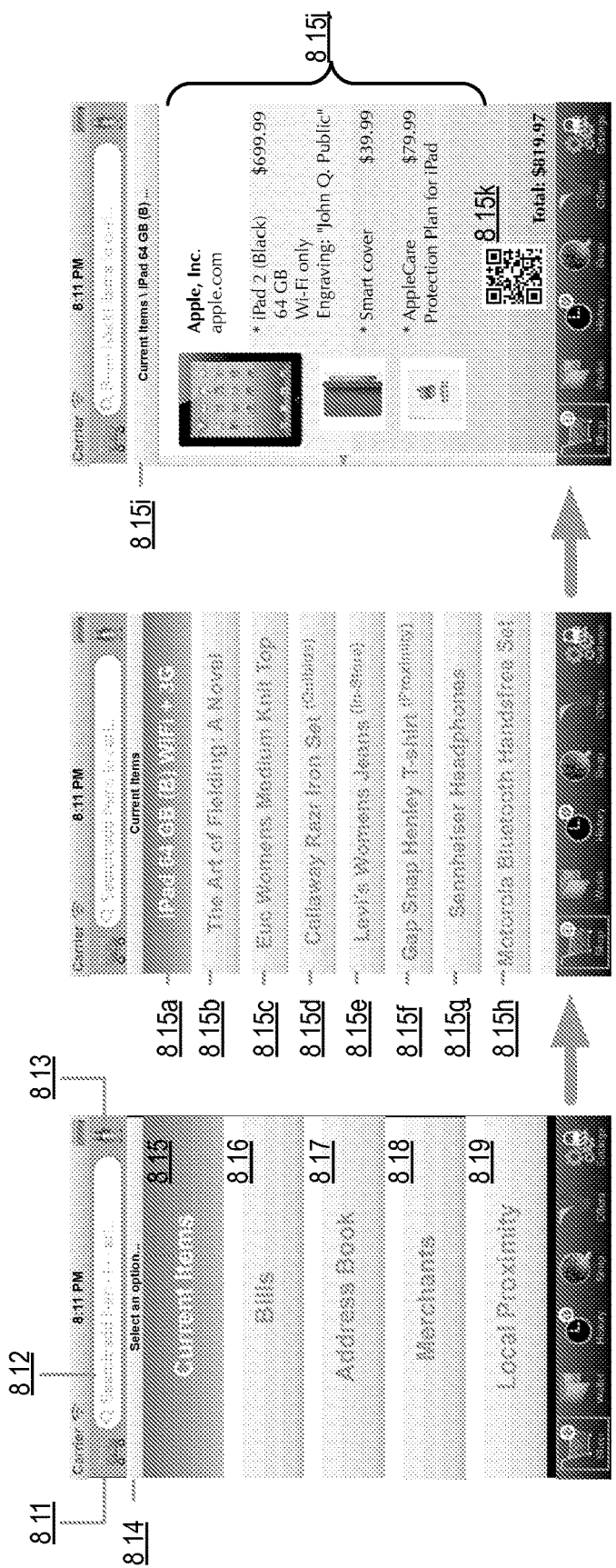
FIGURE 8A    Example: Virtual Wallet Mobile App - Shopping Mode

Example: Virtual Wallet Mobile App - Shopping Mode

Example: Virtual Wallet Mobile App - Shopping Mode

Example: Virtual Wallet Mobile App - Shopping Mode

Example: Virtual Wallet Mobile App - Payment Mode

Example: Virtual Wallet Mobile App

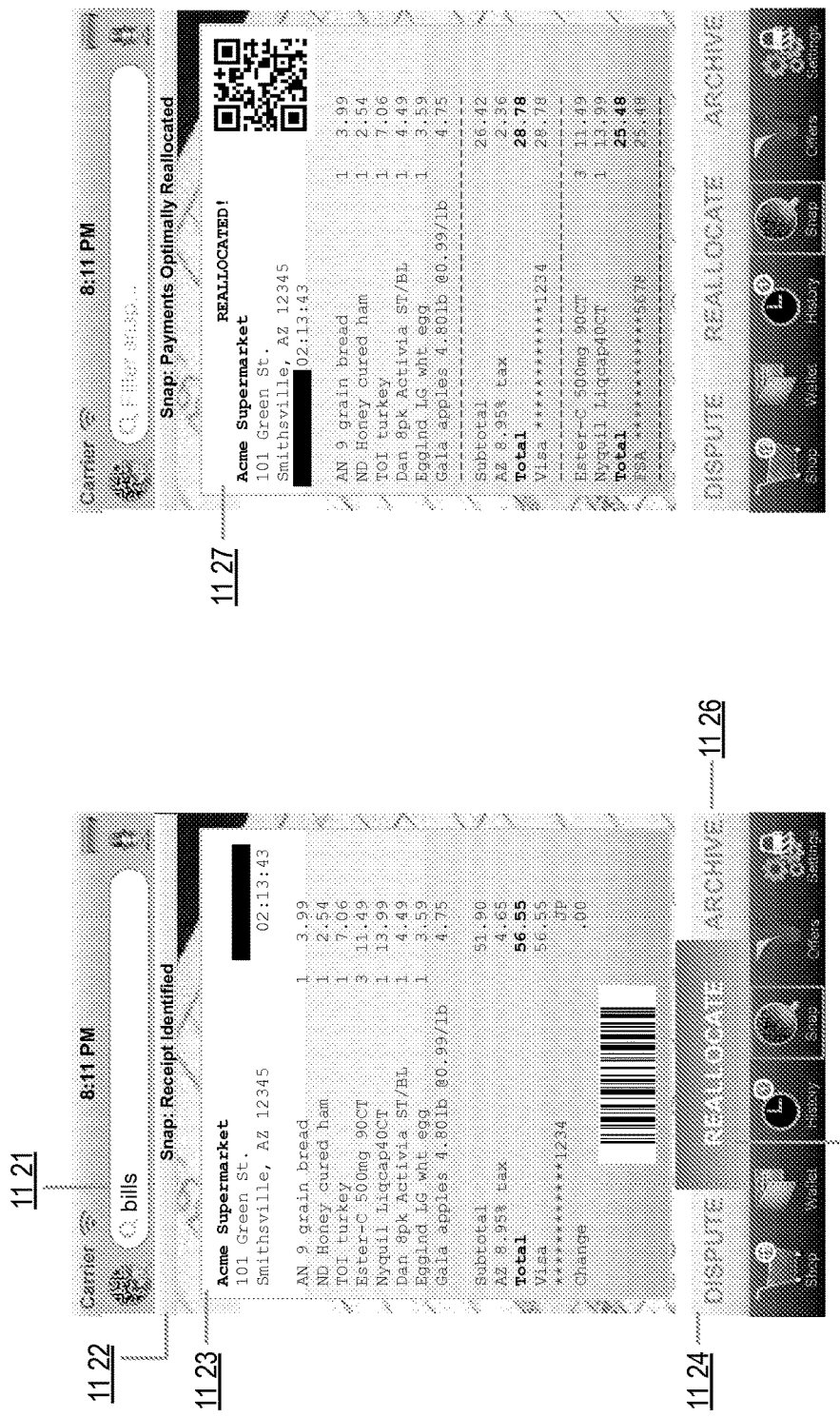
FIGURE 11B    Example: Virtual Wallet Mobile App - Snap Mode

Example: Virtual Wallet Mobile App - Snap Mode

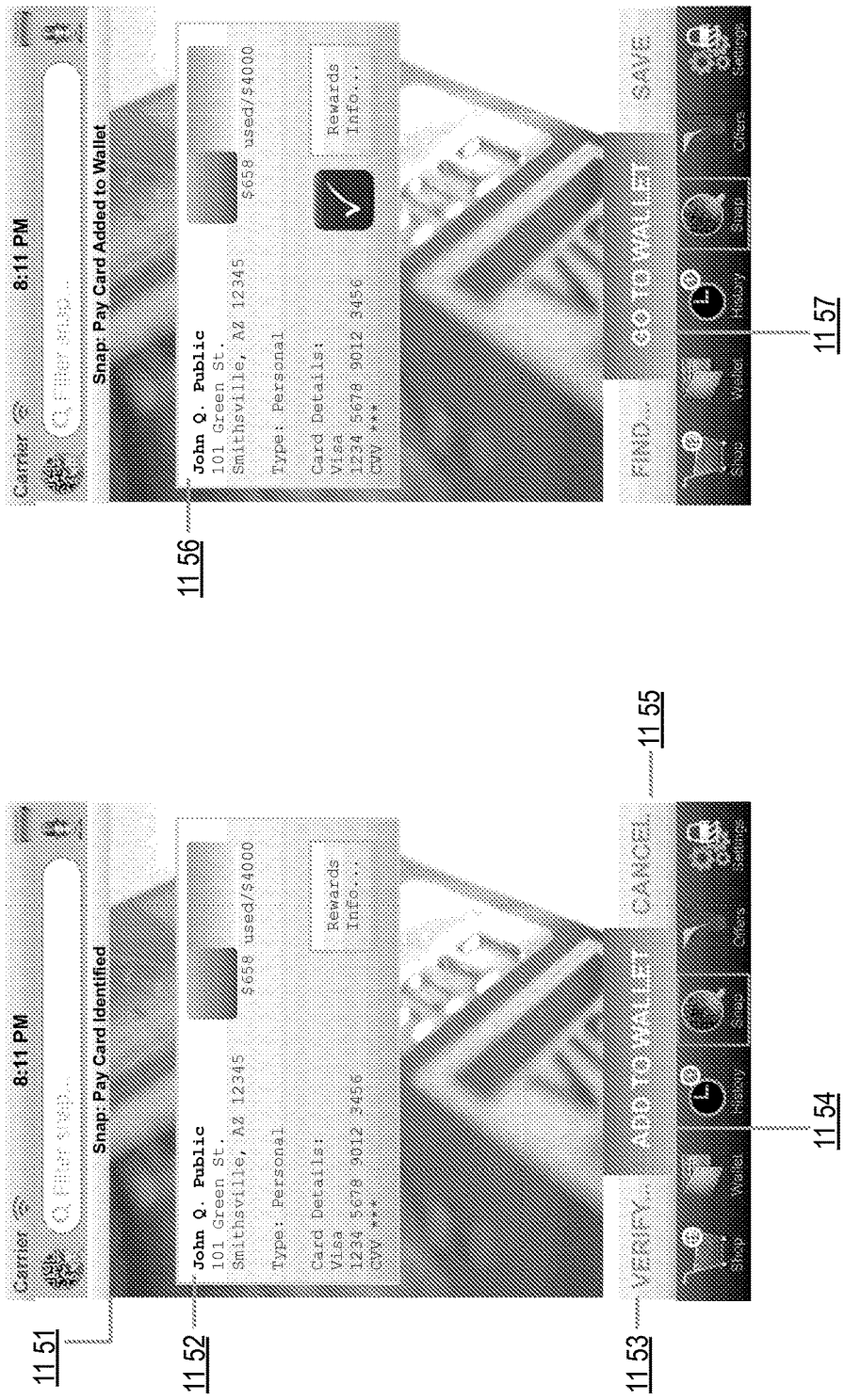
FIGURE 11E    Example: Virtual Wallet Mobile App - Snap Mode

SNAP MOBILE PAYMENT APPARATUSES, METHODS AND SYSTEMS

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

PRIORITY CLAIM

This application claims priority under 35 USC § 119 to: U.S. provisional patent application Ser. No. 61/985,213 filed Apr. 28, 2014, entitled "Automatic QR Code Generation Based on Consumer Location"; U.S. patent application Ser. No. 13/398,817 filed Feb. 16, 2012, entitled "Snap Mobile Payment Apparatuses, Methods And Systems"; U.S. provisional patent application Ser. No. 61/443,624 filed Feb. 16, 2011, entitled "MOBILE CAPTURE CHECKOUT APPARATUSES, METHODS AND SYSTEMS"; U.S. provisional patent application Ser. No. 61/512,248 filed Jul. 27, 2011, entitled "SNAP MOBILE PAYMENT APPARATUSES, METHODS AND SYSTEMS"; U.S. provisional patent application Ser. No. 61/522,213 filed Aug. 10, 2011, entitled "UNIVERSAL MOBILE PAYMENT PLATFORM APPARATUSES, METHODS AND SYSTEMS"; and U.S. provisional patent application Ser. No. 61/527,576 filed Aug. 25, 2011, entitled "SNAP MOBILE PAYMENT APPARATUSES, METHODS AND SYSTEMS". This application is a continuation-in-part of U.S. patent application Ser. No. 13/398,817 filed Feb. 16, 2012, entitled "Snap Mobile Payment Apparatuses, Methods And Systems." The entire contents of the aforementioned applications are expressly incorporated by reference herein.

FIELD

The present inventions are directed generally to apparatuses, methods, and systems for electronic purchase transactions, and more particularly, to SNAP MOBILE PAYMENT APPARATUSES, METHODS AND SYSTEMS ("SNAP").

BACKGROUND

Consumer transactions typically require a customer to select a product from a store shelf or website, and then to check the out at a checkout counter or webpage. Product information is typically selected from a webpage catalog or entered into a point-of-sale terminal device, or the information is automatically entered by scanning an item barcode with an integrated barcode scanner, and the customer is usually provided with a number of payment options, such as cash, check, credit card or debit card. Once payment is made and approved, the point-of-sale terminal memorializes the transaction in the merchant's computer system, and a receipt is generated indicating the satisfactory consummation of the transaction.

Moreover, a consumer can use a mobile device to provide payment information to a merchant. An access device such as a retail POS can receive payment information, such as a payment token, from a mobile device for a transaction. However, value added services (VAS) data, such as loyalty programs or coupons, rely on non-payment data that is generally provided separately (e.g., by providing a separate loyalty card, scanning a coupon code, manually entering data, etc.). This may require users to manage many different cards, coupons, and other devices when making purchases.

SUMMARY

One embodiment of the invention is directed to a system and method of providing payment information and VAS data based on location. For example, a system and method can comprise receiving a request for payment information. A location can be determined, and a merchant associated with the location can also be determined. Payment information and/or VAS data can be selected based on the merchant and/or location, and can be provided for a payment transaction.

As another example, a snap payment computer-implemented system and method can include determining, by the mobile device, a location of a consumer and automatically selecting a payment identifier and at least one non-payment identifier based on the location. A QR code is generated based on the payment identifier and the at least one non-payment identifier. The QR code is provided for payment processing.

As yet another example, a snap payment computer-implemented system and method can include obtaining, at a mobile user device, a user input to initiate a purchase transaction. An image frame operatively connected to the user device identifies a payment code depicted within the acquired image frame. Through the mobile user device, a purchase transaction request is generated using the identified payment code. The purchase transaction request is generated for payment processing and a purchase receipt is obtained for the purchase transaction. Also, the mobile device can determine a location of a consumer and automatically select a payment identifier and at least one non-payment identifier based on the location. A QR code is generated based on the payment identifier and the at least one non-payment identifier. The QR code is provided for payment processing.

BRIEF DESCRIPTION OF THE DRAWINGS

The accompanying appendices and/or drawings illustrate various non-limiting, example, inventive aspects in accordance with the present disclosure:

FIGS. 1A-F show block diagrams illustrating example aspects of a snap mobile payment-based purchase transaction in some embodiments of the SNAP;

FIGS. 2A-F shows application user interface diagrams illustrating example features of a snap mobile payment app facilitating snap mobile payment in some embodiments of the SNAP;

FIGS. 8A-G show user interface diagrams illustrating example features of virtual wallet applications in a shopping mode, in some embodiments of the SNAP;

FIGS. 11A-F show user interface diagrams illustrating example features of virtual wallet applications in a snap mode, in some embodiments of the SNAP;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

SNAP Mobile Payment (SNAP)

Figure 1A:
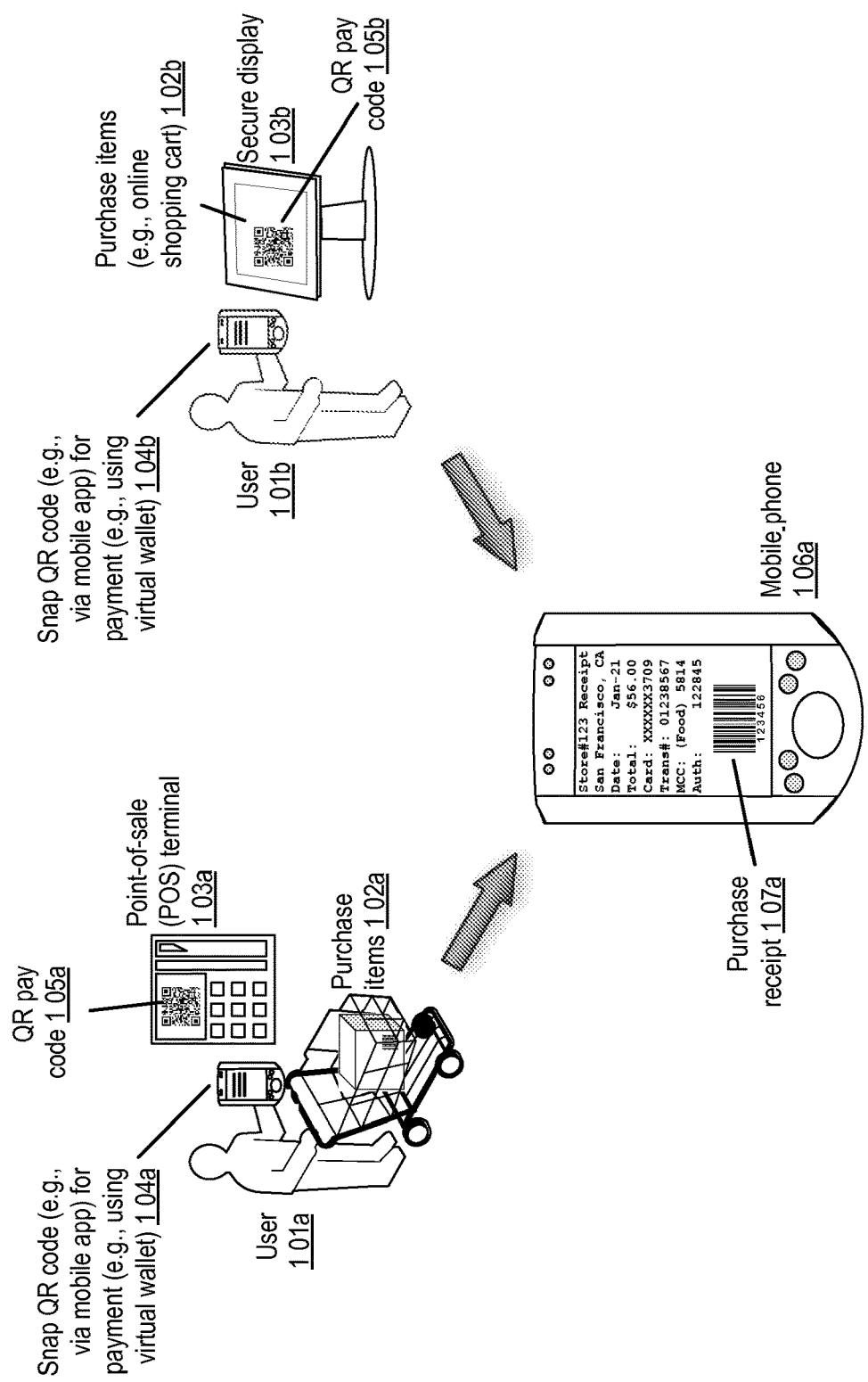

The SNAP MOBILE PAYMENT APPARATUSES, METHODS AND SYSTEMS (hereinafter "SNAP") transform real-time-generated merchant-product Quick Response codes, via SNAP components, into virtual wallet card-based transaction purchase notifications. FIGS. 1A-F show block diagrams illustrating example aspects of a snap mobile payment-based purchase transaction in some embodiments of the SNAP. With reference to FIG. 1A, in some implementations, a user, e.g., 101a-b, may wish to purchase products at a merchant store, e.g., 103a, or at a merchant website, e.g., 103b. For example, at a merchant store, the user may scan barcodes for a number of products, e.g., iota, at a point-of-sale ("POS") terminal in the store, e.g., 103a, and then indicate that the user wishes to checkout the scanned items. In some implementations, the POS terminal may generate a Quick Response ("QR") code, e.g., 105a, including information on the scanned product items, as well as merchant information for processing the purchase transaction via a payment network. The user may capture an image of the QR code generated by the POS terminal using a user device, such as a smartphone. For example, the user device may have executing on it an app for snapping the merchant-product QR code. The user device may utilize the information extracted from the QR code, along with information on a virtual wallet tied to the user device to initiate a purchase transaction. For example, the user device may utilize the product and merchant information extracted from the QR code, and financial payment information from the virtual wallet, to create a purchase transaction request, and submit the request to a payment network (e.g., credit card processing network).

In some implementations, the user device may utilize methods alternative to capture of a QR code to obtain information from the POS terminal. For example, the POS terminal may communicate the information required for submitting a purchase transaction request to a payment network to user device via Bluetooth™, Wi-Fi, SMS, text message, electronic mail, and/or other communication methods.

In some implementations, a user 101b may wish to checkout items stored in a virtual shopping cart on an online shopping website, e.g., 102b. For example, the user may be viewing the website using a secure display (e.g., that is part of a trusted computing device of the user). Upon indicating that the user wishes to checkout the items in the virtual shopping cart, the website may provide a QR code including information on the products in the virtual shopping cart and merchant information. For example, in the scenario where the user utilizes a secure display, the QR code may be displayed at a random position within the secure display for security purposes. The user may capture a snapshot of the displayed QR code, and utilize payment information from the virtual wallet associated with the user device to create a purchase transaction request for processing by the payment network. Upon completion of the purchase transaction, the payment network may provide a purchase receipt, e.g., 107 directly to the user device 106, the POS terminal in the store and/or the secure display (for the secure online shopping scenario) as confirmation of completion of transaction processing. Thus, in some implementations, the merchant may be shielded from obtaining personal and/or private information of the user while processing the purchase transaction, while ensuring integrity of the user's virtual wallet using a secure display for presenting the merchant-product QR code.

In various implementations, such payment processing may be utilized for a wide variety of transactions. For example, a user dining at a restaurant may obtain a bill including a QR pay code including detail on the dining charges included in the bill, and a merchant ID for the restaurant. The user may take a snapshot of the restaurant bill using the user's smartphone, and utilize the user's virtual wallet to pay for the restaurant bill, without revealing any financial or personal information about the user to the restaurant.

With reference to FIG. 1B, in some implementations, e.g., 110, a user 111 may wish to checkout items stored in a (virtual) shopping cart in a (online) shopping store, e.g., 112, using a reverse snap mobile payment procedure. For example, the user may be viewing the website using a secure display that is part of a trusted computing device of the user, e.g., 113, or via a POS terminal in a brick-and-mortar store. Upon indicating that the user wishes to checkout the items in the virtual shopping cart, the user may generate, e.g., 114, a QR code 115b via a mobile app on the user's mobile device including information on the user payment methods, offers, rewards, and/or other aspects connected to the user's virtual wallet. The user may provide the QR code displayed on the user's mobile device to a webcam (or other QR code capture device and/or mechanism) installed on the trusted computing device (or POS terminal). The user's trusted computing device or POS terminal may obtain a snapshot of the QR code generated by the user's mobile device, e.g., 116, and utilize payment information from QR code generated by the user to create a purchase transaction request for processing by the payment network. Upon completion of the purchase transaction, the payment network may provide a purchase receipt directly to the user mobile device, the POS terminal in the store and/or the secure display (for the online shopping scenario) as confirmation of completion of transaction processing. Thus, in some implementations, the user may be able to utilize a QR code generated by the user's mobile device as a replacement for a plastic payment card (e.g., credit, debit, prepaid card), or as a substitute for other financial information transport mechanisms such as near-field communications, Bluetooth®, etc. In some implementations, the QR code may be representative of a one-time anonymized credit card number (e.g., see the description associated with FIG. 3B).

In some implementations, a first user 121b may desire to pay a second user 121a an amount of money (or a value equivalent, e.g., virtual currency, alternate real currency, rewards, miles, points, etc.), e.g., P2P snap mobile payment 120. The second user 121a may generate a limited-time-validity QR code, e.g., 122, including information on the amount of money to be transferred, as well as a privacy token/alias linked to a financial account of the second user. The second user may display the QR code generated to the first user (e.g., by holding the second user's mobile phone displaying the QR code to the first user; sending the QR code by email, social network message, tweet, etc.). The first user may take a snapshot of the QR code using the first user's mobile phone, e.g., 123, and utilize the amount of money, the second user's privacy token/alias linking to a financial account, and the first user's virtual wallet linked to the first user's mobile phone, to generate a purchase transaction request for processing by the payment network. Upon completion of the transaction, the payment network may provide transaction notification receipts to the users who are parties to the transaction. In alternate implementations, the two users may share the data encoded in the QR code via methods alternate to the QR code, including but not limited to: near-field communications (NFC), Wi-Fi™, Bluetooth™, cellular network, SMS, email, text messages and/or the other communication protocols.

In general, it is to be understood that such tokens, alias and/or handles may be advantageously utilized in various implementations of snap mobile payment. For example, a user wishing to engage in reverse snap mobile payment procedure (see, e.g., FIG. 1B, element 110) may generate a QR code embodying information on a handle pointing to financial payment information stored on a server of a payment network system. For example, some implementations of snap mobile payment may utilize, to generate and/or process handles, a payment tokenization procedure similar to that described in U.S. application Ser. No. 13/153,301, titled "Payment tokenization apparatuses, methods and systems," the entire contents of which are expressly incorporated by reference herein. Further, in some implementations, the handle may encode information according to a compact messaging protocol, such as described in U.S. Pat. No. 6,837,425, titled "Compact protocol and solution for substantially offline messaging between portable consumer device and based device," the entire contents of which are expressly incorporated by reference herein. In some reverse snap mobile implementations, the user may provide the QR code embodying the handle and displayed on the user's mobile device to a webcam (or other QR code capture device and/or mechanism) installed on the trusted computing device (or POS terminal). The user's trusted computing device or POS terminal may obtain a snapshot of the QR code generated by the user's mobile device, e.g., 116, and provide the handle extracted from the QR code to a merchant server for purchase transaction request processing by the payment network. The merchant server may generate a card authorization request (such as described further below in the discussion with reference to FIG. 4A) for processing the purchase transaction using the handle, and may provide the card authorization request to a payment network. Upon completion of the purchase transaction, the payment network may provide a purchase receipt directly to the user mobile device, the POS terminal in the store, and/or the secure display (e.g., for the online shopping scenario) as confirmation of completion of transaction processing using the handle.

In some implementations, a user alert mechanism may be built into the snap mobile payment purchase transaction process flow. For example, in some implementations, a merchant server may embed a URL specific to the transaction into the card authorization request. For example, in some implementations, a POS terminal, remote device and/or desktop computer may embed the URL into optional level 3 data in the card authorization request. The URL may point to a webpage stored on the merchant's server dedicated to the transaction that is the subject of the card authorization request. For example, the webpage pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network. In some implementations, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like.

In some implementations, a number of users may engage in group pay via snap mobile payment to split a tender, e.g., 130. In some implementations, one of the users 131a may obtain a snapshot, e.g., 132, of a QR pay code, e.g., 134, generated at a POS terminal (or, e.g., presented on paper such as a dining bill), e.g., 133. The user may in turn generate a QR split pay code, embodying information on the amounts that the tender has been split into. The user 131a may present the split tender QR code 135 to the other users 131b-c, who may obtain snapshots of the split tender QR code, e.g., 136. In some implementations, the users 131b-c may be reimbursing the user 131a for payment of the original QR code via the payment network, or the users 131b-c may be making direct payments via the split tender QR code to the merchant (e.g., when the user 131a took a snapshot of the merchant's QR code, no payment processing occurred immediately). In some implementations, the merchant may directly provide a split tender QR code for the users 131a-c.

In some implementations, group mobile payment may be implemented, instead of utilizing QR codes, via use of an alternate communication mechanism. For example, in some implementations, the POS terminal 133 may utilize a communication protocol such as Bluetooth™ to communicate with the users 131*a-c*. The POS terminal may, serially or in parallel, establish separate communication sessions with each of the users. Via the separate communication sessions that POS terminal may transmit the product and/or merchant data required by the users' devices to generate individual purchase transaction processing requests. Thus, via the separate communication sessions, the POS terminal may split the group tender associated with the users 131*a-c* into individual payment amounts.

Figure 1C:
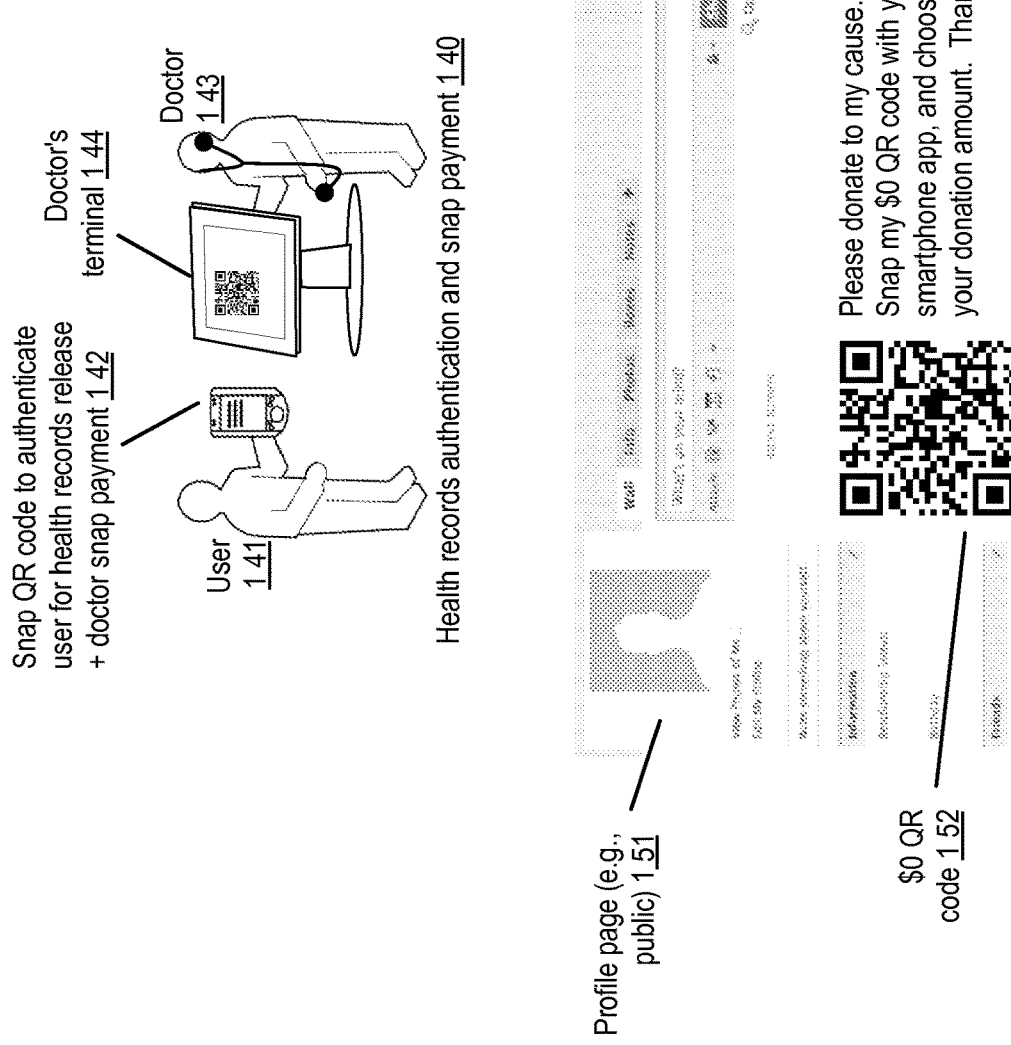
Figure 1D:
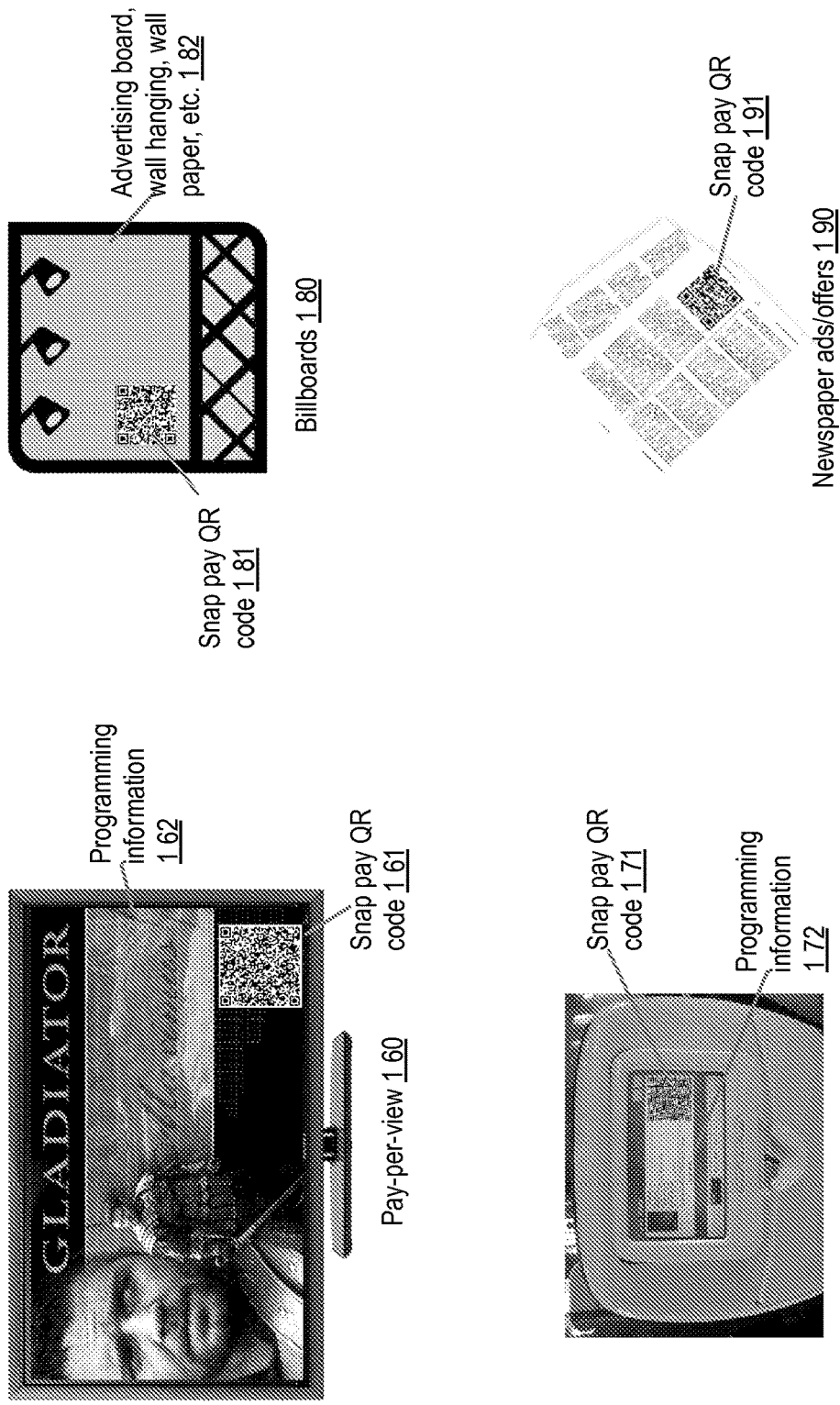

With reference to FIG. 1C, in some implementations, snap mobile payment methods may be utilized for authentication/verification purposes, and for providing digital consent for disclosure of personal and/or private information. For example, a user 142 visiting his/her doctor 143 may be required to provide informed consent to disclosing personal information (e.g., medical records) to the doctor. The doctor's terminal may generate a QR code embodying the doctor's digital certificate as well as information on the type/content of medical records of the user that are requested, e.g., 144. The user may snap the QR code via the user's mobile device. The user's mobile device may generate a request for records release according to the QR code, and also serve as verification that the request is obtained from a personal trusted device (e.g., the user's mobile device). In alternate implementations, the user may be able to select the personal information that the user would like to reveal to the healthcare provider, and the user's mobile device may generate a QR code for the doctor's terminal to obtain a snapshot for retrieving the user's medical information. In some implementations, the QR code may also include payment information (e.g., the user's pay account information, or the doctor's acquirer information) along with the information on controlled release of personal information.

In some implementations, the SNAP may facilitate P2P transactions via pre-filled, modifiable QR payment codes, e.g., 150. For example, a first user having a public profile page, e.g., 151, may place an image of a QR code in the public profile, e.g., 152. For example, the QR code may include a predetermined payment amount for a purchase transaction initiated by capturing a snapshot of the QR code. In some implementations, the predetermined amount may be $0 (e.g., a $0 QR pay code). A second user may capture a snapshot of the QR pay code using a mobile device, and may set an amount that the second user would like to pay the first user via the second user's mobile device. The second user's mobile device may provide the information encoded within the QR code along with the second-user-chosen payment amount to a payment network for transaction processing.

It is to be understood that the various aspects described herein of snap mobile payment may be utilized for any controlled exchange of information and/or payment. For example, with reference to FIG. 1D, in some implementations, a user may obtain pay-per-view programming via snap mobile payment, e.g., 160. For example, a television display may provide an advertisement including programming information, e.g., 162, as well as a QR pay code for obtain the programming content, e.g., 161. The QR code may include information identifying the programming information, as well as information identifying the television subscriber account information, television machine address, and/or the like. The user may obtain a snapshot of the QR code, and provide the information embodied in the QR code along with information from the user's mobile device (e.g., subscriber account number linked to the user's virtual wallet, pay account information, and/or the like). Upon processing of the payment information by the payment network, the payment network may provide an indication to the television-programming provider of the payment completion, and the television-programming provider may stream the programming content to the user's television. As another example, a similar flow may be utilized for in-flight entertainment, e.g., 170, wherein an in-flight screen may provide programming information 172, as well as a QR pay code 171 for the user to snap for in-flight entertainment initiation. As another example, a billboard, wall hanging, poster, in-store advertisement, hoarding, etc., e.g., 180, may include an offer for a product/service, and a QR code including merchant information and product information identifying a purchase amount, and/or the like. The user may snap the QR code with the user's mobile device linked to the user's virtual wallet to purchase the product and/or service, and, if applicable, the product may be directly shipped to the user's address as specified by the purchase information exchanged with the payment network as part of the purchase request sent by the user's mobile device. As another example, newspapers, e.g., 185, may include offers, advertisements, job postings, and/or the like including QR codes, e.g., 186, embodying the information necessary for the user to initiate a purchase transaction with the payment network. It is to be understood that any aspects of implementing snap mobile payment discussed in any of the implementations herein, and/or their equivalents, may be utilized in any other implementations discussed herein, and/or their equivalents.

Figure 1E:
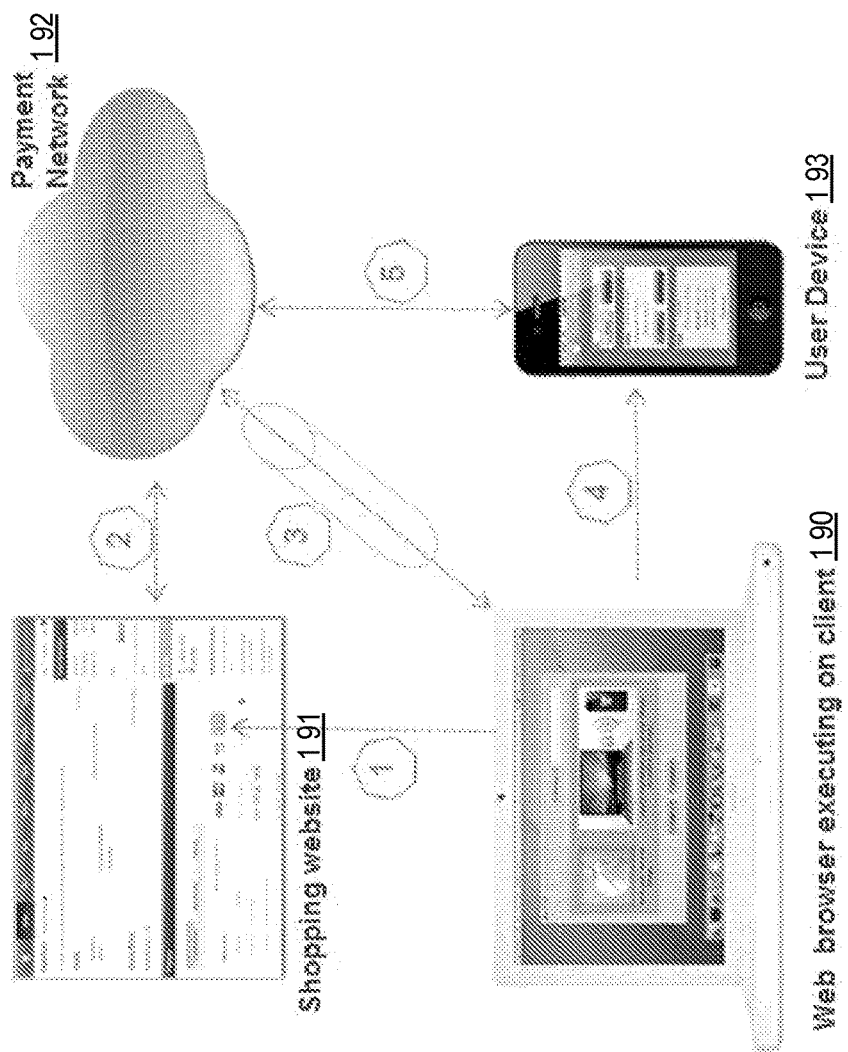

With references to FIGS. 1E-F, in some implementations, the data required for processing a purchase transaction may be provided via methods alternate to a QR code including, but not limited to: near-field communications (NFC), Wi-Fi™, Bluetooth™, cellular network, SMS, email, text messages and/or the other communication protocols. For example, in some implementations, a user shopping online via a web browser executing on a client device, e.g., 190, may desire to pay for a purchase of items from an online shopping website, e.g., 191. The website may include a user interface element that the user may activate to initiate shopping checkout and payment. Upon the user activating the user element, the client displaying the online shopping website may provide a message to a server of the merchant to initiate secure purchase transaction processing. The server of the merchant operating the online shopping website may establish a secure connection (e.g., a Secure Sockets Layer connection) to a pay network server of a payment network, e.g., 192. Also, the pay network server may establish a secure connection to the client. For example, the client may include a secure I/O chip that only allows secure connections to be established by the client with pay network servers of the payment network. Via the secure connection, the pay network server may provide an instruction to the client to request the user to launch a virtual wallet mobile app on the user device of the user, see e.g., FIG. 1F, 196. The client may accordingly provide a request to the user to launch a virtual wallet mobile app on the user device, e.g., 193, of the user.

Upon the user launching the virtual wallet mobile app on the user device, the user device and the client may establish a secure connection with each other (e.g., via Bluetooth™, Wi-Fi, cellular, etc.) In some implementations, the client and user device may be preconfigured to rapidly establish the secure communication channel with each other. Via the secure communication channel, the client may provide data to the user's mobile device, or vice versa, to facilitate initiation of the purchase transaction. The virtual wallet app on the user's mobile device (or the client) may then generate a purchase transaction initiation message and provide it to the pay network server for processing the purchase transaction. Upon completion of transaction processing, the pay network server may provide a notification of payment completion to the client, e.g., FIG. 1F, 197, or to the user device.

Figure 2A:
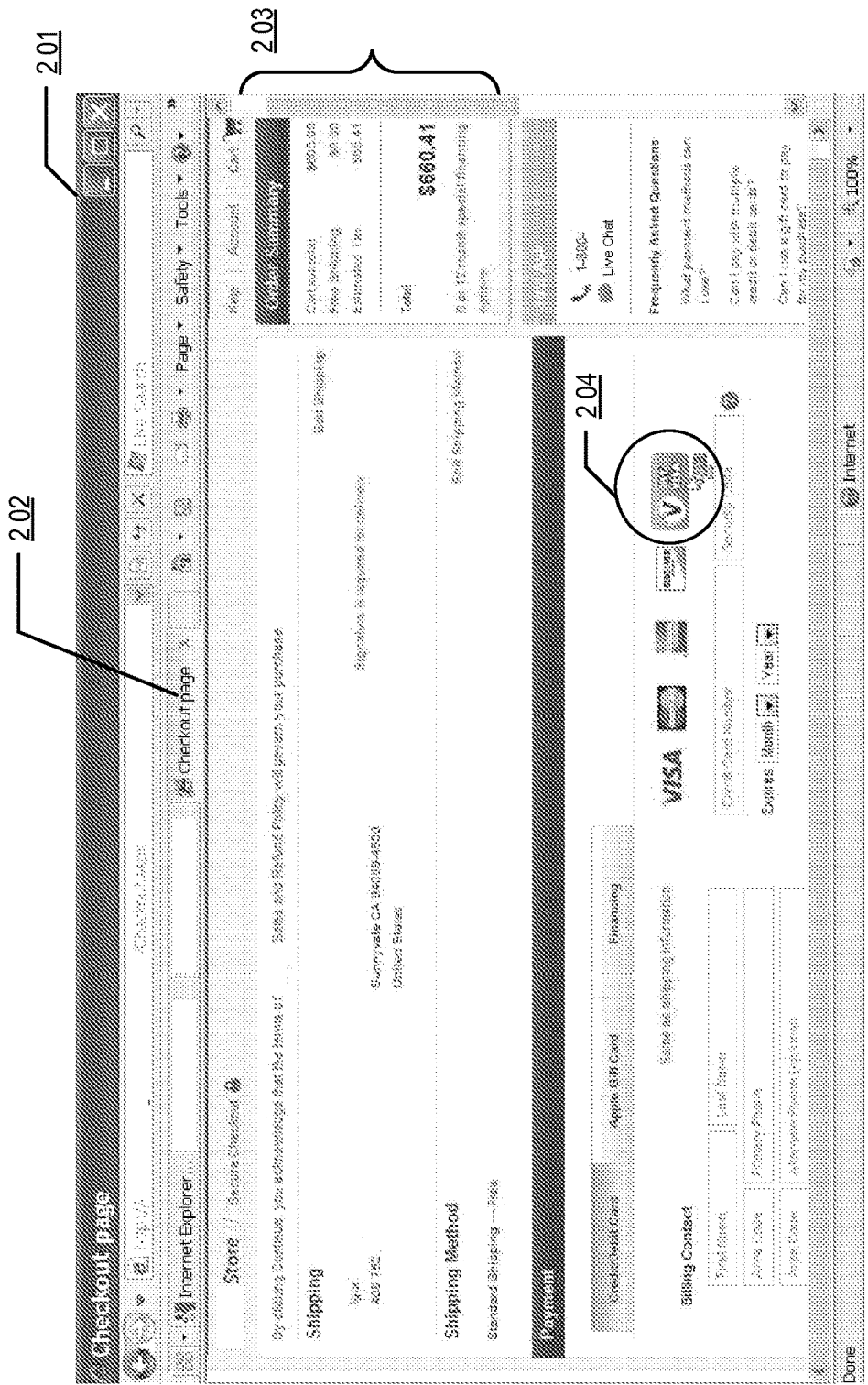

FIGS. 2A-F show application user interface diagrams illustrating example features of a snap mobile payment app facilitating snap mobile payment in some embodiments of the SNAP. With reference to FIG. 2A, in some implementations, a user may desire to checkout one or items stored in a virtual shopping cart of an online merchant website. For example, the user may be utilizing a browser application, e.g., 201, to visualize a checkout page of the merchant website, e.g., 202. The checkout webpage may depict details of the checkout order, e.g., 203, and may provide one or more options for the user to provide payment for the purchase of the store items. In some implementations, the checkout webpage may include an option to pay for the purchase using a snap mobile payment procedure, e.g., 204.

Figure 2B:
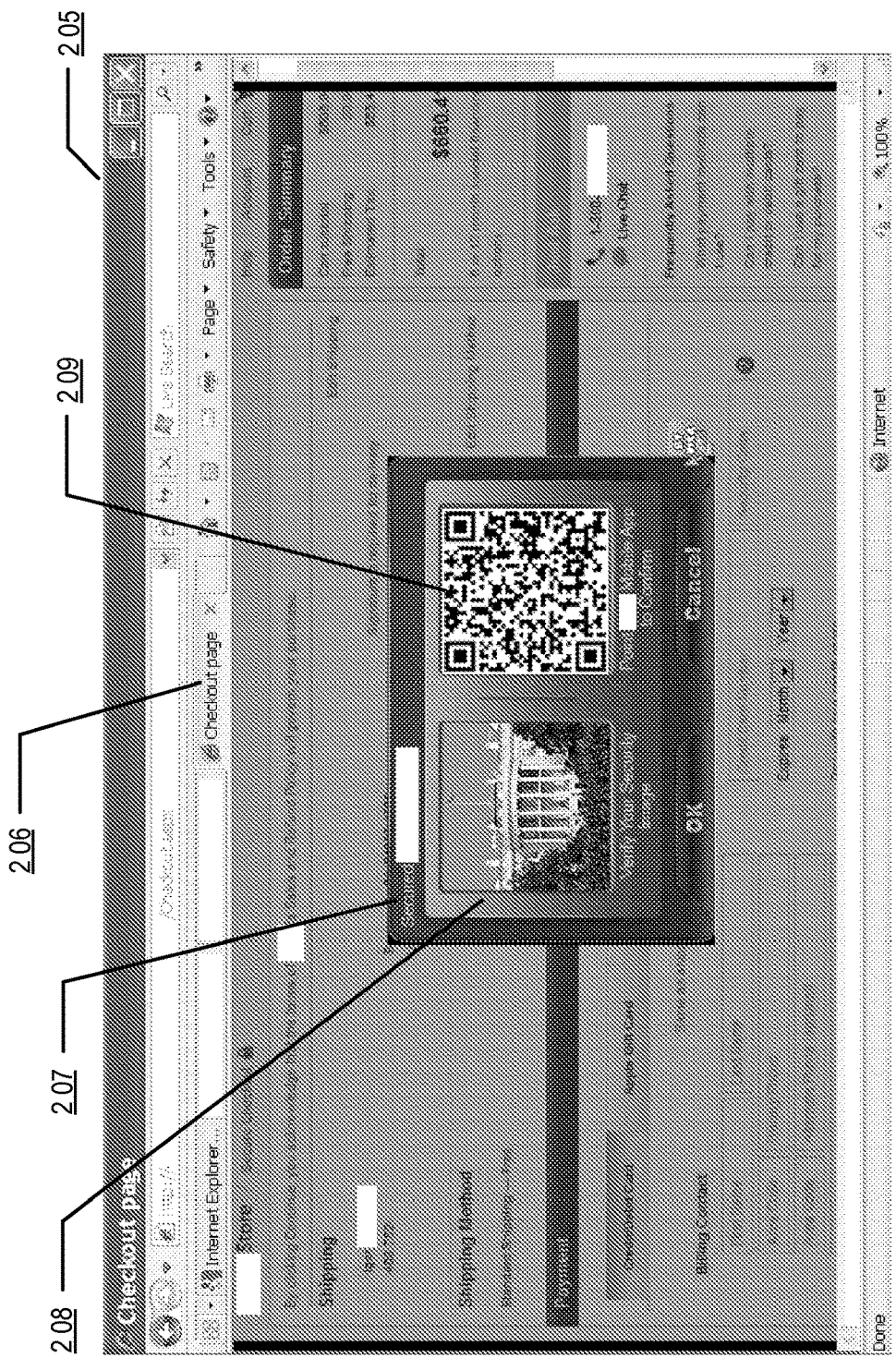

With reference to FIG. 2B, in some implementations, upon selecting the option to utilize the snap mobile payment procedure, the merchant checkout webpage, e.g., 206, may provide via the browser application 205, a QR code, e.g., 209, including information on the items in the virtual shopping cart as well as merchant information for the payment network to process the purchase transaction (e.g., a privacy token/alias linked to an acquirer financial account of the merchant). In some implementations, the webpage may be displayed via a secure display of a trusted computing device of the user. For example, as a security measure, the position of the QR code frame, e.g., 207, within the display may be randomly varied to prevent a snapshot of the QR code from being obtained by fraudulent means (e.g., tampering with the trusted computing device). In some implementations, a security image, e.g., 208, pre-selected by the user may be displayed on the screen so that the user may verify as being accurate. In some implementations, the image may be encrypted by the SNAP before providing it to the trusted computing device. In some implementations, the trusted computing device may be the only device to hold a decryption key required to decrypt and successfully display the image on the secure display to the user.

Figure 2C:
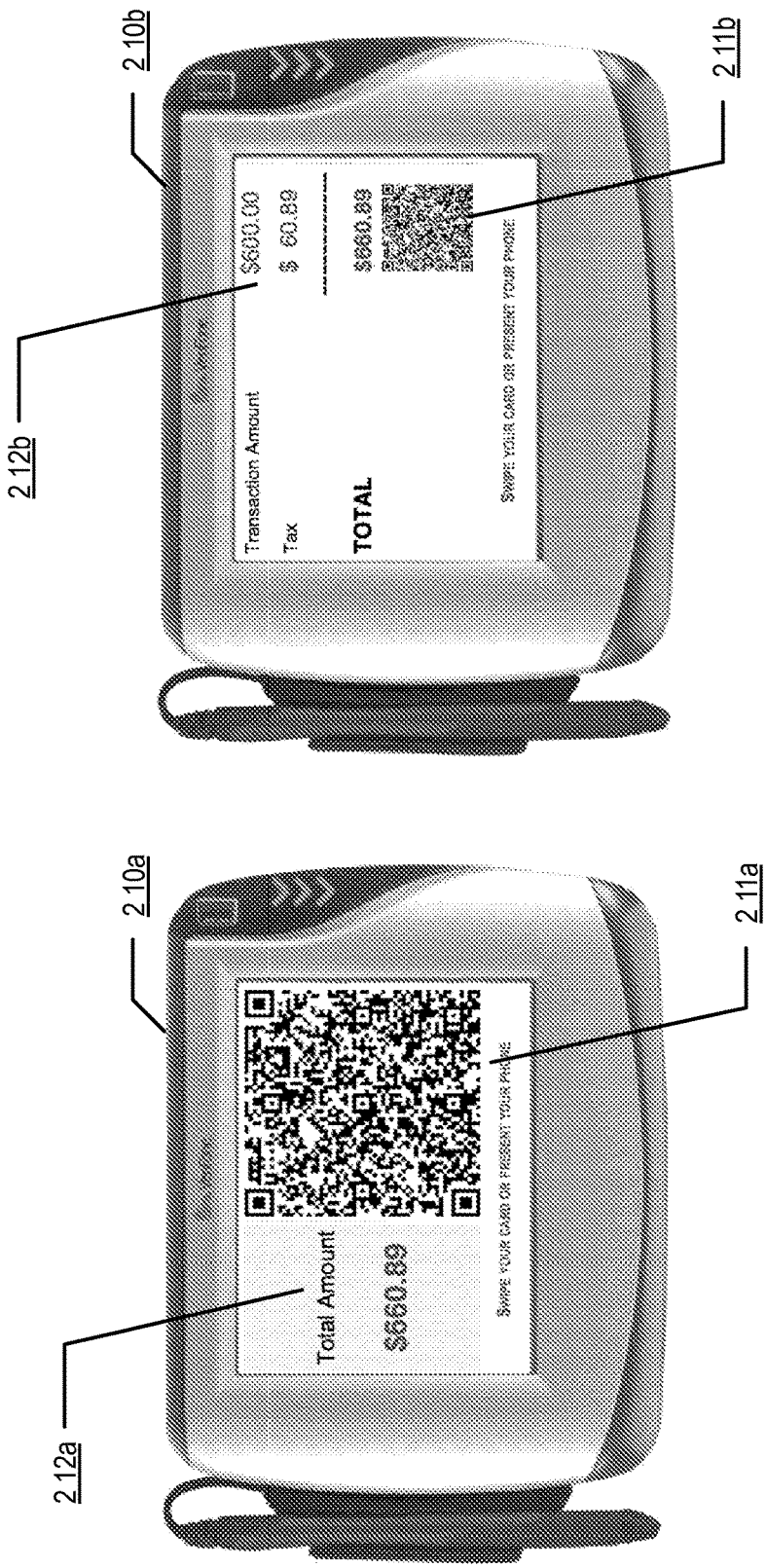

With reference to FIG. 2C, in some implementations, such merchant-product information embodying QR codes may be utilized by a point-of-sale ("POS") terminal, e.g., 210a-b. For example, in a brick-and-mortar store, the POS terminal may display a QR code, e.g., 211a-b, that includes the purchase payment amount, e.g., 212a-b, upon the user indicating that the user wishes to checkout the items in the user's physical shopping cart. For example, the QR code may include data formatted according to the extensible Markup Language ("XML"), such as the example data structure below:

```
<QR_data>
    <order_ID>4NFU4RG94</order_ID>
    <timestamp>2011-02-22 15:22:43</timestamp>
    <expiry_lapse>00:00:30</expiry_lapse>
    <transaction_cost>$34.78</transaction_cost>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <secure_element>www.merchant.com/securedyn/0394733/123.png</secure_element>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
<QR_data>
```

With reference to FIG. 2D, in some implementations, the user may obtain a snapshot of the QR code displayed on the screen of the secure display or the POS terminal using a smartphone, e.g., 213. For example, the user's smartphone may have an app, e.g., 214, executing on it to detect and capture QR codes, e.g., 216a. For example, the user may utilize registration features, e.g., 215, to align the QR code within the display of the smartphone. The app may, in some implementations, provide the user with the ability to zoom in, e.g., 217, or zoom out, e.g., 218, of the QR code to ensure that the image of the QR code fits within the dimensions of the screen of the smartphone. Upon aligning the QR code within the display of the smartphone, the user may be able to obtain a snapshot of the QR code using a user interface element, e.g., 219. The user may cancel the snap mobile payment procedure using a user interface element 220 on the display of the smartphone.

Figure 2E:
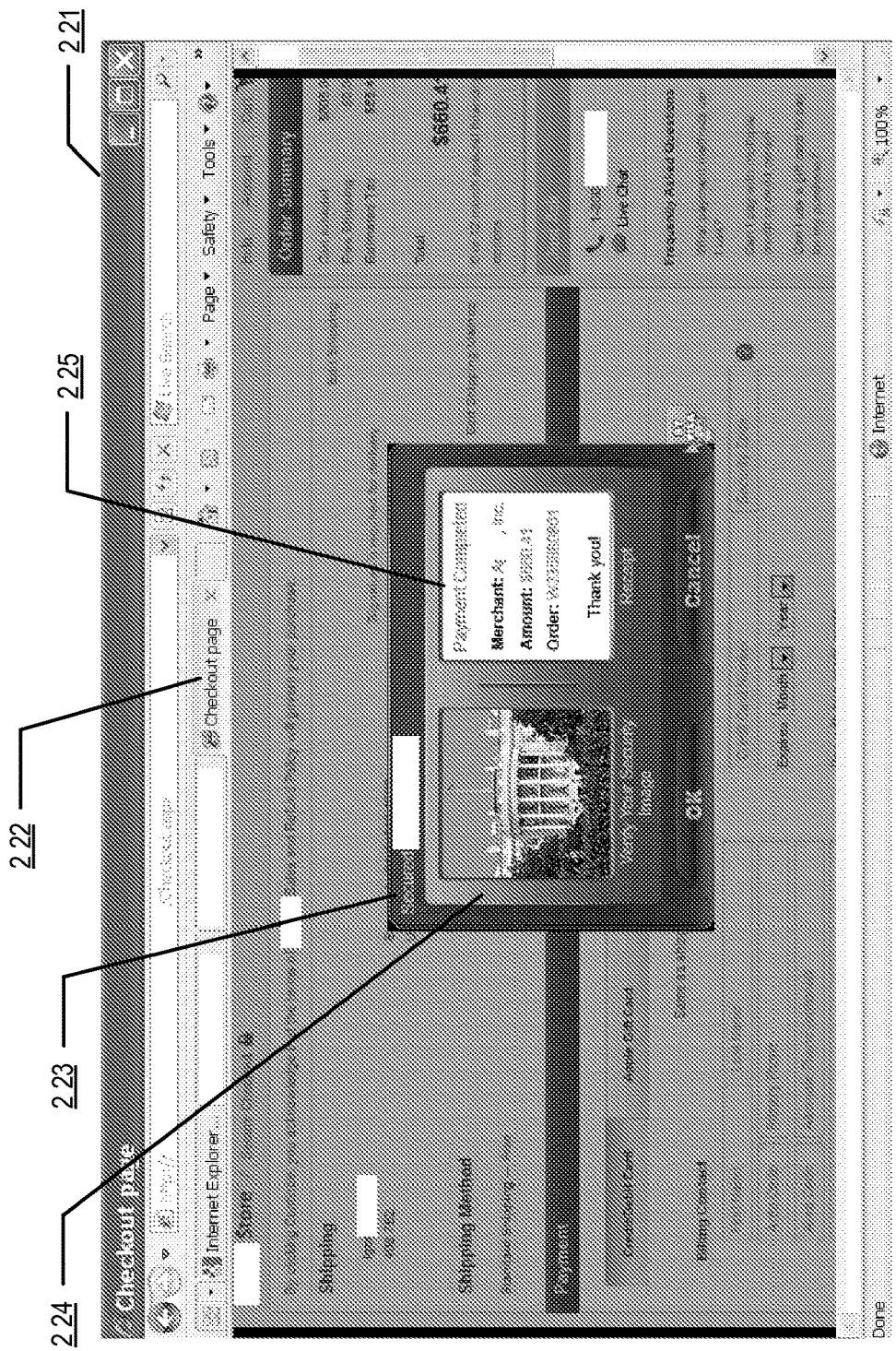
Figure 2F:
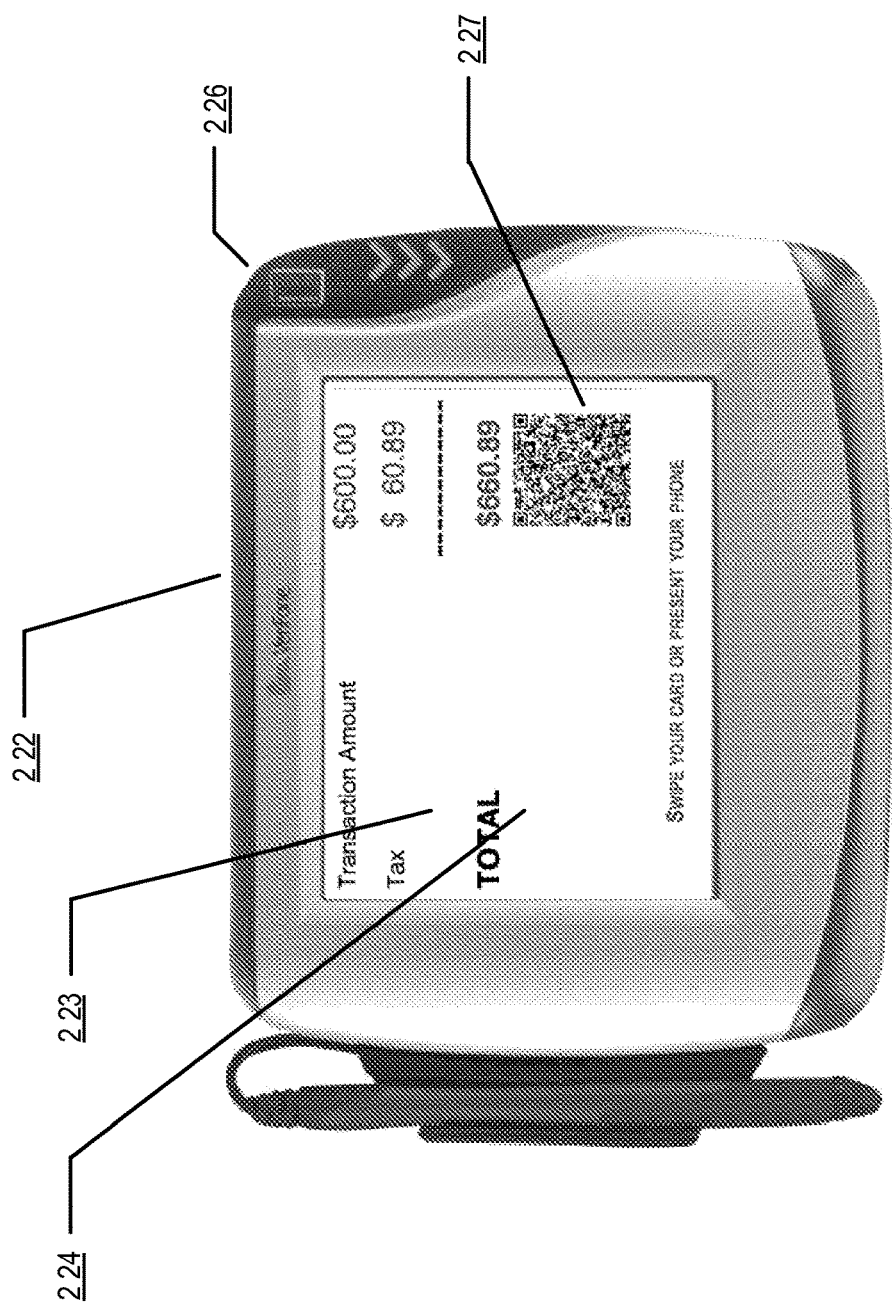

With reference to FIG. 2E, in some implementations, upon obtaining a snapshot of the merchant-product QR code, the user's smartphone may extract the product and merchant data stored within the QR code, and utilize an account for the user's virtual wallet linked to the user's smartphone to generate a purchase transaction request for processing by a payment network. Upon completion of processing of the payment transaction by the payment network using the information provided by the user's smartphone, the merchant website 222 (via the browser application 221) may provide a purchase receipt 225 for the user. With reference to FIG. 2F, in implementations where the user utilizes the snap mobile payment procedure at a brick-and-mortar store, the POS terminal may display a purchase receipt for the user. In some implementations, the payment network may provide a purchaser receipt directly to the smartphone of the user.

Figure 3A:
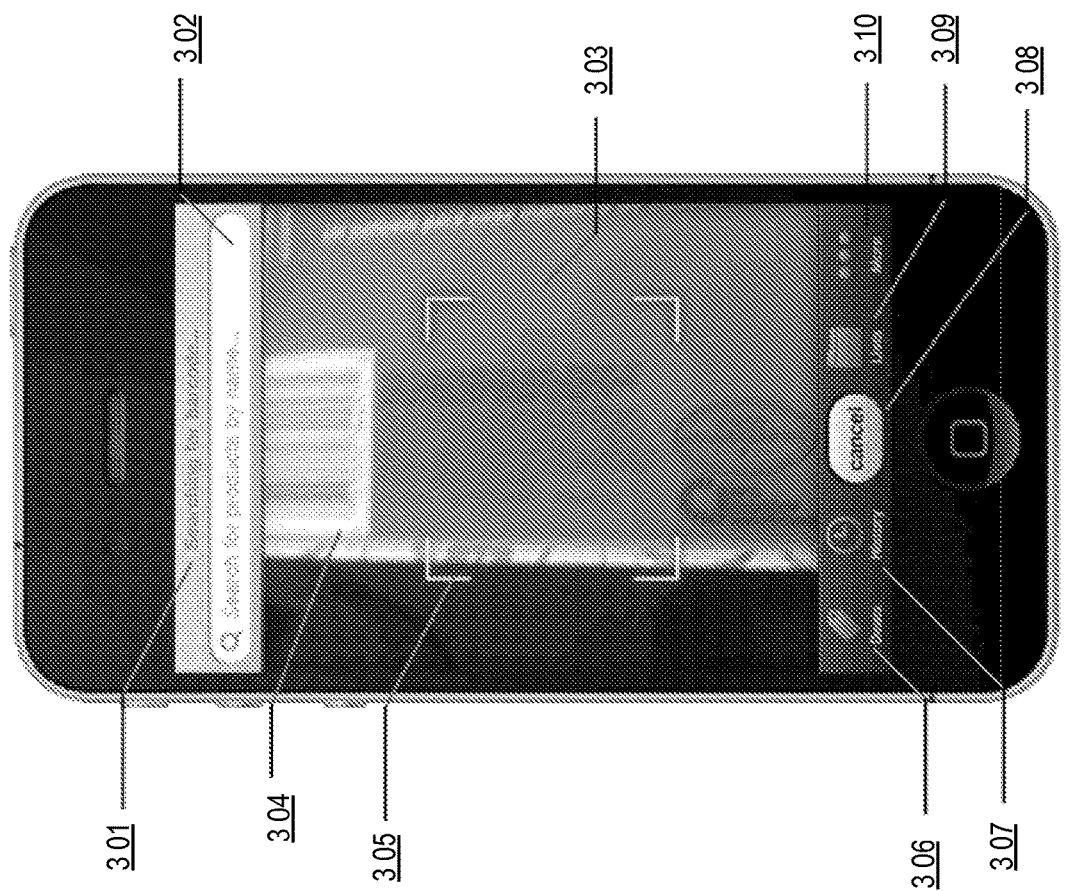
FIGS. 3A-E show application user interface diagrams illustrating example features of a snap mobile payment app for capturing product barcodes, securing user data and preventing fraud in some embodiments of the SNAP.

FIGS. 3A-E show application user interface diagrams illustrating example features of a snap mobile payment app for capturing product barcodes, securing user data and preventing fraud in some embodiments of the SNAP. With reference to FIG. 3A, in some implementations, the app executing on the device of the user may include an app interface providing various features for the user. In some implementations, the app may be configured to recognize product identifiers (e.g., barcodes, QR codes, etc.), e.g., 301. For example, the app may be configured to capture merchant-product QR codes for snap mobile payment processing, as discussed above with reference to FIGS. 2A-F. In some implementations, the user may be required to sign in to the app to enable its features. Once enabled, the camera may provide in-person one tap purchasing features for the user. For example, the client device may have a camera via which the app may acquire images, video data, streaming live video, and/or the like, e.g., 303. The app may be configured to analyze the incoming data, and search, e.g., 301, for a product identifier, e.g., 304, such as QR codes 209, 211a-b, 216a and 227. In some implementations, the app may overlay cross-hairs, target box, and/or like alignment reference markers, e.g., 305, so that a user may align the product identifier using the reference markers so facilitate product identifier recognition and interpretation. In some implementations, the app may include interface elements to allow the user to switch back and forth between the product identification mode and product offer interface display screens (see, e.g., 306), so that a user may accurately study deals available to the user before capturing a product identifier. In some implementations, the app may provide the user with the ability to view prior product identifier captures (see, e.g., 307) so that the user may be able to better decide which product identifier the user desires to capture. In some implementations, the user may desire to cancel product purchasing; the app may provide the user with a user interface element (e.g., 308) to cancel the product identifier recognition procedure and return to the prior interface screen the user was utilizing. In some implementations, the user may be provided with information about products, user settings, merchants, offers, etc. in list form (see, e.g., 309) so that the user may better understand the user's purchasing options. Various other features may be provided for in the app (see, e.g., 310).

Figure 3B:
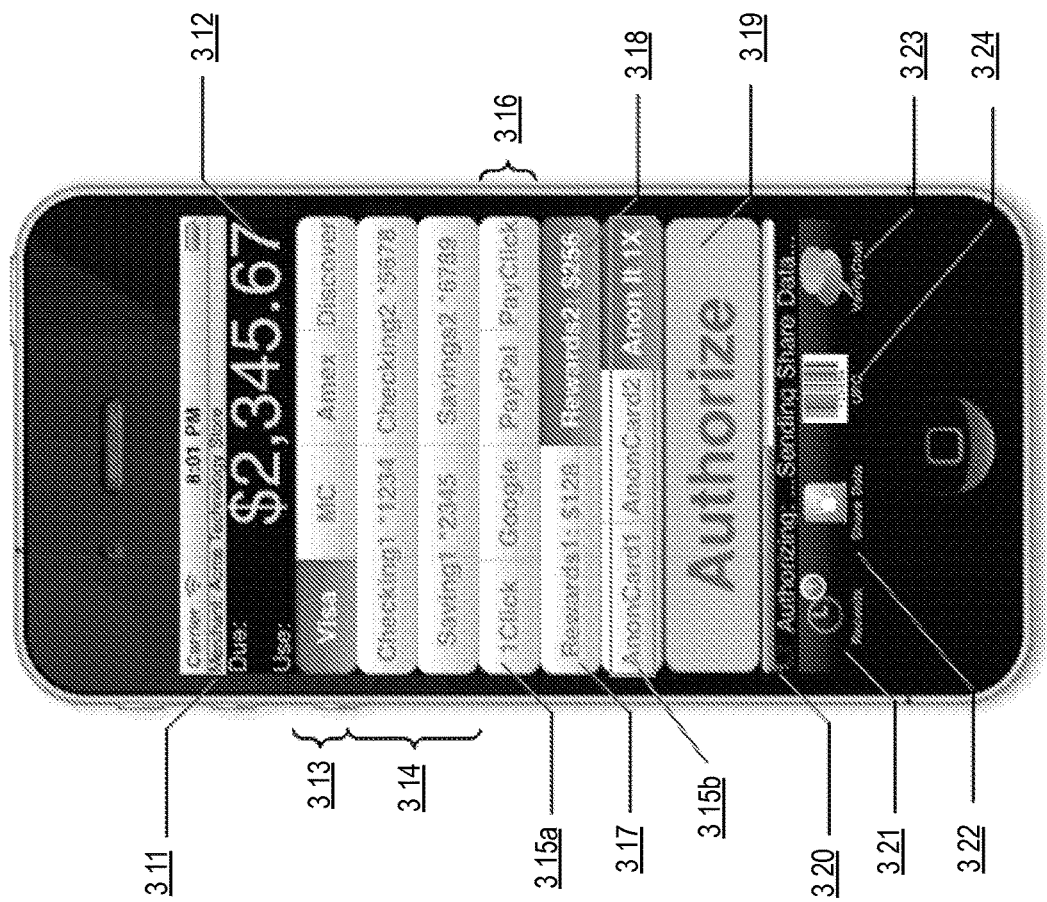

With reference to FIG. 3B, in some implementations, the app may include an indication of the location (e.g., name of the merchant store, geographical location, information about the aisle within the merchant store, etc.) of the user, e.g., 311. The app may provide an indication of a pay amount due for the purchase of the product, e.g., 312. In some implementations, the app may provide various options for the user to pay the amount for purchasing the product(s). For example, the app may utilize the GPS coordinates to determine the merchant store within the user is present, and direct the user to a website of the merchant. In some implementations, the SNAP may provide an API for participating merchants directly to facilitate transaction processing. In some implementations, a merchant-branded SNAP application may be developed with the SNAP functionality, which may directly connect the user into the merchant's transaction processing system. For example, the user may choose from a number of cards (e.g., credit cards, debit cards, prepaid cards, etc.) from various card providers, e.g., 313. In some implementations, the app may provide the user the option to pay the purchase amount using funds included in a bank account of the user, e.g., a checking, savings, money market, current account, etc., e.g., 314. In some implementations, the user may have set default options for which card, bank account, etc. to use for the purchase transactions via the app. In some implementations, such setting of default options may allow the user to initiate the purchase transaction via a single click, tap, swipe, and/or other remedial user input action, e.g., 315a. In some implementations, when the user utilizes such an option, the app may utilize the default settings of the user to initiate the purchase transaction. In some implementations, the app may allow the user to utilize other accounts (e.g., Google™ Checkout, Paypal™ account, etc.) to pay for the purchase transaction, e.g., 316. In some implementations, the app may allow the user to utilize rewards points, airline miles, hotel points, electronic coupons, printed coupons (e.g., by capturing the printed coupons similar to the product identifier) etc., to pay for the purchase transaction, e.g., 317-318. In some implementations, the app may provide an option to provide express authorization before initiating the purchase transaction, e.g., 319. In some implementations, the app may provide a progress indicator provide indication on the progress of the transaction after the user has selected an option to initiate the purchase transaction, e.g., 320. In some implementations, the app may provide the user with historical information on the user's prior purchases via the app, e.g., 321. In some implementations, the app may provide the user with an option to share information about the purchase (e.g., via email, SMS, wall posting on Facebook®, tweet on Twitter™, etc.) with other users and/or control information shared with the merchant, acquirer, payment network etc., to process the purchase transaction, e.g., 322. In some implementations the app may provide the user an option to display the product identification information captured by the client device (e.g., in order to show a customer service representative at the exit of a store the product information), e.g., 324. In some implementations, the user, app, device and or SNAP may encounter an error in the processing. In such scenarios, the user may be able to chat with a customer service representative (e.g., VerifyChat 323) to resolve the difficulties in the purchase transaction procedure.

In some implementations, the user may select to conduct the transaction using a one-time anonymized credit card number, see e.g., 315b. For example, the SNAP may utilize a pre-designated anonymized set of card details (see, e.g., "AnonCard1," "AnonCard2"). As another example, the SNAP may generate, e.g., in real-time, a one-time anonymous set of card details to securely complete the purchase transaction (e.g., "Anon It 1×"). In such implementations, the app may automatically set the user profile settings such that the any personal identifying information of the user will not be provided to the merchant and/or other entities. In some implementations, the user may be required to enter a user name and password to enable the anonymization features.

Figure 3C:
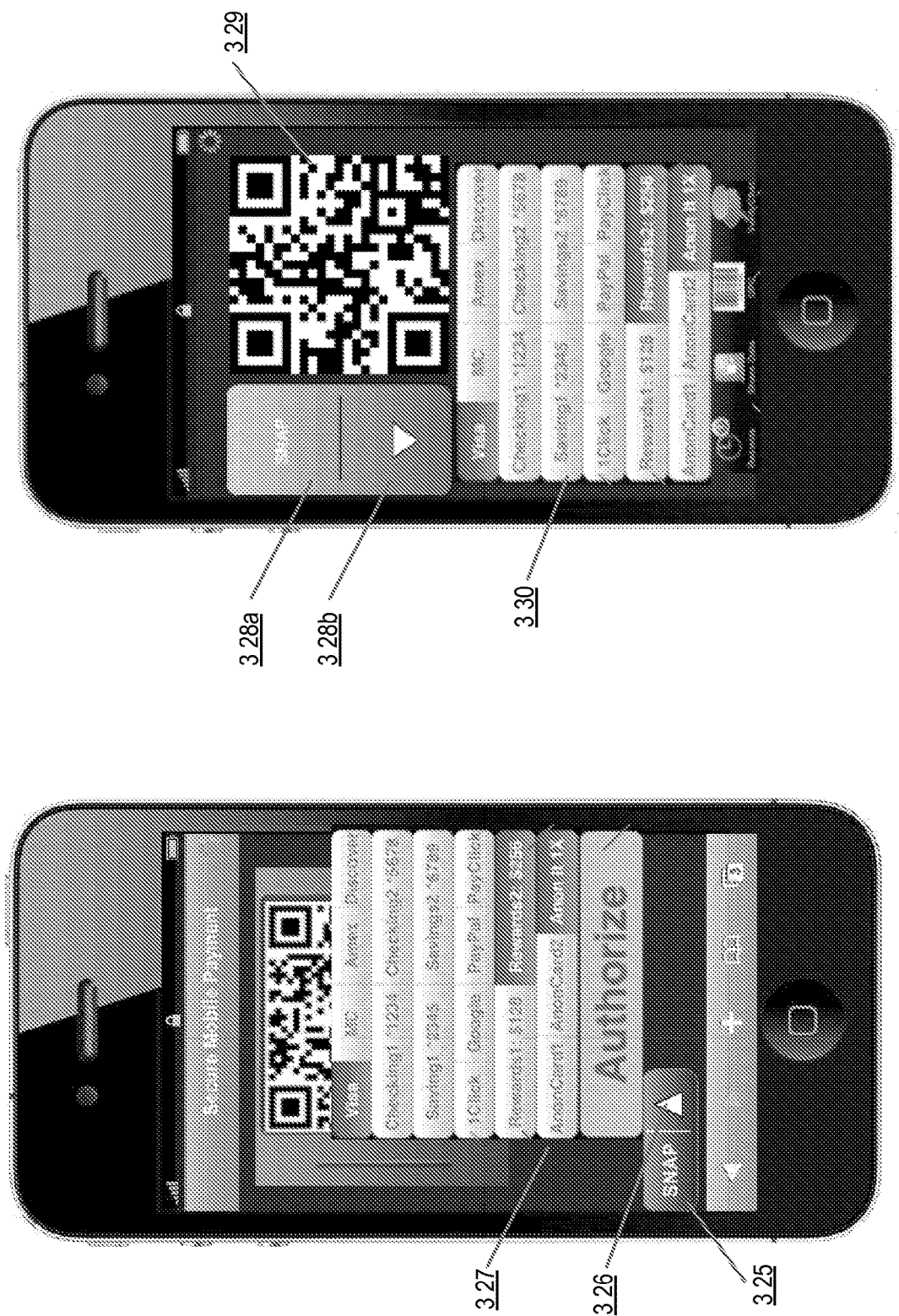

With reference to FIG. 3C, in some implementations, the user interface elements of the snap mobile payment app may be advantageously arranged to provide the user the ability to process a purchase with customized payment parameters with a minimum number of user gestures applied to the user's mobile device. For example, the user may be provided with an overloaded user interface element, e.g., 325-326. For example, if the user has a QR pay code within the viewing angle of a camera included in the user's mobile device, the user may activate element 325 to snap the QR code and utilize predetermined default settings to process the purchase based on the QR code. However, if the user wishes to customize the payment parameters, the user may activate user interface element 326 (e.g., press and continue to hold). Upon doing so, the app may provide a pop-up menu, e.g., 327, providing a variety of payment customization choices, such as those provided previously. The user may, e.g., drag the user's finger to the appropriate settings the user prefers, and release the user's finger from the touchscreen of the user's mobile device to select the setting for payment processing. In alternate implementations, the payment settings options, e.g., 330, and QR capture activation buttons, e.g., 328a-b (e.g., 328b may provide even more settings that those displayed in the initial screen), may be included in the user interface along with a window, e.g., 329, for capturing the QR code via the mobile device's camera. In alternate implementations, the user's mobile device may generate a hybrid QR code-payment settings graphic, and the POS terminal (or user's trusted computing device) may capture the entire graphic for payment processing.

Figure 3D:
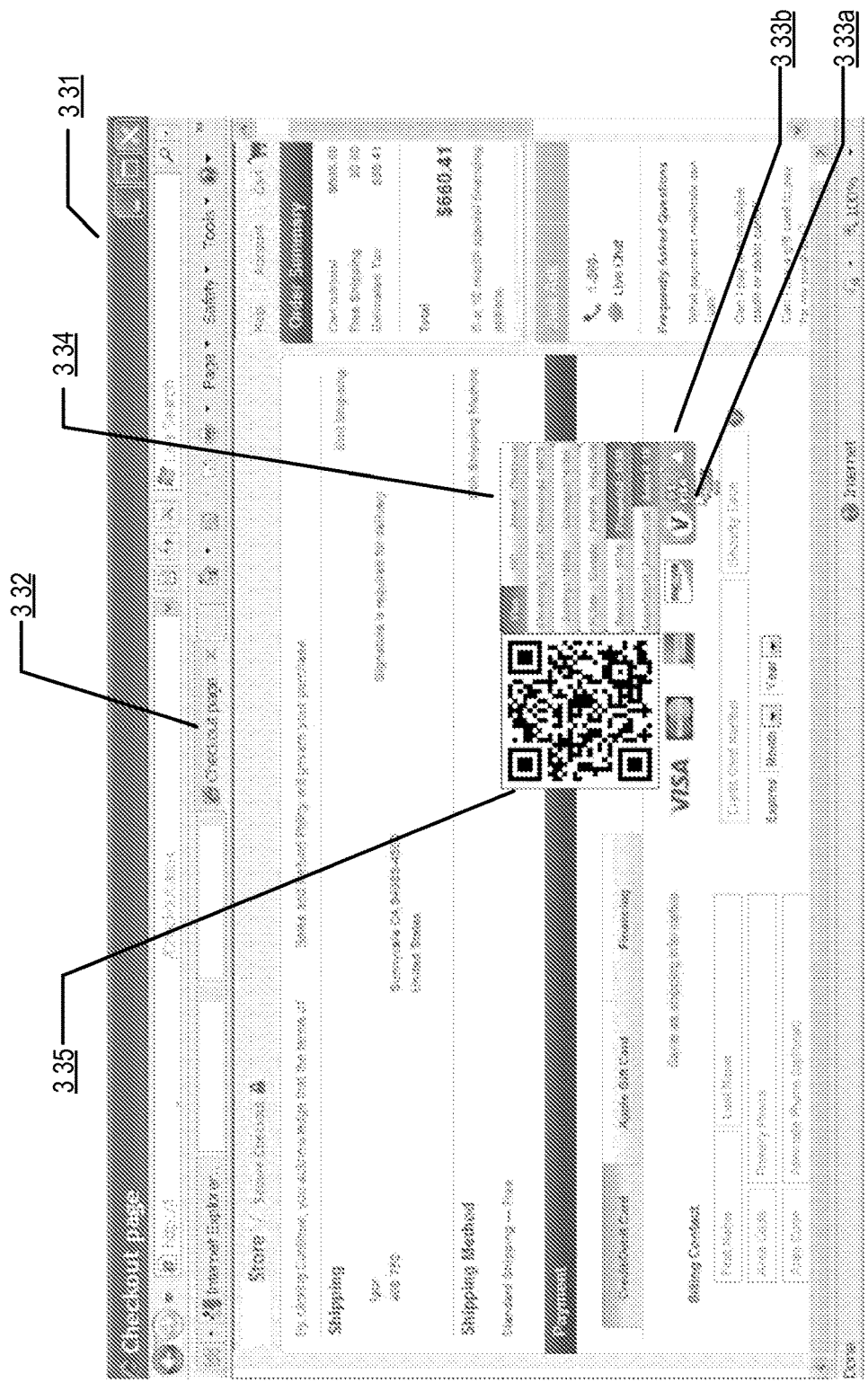

With reference to FIG. 3D, in some implementations, a user may be advantageously able to provide user settings into a device producing a QR code for a purchase transaction, and then capture the QR code using the user's mobile device. For example, a display device of a point-of-sale terminal may be displaying a checkout screen, such as a web browser executing on a client, e.g., 331, displaying a checkout webpage of an online shopping website, e.g., 332. In some implementations, the checkout screen may provide a user interface element, e.g., 333a-b, whereby the user can indicate the desire to utilize snap mobile payment. For example, if the user activates element 331a, the website may generate a QR code using default settings of the user, and display the QR code, e.g., 335, on the screen of the client for the user to capture using the user's mobile device. In some implementations, the user may be able to activate a user interface element, e.g., 333b, whereby the client may display a pop-up menu, e.g., 334, with additional options that the user may select from. For example, the website may provide user selection options similar to those discussed above in the description with reference to FIGS. 3B-C. In some implementations, the website may modify the QR code 335 in real-time as the user modifies settings provided by activating the user interface element 333b. Once the user has modified the settings using the pop-up menu, the user may capture a snapshot of the QR code to initiate purchase transaction processing.

Figure 3E:
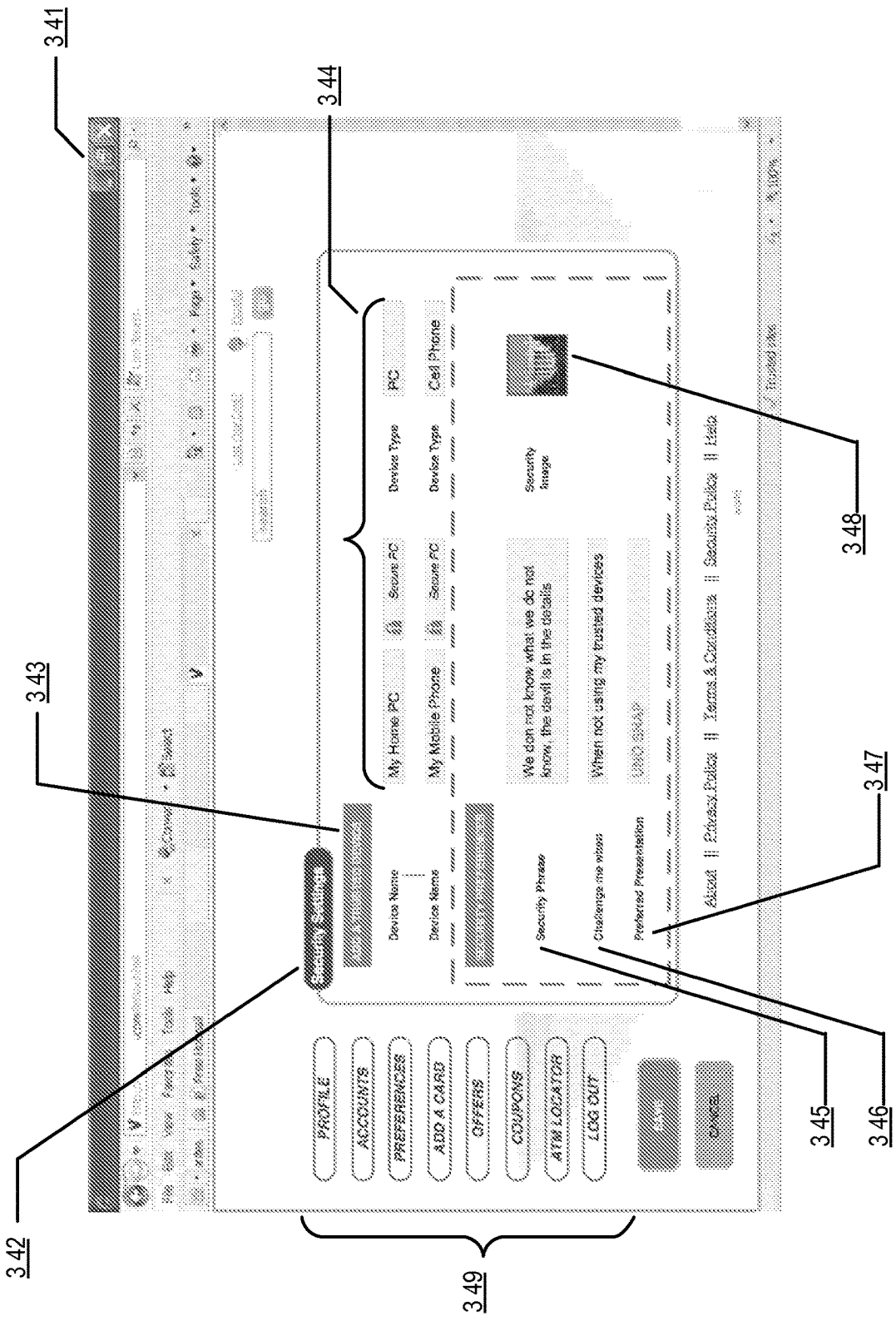

With reference to FIG. 3E, in some implementations, the SNAP may provide the user with a user interface to modify the user's snap mobile payment settings. For example, the SNAP may provide a web interface, e.g., 341. For example, the user may be able to modify security settings of the user's virtual wallet, e.g., 342, using the web interface. For example, the user may review a list of trusted device, e.g., 344, via which the user may access the user's virtual wallet. In some implementations, the web interface may provide a user interface element to add a trusted device, e.g., 343. The web interface may also provide the user with additional security options. For example, the user be able to set a security passphrase, e.g., 345, modify settings for when the user should be challenged before authorizing a purchase transaction, e.g., 346, the type/style of presentation of the security features, e.g., 347, and a security image to be displayed on the terminal utilized in snap mobile payment, e.g., 348. In various implementations, the user may be able to access other services including modifying user profiles, accounts, account preferences, adding cards, obtaining offers and coupons, locating ATM machines, etc.

Figure 4A:
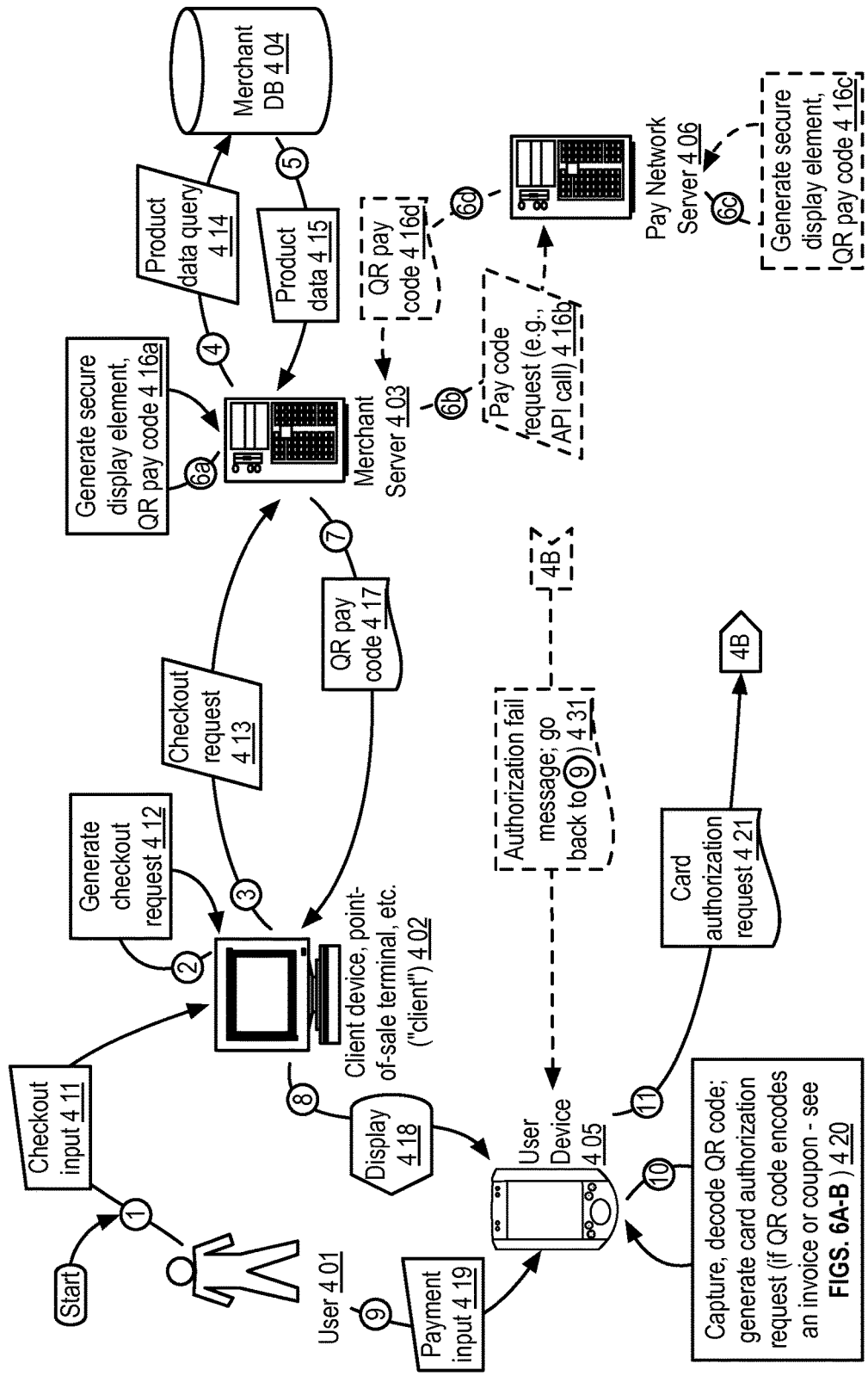
FIGS. 4A-D show data flow diagrams illustrating an example snap mobile payment procedure in some embodiments of the SNAP.

FIGS. 4A-D show data flow diagrams illustrating an example snap mobile payment procedure in some embodiments of the SNAP. With reference to FIG. 4A, in some implementations, a user, e.g., 401, may desire to purchase a product, service, offering, and/or the like ("product"), from a merchant, e.g., 403, via a merchant online site or in the merchant's store. The user may communicate with a merchant server, e.g., 403, via a client such as, but not limited to: a personal computer, mobile device, television, point-of-sale terminal, kiosk, ATM, and/or the like (e.g., 402). For example, the user may provide user input, e.g., checkout input 411, into the client indicating the user's desire to purchase the product. For example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. The client may generate a checkout request, e.g., 412, and provide the checkout request, e.g., 413, to the merchant server. For example, the client may provide a (Secure) Hypertext Transfer Protocol ("HTTP(S)") GET message including the product details for the merchant server in the form of data formatted according to the eXtensible Markup Language ("XML"). Below is an example HTTP(S) GET message including an XML-formatted checkout request for the merchant server:

```
GET /checkout.php HTTP/1.1
Host: www.merchant.com
Content-Type: Application/XML
Content-Length: 718
<?XML version = "1.0" encoding = "UTF-8"?>
<checkout_request>
    <session_ID>4NFU4RG94</session_ID>
    <timestamp>2011-02-22 15:22:43</timestamp>
    <user_ID>john.q.public@gmail.com</user_ID>
```

```
            <client_details>
                <client_IP>192.168.23.126</client_IP>
                <client_type>smartphone</client_type>
                <client_model>HTC Hero</client_model>
                <OS>Android 2.2</OS>
                <app_installed_flag>true</app_installed_flag>
            </client_details>
            <purchase_details>
                <num_products>1</num_products>
                <product>
                    <product_type>book</product_type>
                    <product_params>
                        <product_title>XML for
dummies</product_title>
                        <ISBN>938-2-14-168710-0</ISBN>
                        <edition>2nd ed.</edition>
                        <cover>hardbound</cover>
                        <seller>bestbuybooks</seller>
                    </product_params>
                    <quantity>1</quantity>
                </product>
            </purchase_details>
        </checkout_request>
```

In some implementations, the merchant server may obtain the checkout request from the client, and extract the checkout detail (e.g., XML data) from the checkout request. For example, the merchant server may utilize a parser such as the example parsers described below in the discussion with reference to FIG. 14. The merchant server may extract the product data, as well as the client data from the checkout request. In some implementations, the merchant server may query, e.g., 414, a merchant database, e.g., 404, to obtain product data, e.g., 415, such as product pricing, sales tax, offers, discounts, rewards, and/or other information to process the purchase transaction. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, is provided below:

```
<?PHP
header('Content-Type: text/plain');
mysql_connect("254.93.179.112",$DBserver,$password); //
    access database server
mysql_select_db("PRODUCTS.SQL"); // select database table
    to search
//create query
$query = "SELECT product_info product_price tax_1info_list
    offers_list discounts_list rewards_list FROM ProdTable
    WHERE product LIKE '%' $prod";
$result = mysql_query($query); // perform the search query
mysql_close("PRODUCTS.SQL"); // close database access
?>
```

In some implementations, in response to obtaining the product data, the merchant server may generate, e.g., 416a, a QR pay code, and/or secure display element according to the security settings of the user (see, e.g., 358). The merchant server may provide the QR code to the client, so that the client may display the QR code, and the user may capture the QR code using the user's device to obtain merchant and/or product data for generating a purchase transaction processing request. In alternate implementations, the merchant server may direct the client to communicate the product and/or merchant data required to process the transaction to the user's device via an alternate communication protocol, such as, but not limited to: Wi-Fi™, Bluetooth™, cellular network, SMS, email and/or like communication protocols. For example, the merchant server may direct the client to initiate a plug-in on its system to provide the alternate communication service, and transmit the product and/or merchant data to the user's device via the communication service.

In implementations utilizing a QR code, the merchant server may generate a QR code embodying the product information, as well as merchant information required by a payment network to process the purchase transaction. In some implementations, the QR code may include at least information required by the user device capturing the QR code to generate a purchase transaction processing request, such as a merchant identifier (e.g., a merchant ID number, merchant name, store ID, etc.) and a session identifier for a user shopping session associated with the shopping website/brick-and-mortar store.

In some implementations, the merchant server may generate in real-time, a custom, user-specific merchant-product XML data structure having a time-limited validity period, such as the example 'QR_data' XML data structure provided below:

```
<QR_data>
    <order_ID>4NFU4RG94</order_ID>
    <timestamp>2011-02-22 15:22:43</timestamp>
    <expiry_lapse>00:00:30</expiry_lapse>
    <transaction_cost>$34.78</transaction_cost>
    <alerts_URL>www.merchant.com/shopcarts.php?sessionID=AEBB
4356</alerts_URL>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <secure_element>www.merchant.com/securedyn/0394733/123.pn
g</secure_element>
    <purchase_details>
        <num_products>1</num_products>
        <product>
            <product_type>book</product_type>
            <product_params>
                <product_title>XML for
```

```
            dummies</product_title>
                    <ISBN>938-2-14-168710-0</ISBN>
                    <edition>2nd ed.</edition>
                    <cover>hardbound</cover>
                    <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_au
th_key>
    </merchant_params>
<QR_data>
```

In some implementations, the XML data may include a handle, alias, token, or pointer to information stored on a payment network server, rather than encoding all of the actual data required to initiate the transaction, so that the information encoded into the QR code may be advantageously minimized. In some implementations, the merchant may generate a QR code using the XML data. For example, the merchant server may utilize the PHP QR Code open-source (LGPL) library for generating QR Code, 2-dimensional barcode, available at http://phpqrcode.sourceforge.net/. For example, the merchant server may issue PHP commands similar to the example commands provided below:

```
<?PHP
header('Content-Type: text/plain');
// Create QR code image using data stored in $data variable
QRcode::png($data, 'qrcodeimg.png');
?>
```

In alternate implementations, the merchant server may provide, e.g., 416b the XML data to a pay network server, e.g., 406, along with a request to generate a QR code. For example, the merchant server may utilize an API call to the pay network server to request generation of the QR code. The pay network server may generate the QR code for the merchant server, e.g., 416c, and provide, e.g., 416d, the QR code to the merchant server. For example, the pay network server may encode the information provided by the merchant into the QR code, and may also advantageously encode security information, time validity information, digital certificate information, anonymous shipping information, QR code generation/processing fee information, etc. into the QR code.

In some implementations, the pay network server may provide the merchant server with an encryption key (e.g., a Rivest-Shamir-Adleman ("RSA") private/public key, digital certificate). The merchant may encrypt the custom, user-specific merchant-product XML data structure using the encryption key to generate encrypted purchase data (e.g., using the RSA algorithm). The merchant server may then encode the encrypted data into the QR code. Such a scheme may be employed advantageously, in various embodiments, by the pay network server to authenticate the merchant for any transaction processing requests related to the user-merchant shopping session.

In some implementations, pre-designed QR codes associated with authenticated with pre-authenticated merchants may be provided to the user device. For example, a user may be browsing an online website on the user's device. The user device may make a HTTP(S) GET request for a webpage from a web server. In some implementations, the web server may, in response to the user device's request for a webpage, generate a query for advertisements to display on the webpage. For example, the web server may search a database, or provide a request to an ad network server (e.g., Akamai) to provide advertisements for embedding into the webpage. In some implementations, the ad network server may utilize keywords, metadata, etc. obtained from the web server (e.g., keywords or metadata associated with the webpage, user profile information, user ID, user browsing history from a cookie stored on the user device, etc.). The ad network may utilize the keywords to generate a query of database(s) for advertisements associated with the keywords, and may obtain advertisements to provide. In some implementations, the ad network server may provide information (e.g., via an API call) on such advertisements (e.g., merchant name, merchant ID, product name, product pricing information, related offers, etc.) to a pay network server. The pay network server may generate a QR code based on the information provide by the ad network server, such that a user device may snap the QR code to initiate a purchase transaction for the goods and/or services associated with the QR code (e.g., as provided by the ad network server to the pay network server). The ad network server may provide the QR as part of the advertisement to the web server, which may in turn embed the advertisement including the QR code into the webpage before providing it to the user device. In alternate implementations, the ad network server/web server may transmit a URL or other identifier of the QR code (ultimately) to the user device, and the user device may make a call (e.g., a HTTP(S) GET request) using the URL of the QR code (e.g., hosted on the pay network server) to obtain the QR code and display it for the user.

In some implementations, the merchant server may provide the QR code to the client, e.g., 417. For example, the merchant server may provide a HyperText Markup Language ("HTML") page including a reference to the QR code image and/or secure element image, such as the example HTML page below:

```
<html>
    <img
        src="www.merchant.com/securedyn/0394733/qrcodeimg.png"
        alt="Merchant-Product QR code"/>
    <img src=" www.merchant.com/securedyn/0394733/123.png"
        alt="Secure Element"/>
</html>
```

In some implementations, the client may obtain the QR pay code, e.g., 417, and display the QR code, e.g., 418 on a display screen associated with the client device. In some implementations, the user may utilize a user device, e.g., 405, to capture the QR code presented by the client device for payment processing. For example, the user may provide payment input into the user device, e.g., 419. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. For example, the user device may obtain track 1 data from the user's card (e.g., credit card, debit card, prepaid card, charge card, etc.), such as the example track 1 data provided below:

---

%B123456789012345^PUBLIC/J.Q.^99011200000000000000901**
**?*
(wherein '123456789012345' is the card number of 'J.Q. Public' and has a CVV number of 901. '990112' is a service code, and *** represents decimal digits which change randomly each time the card is used.)

---

In some implementation, the user device may determine whether an image it has captured depicts a QR code. Depending on whether or not a QR code has been captured, and also (optionally) depending on contents of the QR code, the user device may redirect the user (e.g., via a web browser application executing on the user device) to: a product, a merchant website, a product at a merchant website, a website and including a command to add an item to a purchasing cart of the user associated with the website, and/or the like. For example, the user device may execute a component such as the example Quick Response Code Processing ("QRCP") component 600 described below in the discussion with reference to FIGS. 6A-B.

In some implementations, upon obtaining the user payment input and capturing the QR code, the user device may generate a card authorization request 420 (e.g., if the QR code includes a purchasing coupon, offer, invoice, personal payment from another virtual wallet user, etc.), for providing to the pay network server. For example, the user device may provide a card authorization request, e.g., 421, on behalf of the user, a HTTP(S) GET message including the product order details for a pay network server, e.g., 406, in the form of XML-formatted data. Below is an example HTTP(S) GET message including an XML-formatted card authorization request for the pay network server:

---

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <alerts_URL>www.merchant.com/shopcarts.php?sessionID=AEBB
4356</alerts_URL>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
        <num_products>1</num_products>
        <product>
            <product_type>book</product_type>
            <product_params>
                <product_title>XML for
dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_au
th_key>
    </merchant_params>
    <account_params>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
```

```
      <sign>/jqp/</sign>
      <confirm_type>email</confirm_type>
      <contact_info>john.q.public@gmail.com</contact_info>
   </account_params>
   <shipping_info>
      <shipping_adress>same as billing</shipping_address>
      <ship_type>expedited</ship_type>
      <ship_carrier>FedEx</ship_carrier>
      <ship_account>123-45-678</ship_account>
      <tracking_flag>true</tracking_flag>
      <sign_flag>false</sign_flag>
   </shipping_info>
</purchase_order>
```

In some implementations, the card authorization request generated by the user device may include a minimum of information required to process the purchase transaction. For example, this may improve the efficiency of communicating the purchase transaction request, and may also advantageously improve the privacy protections provided to the user and/or merchant. For example, in some implementations, the card authorization request may include at least a merchant ID, a session ID for the user's shopping session with the merchant, and a device ID of a device (e.g., smartphone) of the user that is linked to the user's virtual wallet. In some implementations, the QR code and messages sent to/from the QR-code capturing device may include the source ID (e.g., identifier of the device generating the QR code), session ID, merchant ID, item ID (e.g., model number), the charge amount, and/or transacting device ID (e.g., the user's smartphone device).

In some implementations, the card authorization request may be provided by the merchant server or point of sale terminal, instead of the user device. In some implementations, the user, desiring security, may request, via the user device, the pay network server for a dynamically-generated card verification value code (dCVV™) to be utilized along with the user's primary account number ("PAN," e.g., credit card number) in the purchase transaction. In response, the payment network server may generate a dCVV™ code (e.g., using random number generation, MD5 hash of an input key, which may be generated using the user ID, merchant ID, session ID, timestamp, combinations thereof, and/or the like), and provide a session-specific dCVV™ code for the user to utilize along with the user's PAN number. For example, the session-specific dCVV™ code may have an expiry time (e.g., expiry in a one minute from issue). The user device may communicate (e.g., via Bluetooth™, NFC, Wi-Fi, cellular, QR code, etc.) the PAN and dCVV to the point-of-sale terminal, which may create the card authorization request. For example, the user device may generate a QR payment code embedding the PAN and dCVV numbers, and the point of sale terminal may snap an image of the user device-generated QR payment code. The point of sale terminal may then generate and provide the card authorization request to the pay network server. The pay network server may then be able to validate the transaction by comparing the dCVV obtained from the merchant with the dCVV it provided to the user device before the purchase transaction was initiated. If the dCVV codes from the two sources (pay network server and merchant) correspond properly to each other, the pay network server may continue processing the purchase transaction.

In some implementations, the card authorization request from a user device may include encrypted data extracted from the QR code, which may have been encrypted by the merchant server as part of a merchant authentication scheme. In some implementations, the pay network server may obtain the encrypted data from the card authorization request provided by the user device, and attempt to decrypt the encrypted data, e.g., using a RSA private/public that is complementary to the key the pay network server initially provided to the merchant server for encrypting the purchase data before embedding it into the QR code. If the pay network server is able to decrypt the purchase data, then the merchant is authenticated as being a valid merchant. In some implementations, the pay network server may compare the purchase data decrypted from the card authorization with data provided by the user/user device, to determine whether the data from these different sources (user/user device, and merchant) correspond properly to each other. Thus, in some implementations, the pay network server may be able to authenticate the merchant, and correlate the merchant to a specific user session or user device before processing the transaction.

In some implementations, the pay network server may provide a notification to the user device that the transaction is authenticated and approved for transacting. In alternate implementations, the pay network server may proceed with transaction processing. In some implementations, upon identifying that the user is in a session with the merchant, the pay network server may communicate with the user device to provide additional features for the user. For example, in some implementations, the pay network server may provide a communication to the user device (e.g., via a HTTP(S) POST message) to provide: a virtual storefront of the merchant; a depiction of an aisle of the merchant associated with the products included in the card authorization request, a listing of related items; and/or the like (see, e.g., FIG. 7E-G and description below of additional embodiments).

Figure 4B:
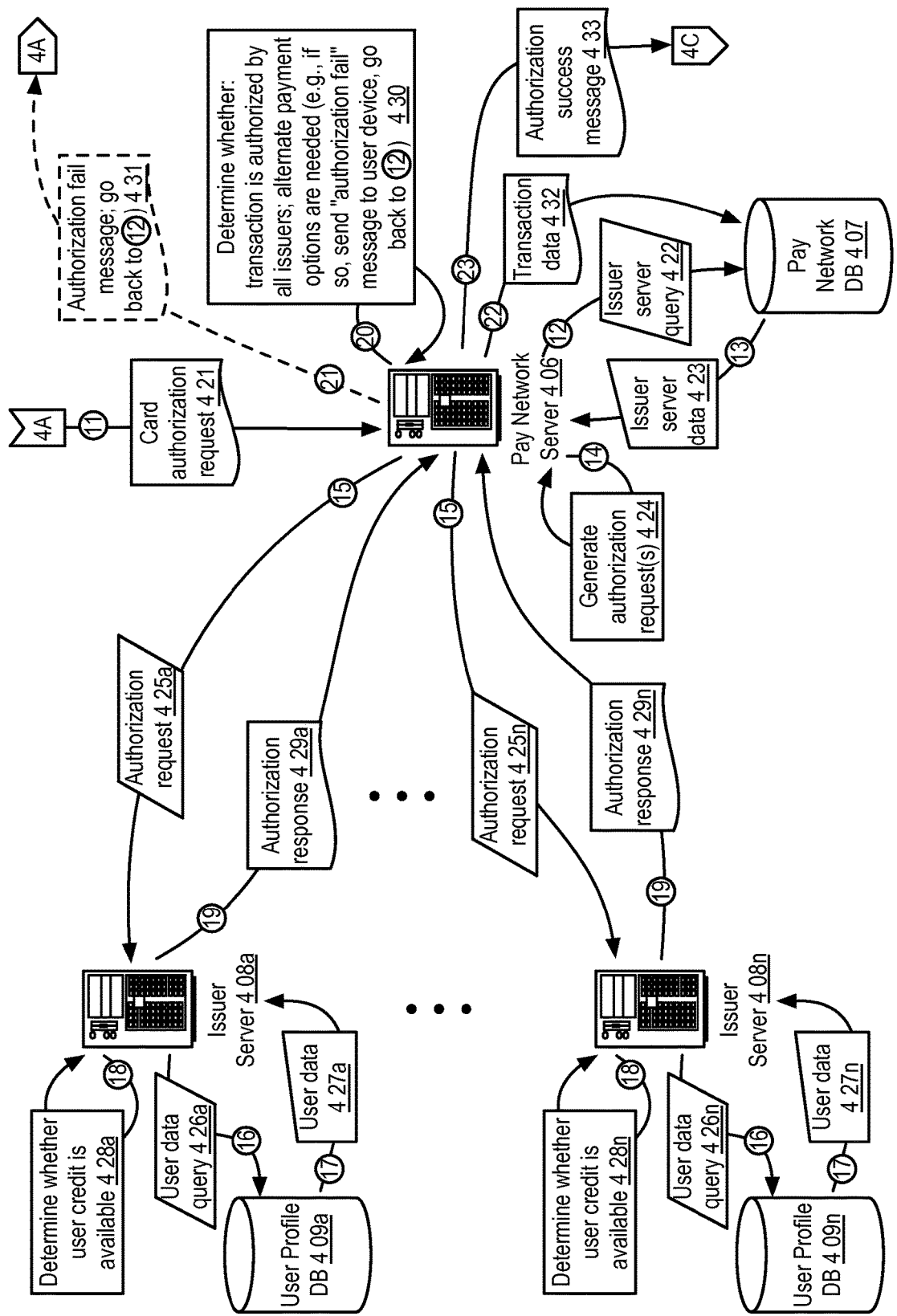

With reference to FIG. 4B, in some implementations, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

In some implementations, the pay network server may generate a query, e.g., 422, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 408a-n, of the issuer(s) may maintain details of the user's account. In some implementations, a database, e.g., pay network database 407, may store details of the issuer server(s) associated with the issuer(s). For example, the database may be a relational database responsive to Structured Query Language ("SQL") commands. The pay network server may query the pay network database for issuer server(s) details. For example, the pay network server may execute a hypertext preprocessor ("PHP") script including SQL commands to query the database for details of the issuer server(s). An example PHP/SQL command listing, illustrating substantive aspects of querying the database, is provided below:

```
<?PHP
header('Content-Type: text/plain');
mysql_connect("254.93.179.112",$DBserver,$password); //
    access database server
mysql_select_db("ISSUERS.SQL"); // select database table to
    search
//create query for issuer server data
$query = "SELECT issuer_name issuer_address issuer_id
    ip_address mac_address auth_key port_num
    security_settings_list FROM IssuerTable WHERE account_num
    LIKE '%' $accountnum";
$result = mysql_query($query); // perform the search query
mysql_close("ISSUERS.SQL"); // close database access
?>
```

In response to obtaining the issuer server query, e.g., 422, the pay network database may provide, e.g., 423, the requested issuer server data to the pay network server. In some implementations, the pay network server may utilize the issuer server data to generate authorization request(s), e.g., 424, for each of the issuer server(s) selected based on the pre-defined payment settings associated with the user's virtual wallet, and/or the user's payment options input, and provide the card authorization request(s), e.g., 425a-n, to the issuer server(s), e.g., 408a-n. In some implementations, the authorization request(s) may include details such as, but not limited to: the costs to the user involved in the transaction, card account details of the user, user billing and/or shipping information, and/or the like. For example, the pay network server may provide a HTTP(S) POST message including an XML-formatted authorization request similar to the example listing provided below:

```
POST /authorization.php HTTP/1.1
Host: www.issuer.com
Content-Type: Application/XML
Content-Length: 624
<?XML version = "1.0" encoding = "UTF-8"?>
<card_query_request>
    <query_ID>VNEI39FK</query_ID>
    <timestamp>2011-02-22 15:22:44</timestamp>
    <purchase_summary>
        <num_products>1</num_products>
        <product>
            <product_summary>Book - XML for
    dummies</product_summary>
            <product_quantity>1</product_quantity?
        </product>
    </purchase_summary>
    <transaction_cost>$22.61</transaction_cost>
    <account_params>
        <account_type>checking</account_type>
        <account_num>1234567890123456</account_num>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_au
    th_key>
    </merchant_params>
</card_query_request>
```

In some implementations, an issuer server may parse the authorization request(s), and based on the request details may query a database, e.g., user profile database 409a-n, for data associated with an account linked to the user. For example, the issuer server may issue PHP/SQL commands similar to the example provided below:

```
<?PHP
header('Content-Type: text/plain');
mysql_connect("254.93.179.112",$DBserver,$password); //
    access database server
mysql_select_db("USERS.SQL"); // select database table to
    search
//create query for user data
$query = "SELECT user_id user_name user_balance
    account_type FROM UserTable WHERE account_num LIKE '%'
    $accountnum";
$result = mysql_query($query); // perform the search query
mysql_close("USERS.SQL"); // close database access
?>
```

In some implementations, on obtaining the user data, e.g., 427a-n, the issuer server may determine whether the user can pay for the transaction using funds available in the account, e.g., 428a-n. For example, the issuer server may determine whether the user has a sufficient balance remaining in the account, sufficient credit associated with the account, and/or the like. Based on the determination, the issuer server(s) may provide an authorization response, e.g., 429a-n, to the pay network server. For example, the issuer server(s) may provide a HTTP(S) POST message similar to the examples above. In some implementations, if at least one issuer server determines that the user cannot pay for the transaction using the funds available in the account, see e.g., 430-431, the pay network server may request payment options again from the user (e.g., by providing an authorization fail message 431 to the user device and requesting the user device to provide new payment options), and re-attempt authorization for the purchase transaction. In some implementations, if the number of failed authorization attempts exceeds a threshold, the pay network server may abort the authorization process, and provide an "authorization fail" message to the merchant server, user device and/or client.

Figure 4C:
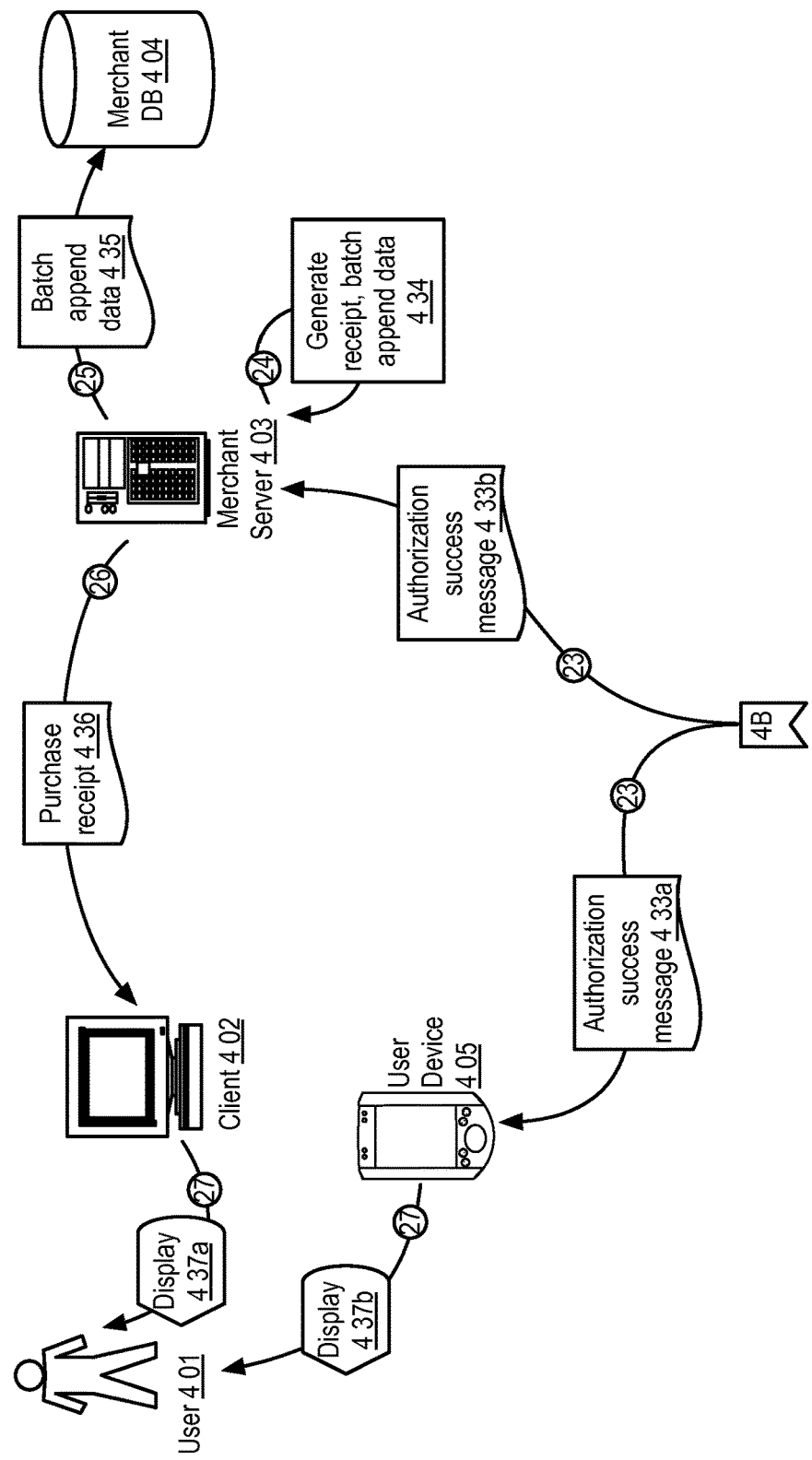

With reference to FIG. 4C, in some implementations, the pay network server may obtain the authorization message file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365</merchant_auth_key>
    <account_number>123456789</account_number>
</merchant_data>
<transaction_data>
    <transaction 1>
        ...
    </transaction 1>
    <transaction 2>
        ...
    </transaction 2>
    .
    .
    .
    <transaction n>
        ...
    </transaction n>
</transaction_data>
``` including a notification of successful authorization, see e.g., 430, 433, and parse the message to extract authorization details. Upon determining that the user possesses sufficient funds for the transaction, the pay network server may generate a transaction data record, e.g., 432, from the authorization request and/or authorization response, and store the details of the transaction and authorization relating to the transaction in a transactions database. For example, the pay network server may issue PHP/SQL commands similar to the example listing below to store the transaction data in a database:

```
<?PHP
header('Content-Type: text/plain');
mysql_connect("254.92.185.103",$DBserver,$password); //
    access database server
mysql_select("TRANSACTIONS.SQL"); // select database to
    append
mysql_query("INSERT INTO PurchasesTable (timestamp,
    purchase_summary_list, num_products, product_summary,
    product_quantity, transaction_cost, account_params_list,
    account_name, account_type, account_num, billing_addres,
    zipcode, phone, sign, merchant_params_list, merchant_id,
    merchant_name, merchant_auth_key)
VALUES (time( ), $purchase_summary_list, $num_products,
    $product_summary, $product_quantity, $transaction_cost,
    $account_params_list, $account_name, $account_type,
    $account_num, $billing_addres, $zipcode, $phone, $sign,
    $merchant_params_list, $merchant_id, $merchant_name,
    $merchant_auth_key)"); // add data to table in database
mysql_close("TRANSACTIONS.SQL"); // close connection to
    database
?>
```

In some implementations, the pay network server may forward an authorization success message, e.g., 433*a-b*, to the user device and/or merchant server. The merchant may obtain the authorization message, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 434, and store the XML data file, e.g., 435, in a database, e.g., merchant database 404. For example, a batch XML data In some implementations, the server may also generate a purchase receipt, e.g., 434, and provide the purchase receipt to the client, e.g., 436. The client may render and display, e.g., 437*a*, the purchase receipt for the user. In some implementations, the user device 405 may also provide a notification of successful authorization to the user, e.g., 437*b*. For example, the client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 4D:
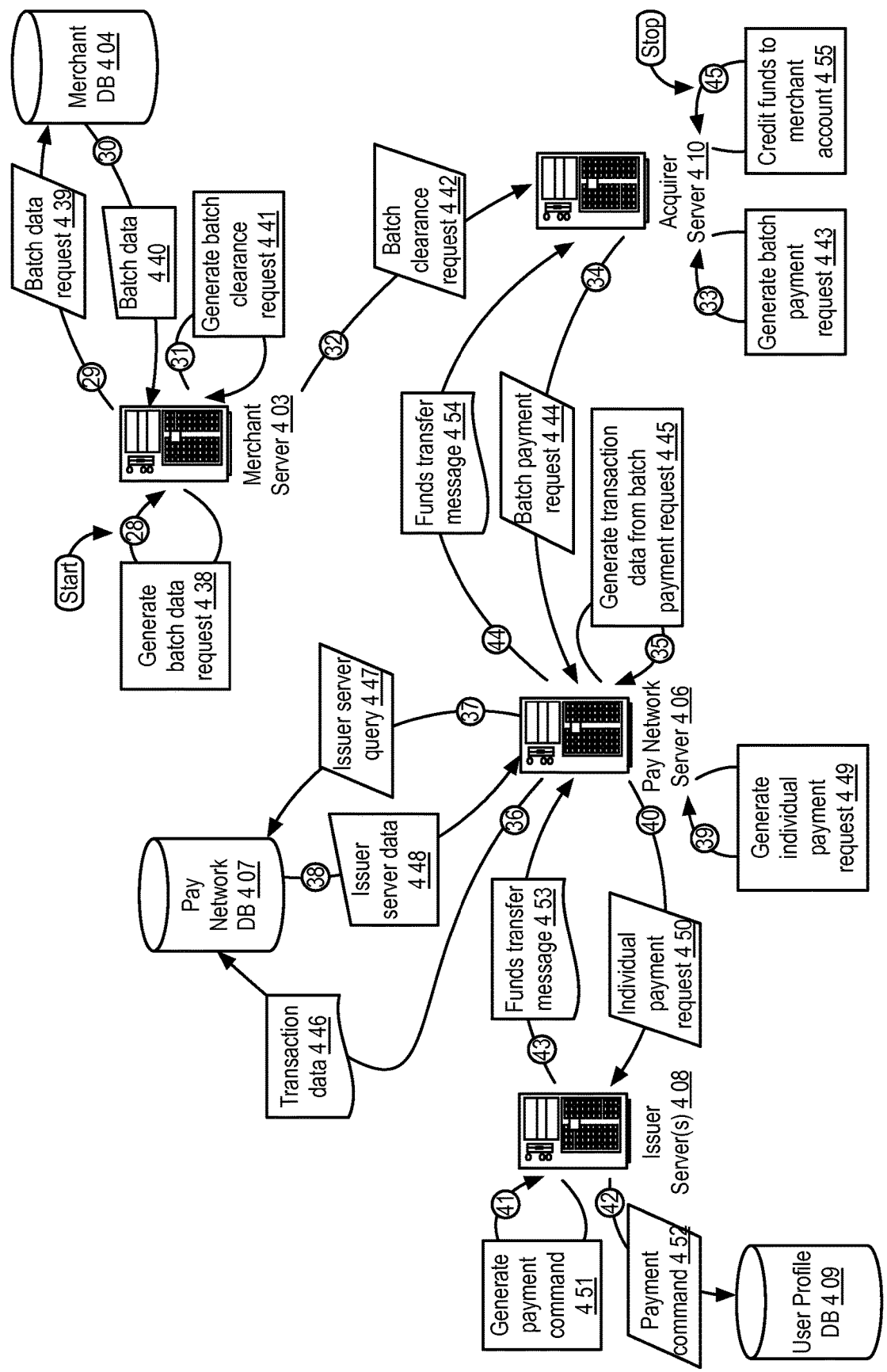

With reference to FIG. 4D, in some implementations, the merchant server may initiate clearance of a batch of authorized transactions. For example, the merchant server may generate a batch data request, e.g., 438, and provide the request, e.g., 439, to a database, e.g., merchant database 404. For example, the merchant server may utilize PHP/SQL commands similar to the examples provided above to query a relational database. In response to the batch data request, the database may provide the requested batch data, e.g., 440. The server may generate a batch clearance request, e.g., 441, using the batch data obtained from the database, and provide, e.g., 442, the batch clearance request to an acquirer server, e.g., 410. For example, the merchant server may provide a HTTP(S) POST message including XML-formatted batch data in the message body for the acquirer server. The acquirer server may generate, e.g., 443, a batch payment request using the obtained batch clearance request, and provide the batch payment request to the pay network server, e.g., 444. The pay network server may parse the batch payment request, and extract the transaction data for each transaction stored in the batch payment request, e.g., 445. The pay network server may store the transaction data, e.g., 446, for each transaction in a database, e.g., pay network database 407. For each extracted transaction, the pay network server may query, e.g., 447-448, a database, e.g., pay network database 407, for an address of an issuer server. For example, the pay network server may utilize PHP/SQL commands similar to the examples provided above. The pay network server may generate an individual payment request, e.g., 449, for each transaction for which it has extracted transaction data, and provide the individual payment request, e.g., 450, to the issuer server, e.g., 408. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Q. Public</account_name>
        <account_type>credit</account_type>
        <account_num>123456789012345</account_num>
        <billing_address>123 Green St., Norman, OK
98765</billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
    <purchase_summary>
        <num_products>1</num_products>
        <product>
            <product_summary>Book - XML for dummies</product_summary>
            <product_quantity>1</product_quantity?
        </product>
    </purchase_summary>
</pay_request>
```

In some implementations, the issuer server may generate a payment command, e.g., 451. For example, the issuer server may issue a command to deduct funds from the user's account (or add a charge to the user's credit card account). The issuer server may issue a payment command, e.g., 452, to a database storing the user's account information, e.g., user profile database 409. The issuer server may provide a funds transfer message, e.g., 453, to the pay network server, which may forward, e.g., 454, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 455.

Figure 5A:
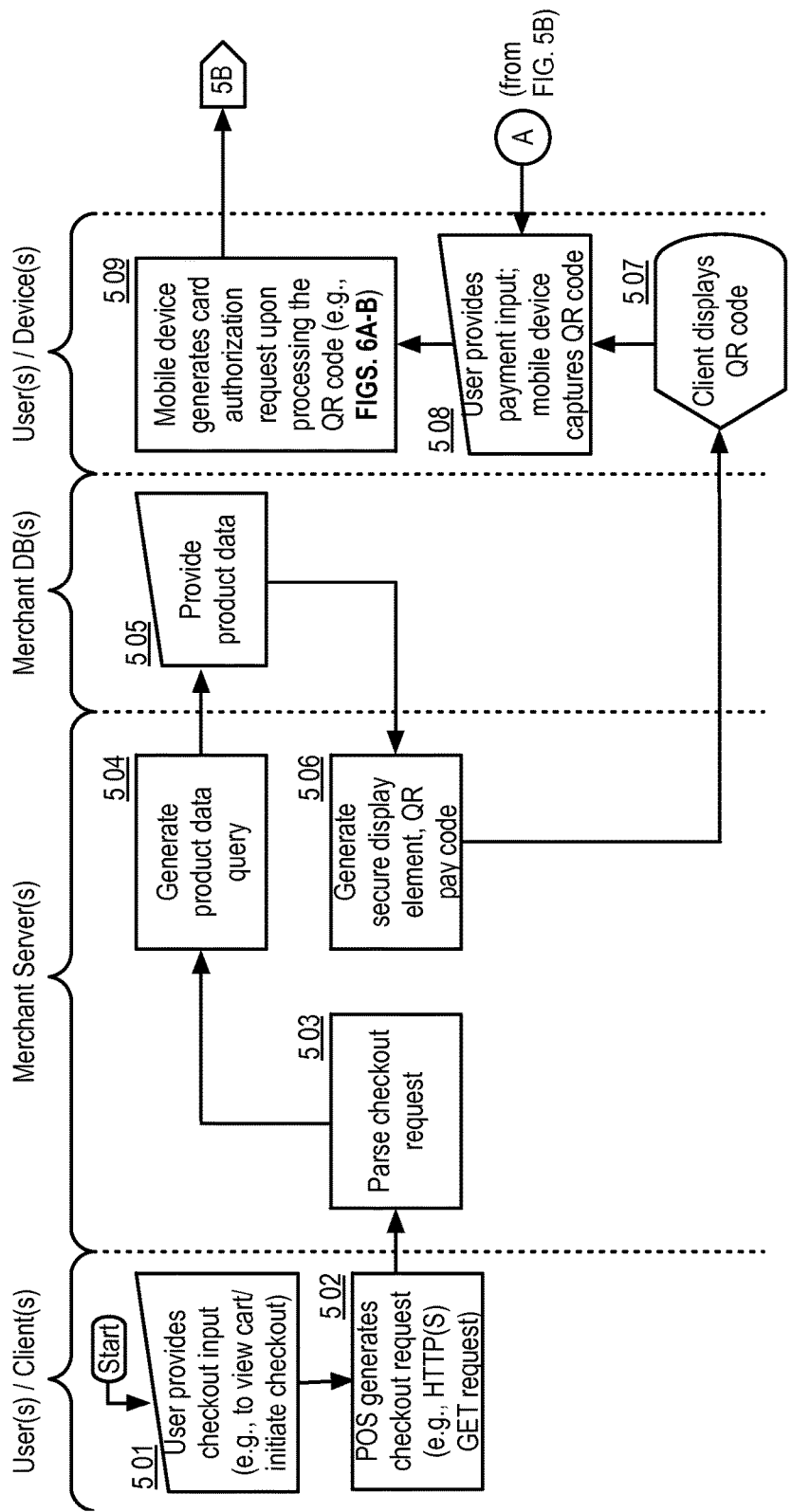
FIGS. 5A-E show logic flow diagrams illustrating example aspects of executing a snap mobile payment in some embodiments of the SNAP, e.g., a Snap Mobile Payment Execution ("SMPE") component 500.

FIGS. 5A-E show logic flow diagrams illustrating example aspects of executing a snap mobile payment in some embodiments of the SNAP, e.g., a Snap Mobile Payment Execution ("SMPE") component 500. With reference to FIG. 5A, in some implementations, a user may desire to purchase a product, service, offering, and/or the like ("product"), from a merchant via a merchant online site or in the merchant's store. The user may communicate with a merchant server via a client. For example, the user may provide user input, e.g., 501, into the client indicating the user's desire to checkout shopping items in a (virtual) shopping cart. The client may generate a checkout request, e.g., 502, and provide the checkout request to the merchant server. The merchant server may obtain the checkout request from the client, and extract the checkout detail (e.g., XML data) from the checkout request, e.g., 503. For example, the merchant server may utilize a parser such as the example parsers described below in the discussion with reference to FIG. 14. The merchant server may extract the product data, as well as the client data from the checkout request. In some implementations, the merchant server may query, e.g., 504, a merchant database to obtain product data, e.g., 505, such as product pricing, sales tax, offers, discounts, rewards, and/or other information to process the purchase transaction.

In response to obtaining the product data, the merchant server may generate, e.g., 506, a QR pay code, and/or secure display element according to the security settings of the user (see, e.g., 358). For example, the merchant server may generate a QR code embodying the product information, as well as merchant information required by a payment network to process the purchase transaction. For example, the merchant server may first generate in real-time, a custom, user-specific merchant-product XML data structure having a time-limited validity period, such as the example 'QR_data' XML data structure provided below:

```
<QR_data>
    <session_ID>4NFU4RG94</session_ID>
    <timestamp>2011-02-22 15:22:43</timestamp>
    <expiry_lapse>00:00:30</expiry_lapse>
    <transaction_cost>$34.78</transaction_cost>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <secure_element>www.merchant.com/securedyn/0394733/123.png</secure_element>
    <purchase_details>
        <num_products>1</num_products>
        <product>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
<QR_data>
```

In some implementations, the merchant may generate QR code using the XML data. For example, the merchant server may utilize the PHP QR Code open-source (LGPL) library for generating QR Code, 2-dimensional barcode, available at http://phpqrcode.sourceforge.net/. For example, the merchant server may issue PHP commands similar to the example commands provided below:

```
<?PHP
header('Content-Type: text/plain');
// Create QR code image using data stored in $data variable
QRcode::png($data, 'qrcodeimg.png');
?>
```

The merchant server may provide the QR pay code to the client, e.g., 506. The client may obtain the QR pay code, and display the QR code, e.g., 507 on a display screen associated with the client device. In some implementations, the user may utilize a user device, e.g., 509, to capture the QR code presented by the client device for payment processing. The client device may decode the QR code to extract the information embedded in the QR code. For example, the client device may utilize an application such as the ZXing multi-format 1D/2D barcode image processing library, available at http://code.google.com/p/zxing/ to extract the information from the QR code. In some implementations, the user may provide payment input into the user device, e.g., 508. Upon obtaining the user purchase input, the user device may generate a card authorization request, e.g., 509, and provide the card authorization request to a pay network server.

Figure 5B:
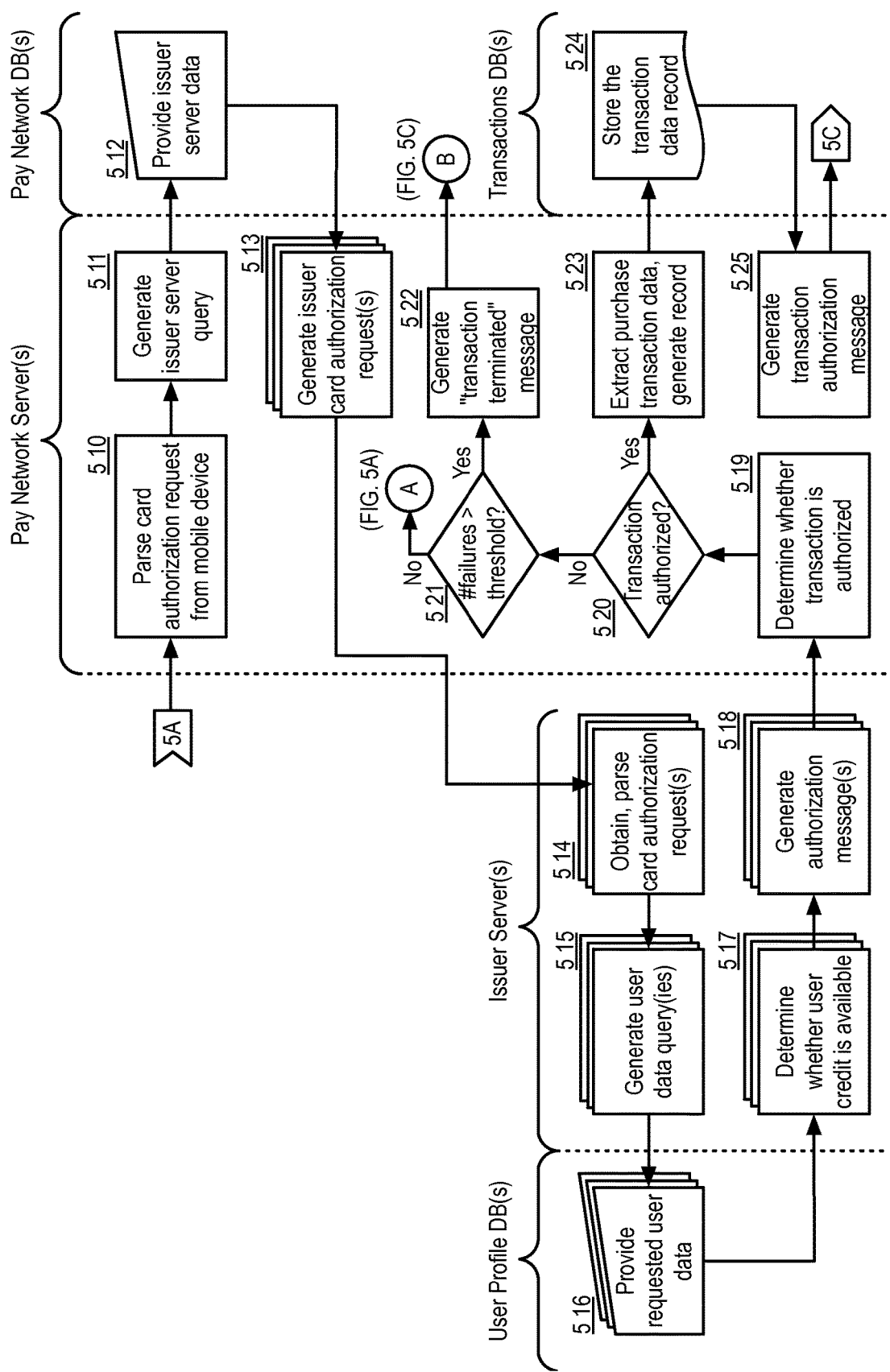

With reference to FIG. 5B, in some implementations, the pay network server may parse the card authorization request, e.g., 510, and generate a query, e.g., 511, for issuer server(s) corresponding to the user-selected payment options. In some implementations, a pay network database may store details of the issuer server(s) associated with the issuer(s). In response to obtaining the issuer server query, the pay network database may provide, e.g., 512, the requested issuer server data to the pay network server. In some implementations, the pay network server may utilize the issuer server data to generate authorization request(s), e.g., 425134, for each of the issuer server(s), and provide the card authorization request(s) to the issuer server(s).

In some implementations, an issuer server may parse the authorization request(s), and based on the request details may query a user profile database for data associated with an account linked to the user. In some implementations, on obtaining the user data, the issuer server may determine whether the user can pay for the transaction using funds available in the account, e.g., 517. For example, the issuer server may determine whether the user has a sufficient balance remaining in the account, sufficient credit associated with the account, and/or the like. Based on the determination, the issuer server(s) may provide an authorization response, e.g., 518, to the pay network server. In some implementations, if at least one issuer server determines, e.g., 519, that the user cannot pay for the transaction using the funds available in the account, see e.g., 520, option "No," the pay network server may request payment options again from the user (see e.g., 521, option "No," by providing an authorization fail message to the user device and requesting the user device to provide new payment options), and re-attempt authorization for the purchase transaction. In some implementations, if the number of failed authorization attempts exceeds a threshold, see, e.g., 521, option "Yes," the pay network server may abort the authorization process, and provide an "authorization fail" message to the merchant server, user device and/or client, e.g., 522.

In some implementations, the pay network server may obtain the authorization message including a notification of successful authorization, see e.g., 520, option "Yes,", and parse the message to extract authorization details. Upon determining that the user possesses sufficient funds for the transaction, the pay network server may generate a transaction data record, e.g., 523, from the authorization request and/or authorization response, and store, e.g., 524, the details of the transaction and authorization relating to the transaction in a transactions database.

Figure 5C:
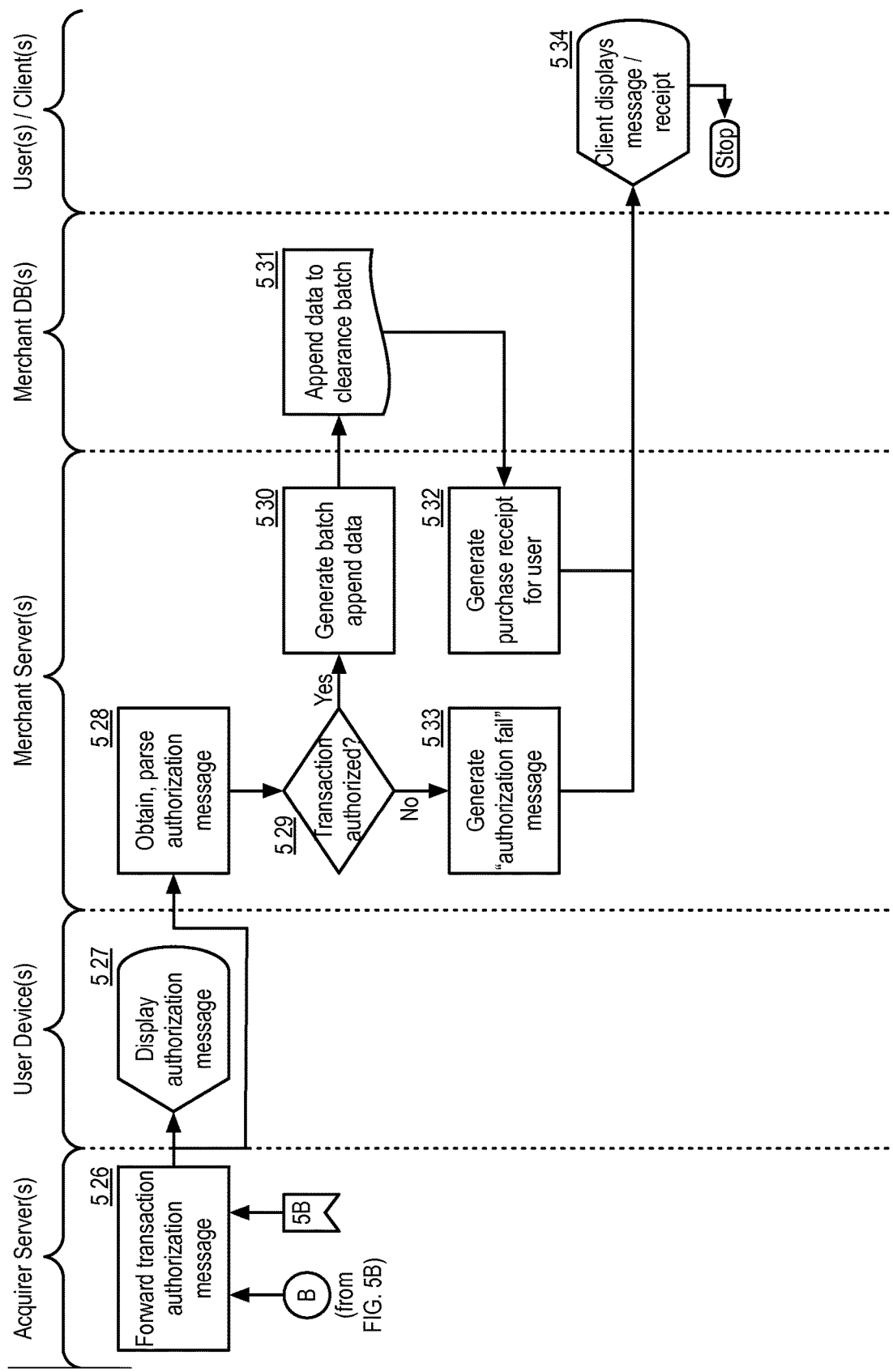

With reference to FIG. 5C, in some implementations, the pay network server may forward an authorization success message, e.g., 525, to the user device and/or merchant server, sometimes via the acquirer server, e.g. 526. The merchant may parse the authorization message, e.g., 528, and determine from it that the user possesses sufficient funds in the card account to conduct the transaction, see, e.g., 529. The merchant server may add a record of the transaction for the user to a batch of transaction data relating to authorized transactions, see, e.g., 530-531. In some implementations, the merchant server may also generate a purchase receipt, e.g., 532, and provide the purchase receipt to the client. The client may render and display, e.g., 534, the purchase receipt for the user. In some implementations, the user device 405 may also provide a notification of successful authorization to the user.

Figure 5D:
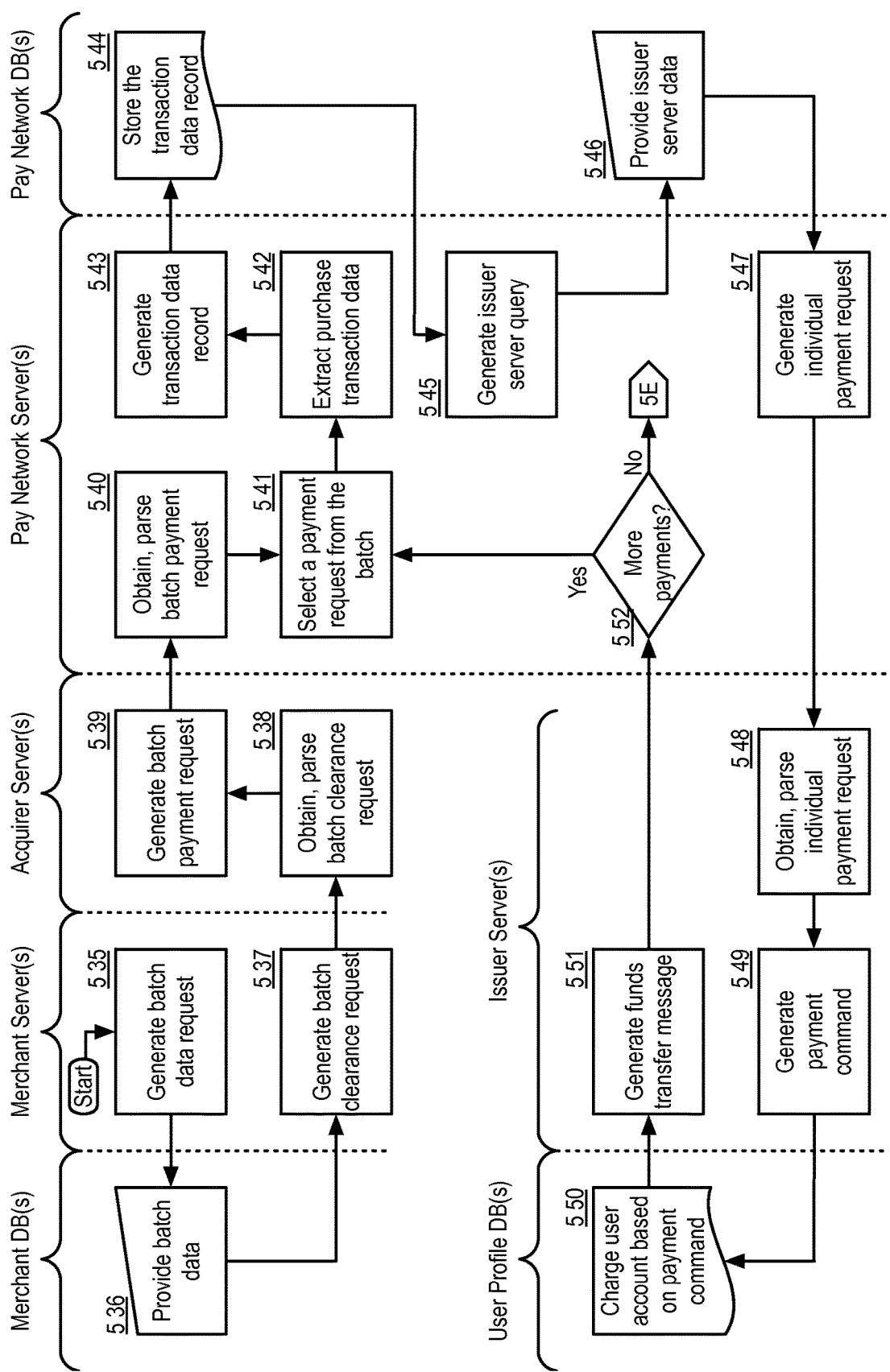
Figure 5E:
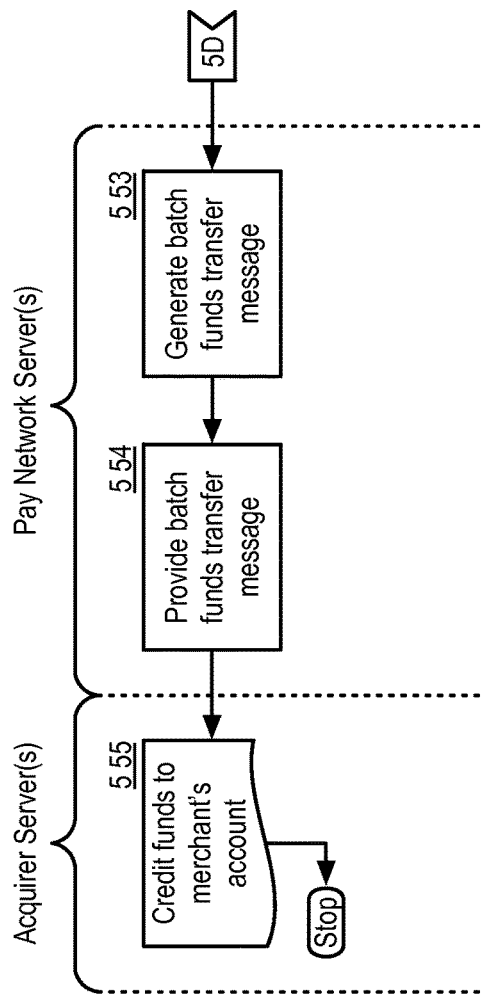

With reference to FIGS. 5D-E, in some implementations, the merchant server may initiate clearance of a batch of authorized transactions. For example, the merchant server may generate a batch data request, e.g., 535, and provide the request, e.g., 536, to a database, e.g., merchant database. In response to the batch data request, the database may provide the requested batch data, e.g., 536. The server may generate a batch clearance request, e.g., 537, using the batch data obtained from the database, and provide the batch clearance request to an acquirer server. The acquirer server may generate, e.g., 539, a batch payment request using the obtained batch clearance request, and provide the batch payment request to the pay network server. The pay network server may parse the batch payment request, and extract the transaction data for each transaction stored in the batch payment request, e.g., 540-542. The pay network server may store the transaction data, e.g., 543-544, for each transaction in a database, e.g., pay network database. For each extracted transaction, the pay network server may query, e.g., 545-546, a database, e.g., pay network database, for an address of an issuer server. The pay network server may generate an individual payment request, e.g., 547, for each transaction for which it has extracted transaction data, and provide the individual payment request to the associated issuer server.

In some implementations, the issuer server may generate a payment command, e.g., 548-549. For example, the issuer server may issue a command to deduct funds from the user's account (or add a charge to the user's credit card account). The issuer server may issue a payment command, e.g., 549, to a database storing the user's account information, e.g., user profile database. The issuer server may provide a funds transfer message, e.g., 551, to the pay network server, which may forward the funds transfer message to the acquirer server. In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 553-555.

Figure 6A:
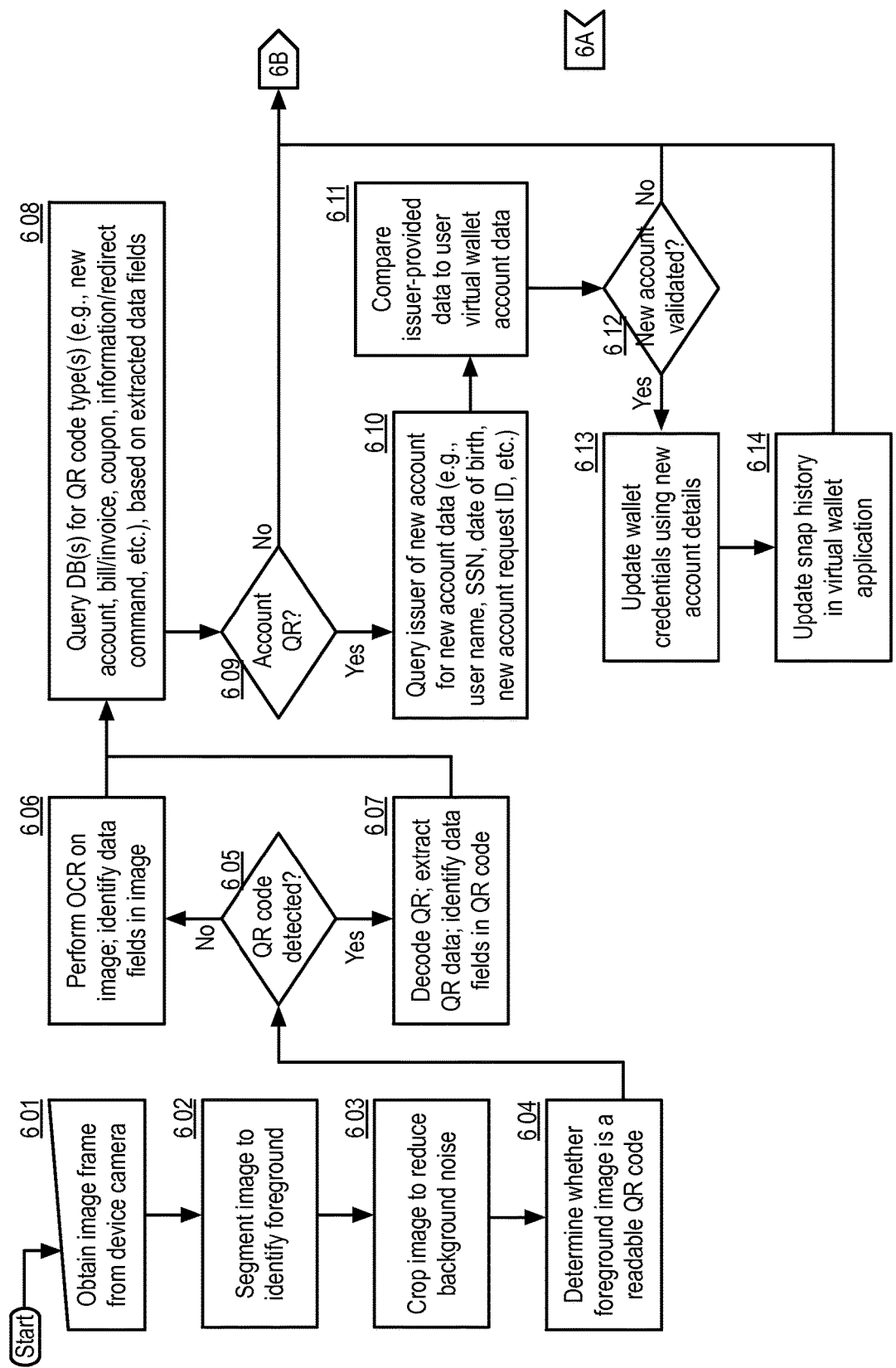
FIGS. 6A-B show logic flow diagrams illustrating example aspects of processing a Quick Response code in some embodiments of the SNAP, e.g., a Quick Response Code Processing ("QRCP") component 600.
Figure 6B:
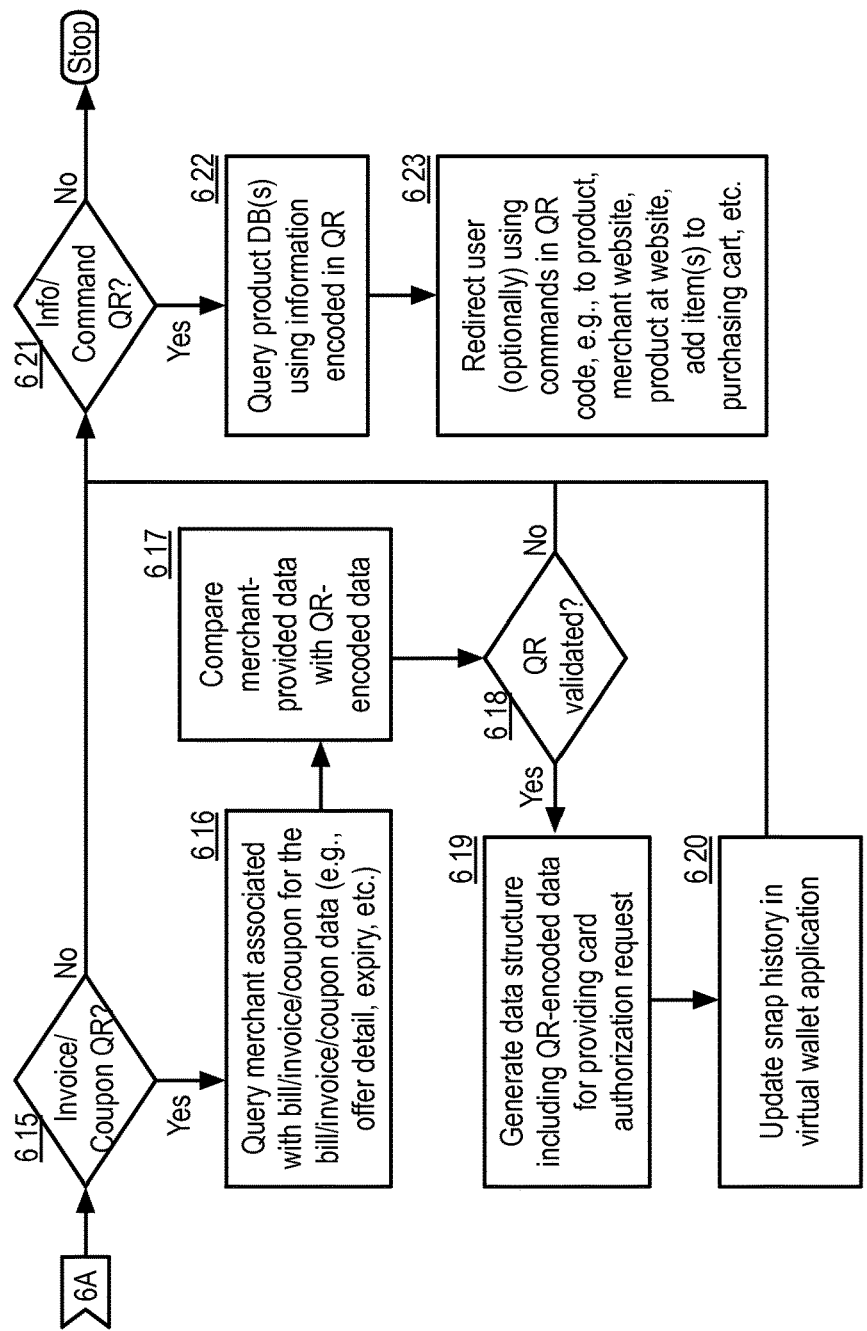

FIGS. 6A-B show logic flow diagrams illustrating example aspects of processing a Quick Response code in some embodiments of the SNAP, e.g., a Quick Response Code Processing ("QRCP") component 600. With reference to FIG. 6A, in some implementations, a virtual wallet application executing on a user device may determine whether a QR code has been captured in an image frame obtained by a camera operatively connected to the user device, and may also determine the type, contents of the QR code. Using such information, the virtual wallet application may redirect the user experience of the user and/or initiating purchases, update aspects of the virtual wallet application, etc. For example, the virtual wallet application may trigger the capture of an image frame by a camera operatively connected to the user device, 601. The virtual wallet application may utilize an image segmentation algorithm to identify a foreground in the image, 602, and may crop the rest of the image to reduce background noise in the image, 603. The virtual wallet application may determine whether the foreground image includes a QR code from which data can be reliably read (e.g., this may not be so if the image does not include a QR code, or the QR code is partially cropped, blurred, etc.), 604. For example, the virtual wallet application may utilize a code library such as the ZXing multi-format 1D/2D barcode image processing library, available at http://code.google.com/p/zxing/ to try and extract the information from the QR code. If the virtual wallet application is able to detect a QR code (605, option "Yes"), the virtual wallet application may decode the QR code, and extract data from the QR code. If the virtual wallet application is unable to detect a QR code (605, option "No"), the virtual wallet application may attempt to perform Optical Character Recognition on the image. For example, the virtual wallet application may utilize the Tesseract C++ open source OCR engine, available at www.pixel-technology-.com/freewarw/tessnet2, to perform the optical character recognition, 606. Thus, the virtual wallet application may obtain the data encoded into the image, and may continue if the data can be processed by the virtual wallet application. The virtual wallet application may query a database using fields identified in the extracted data, for a type of the QR code, 608. For example, the QR code could include an invoice/bill, a coupon, a money order (e.g., in a P2P transfer), a new account information packet, product information, purchase commands, URL navigation instructions, browser automation scripts, combinations thereof, and/or the like.

In some embodiments, the QR code may include data on a new account to be added to the virtual wallet application (see 609). The virtual wallet application may query an issuer of the new account (as obtained from the extracted data), for the data associated with the new account, 610. The virtual wallet application may compare the issuer-provided data to the data extracted from the QR code, 611. If the new account is validated (611, option "Yes"), the virtual wallet application may update the wallet credentials with the details of the new account, 613, and update the snap history of the virtual wallet application using the data from the QR code, 614.

With reference to FIG. 6B, in some embodiments, the QR code may include data on a bill, invoice, or coupon for a purchase using the virtual wallet application (see 615). The virtual wallet application may query merchant(s) associated with the purchase (as obtained from the extracted data), for the data associated with the bill, invoice, or coupon for a purchase (e.g., offer details, offer ID, expiry time, etc.), 616. The virtual wallet application may compare the merchant-provided data to the data extracted from the QR code, 617. If the bill, invoice, or coupon for a purchase is validated (618, option "Yes"), the virtual wallet application may generate a data structure (see e.g., XML QR_data structure in description above with reference to FIGS. 4-5) including the QR-encoded data for generating and providing a card authorization request, 619, and update the snap history of the virtual wallet application using the data from the QR code, 620.

In some embodiments, the QR code may include product information, commands, user navigation instructions, etc. for the virtual wallet application (see 621). The virtual wallet application may query a product database using the information encoded in the QR. The virtual wallet application may provide various features including, without limitation, displaying product information, redirecting the user to: a product page, a merchant website, a product page on a merchant website, add item(s) to a user shopping cart at a merchant website, etc. In some implementations, the virtual wallet application may perform a procedure such as described above for any image frame pending to be processed, and/or selected for processing by the user (e.g., from the snap history).

Figure 7:
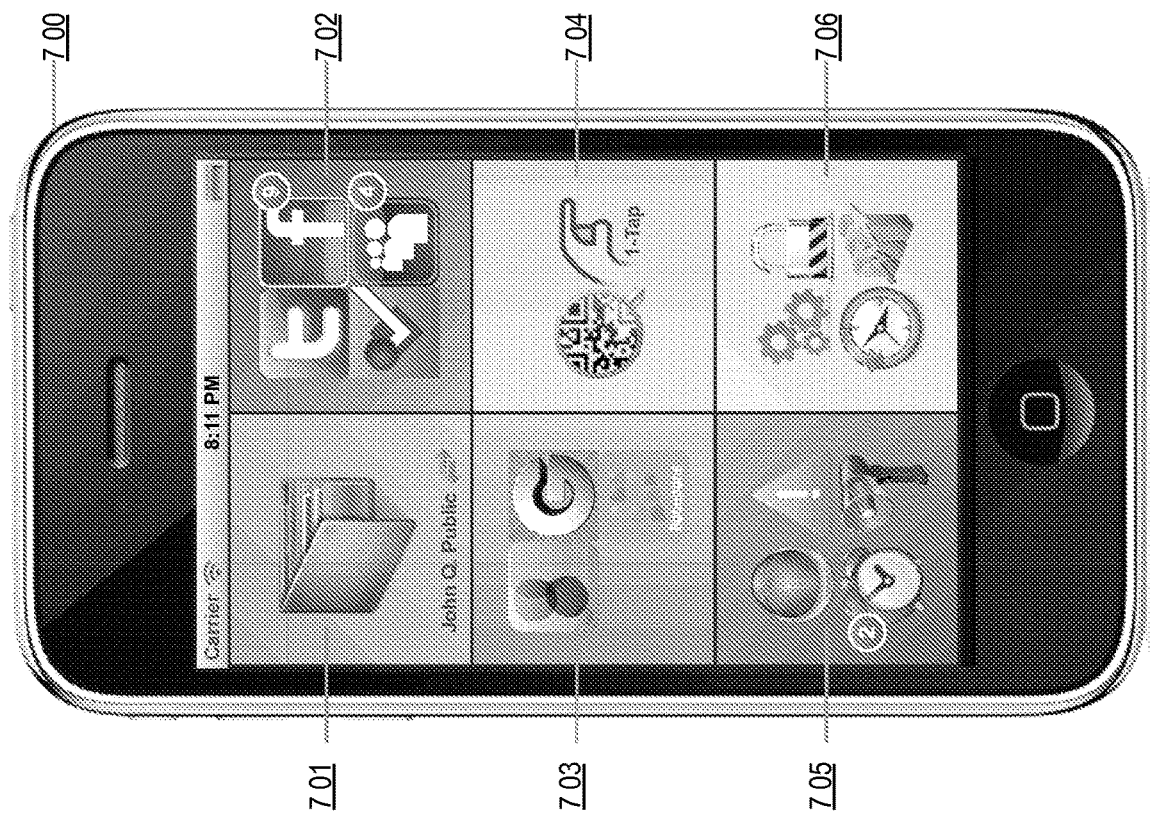
FIG. 7 shows a user interface diagram illustrating an overview of example features of virtual wallet applications in some embodiments of the SNAP.

FIG. 7 shows a user interface diagram illustrating an overview of example features of virtual wallet applications in some embodiments of the SNAP. FIG. 7 shows an illustration of various exemplary features of a virtual wallet mobile application 700. Some of the features displayed include a wallet 701, social integration via TWITTER, FACEBOOK, etc., offers and loyalty 703, snap mobile purchase 704, alerts 705 and security, setting and analytics 796. These features are explored in further detail below.

Figure 8B:
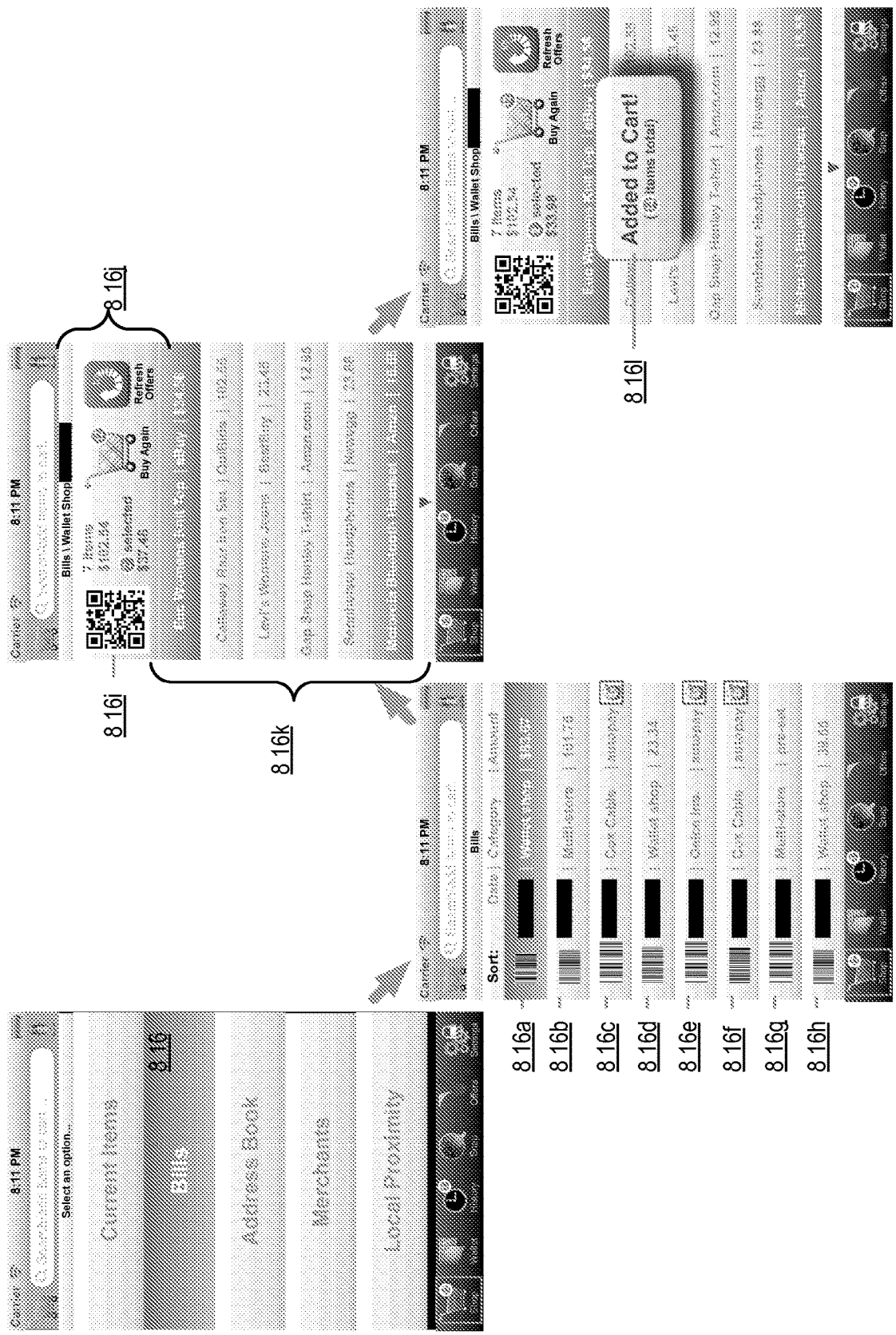

FIGS. 8A-G show user interface diagrams illustrating example features of virtual wallet applications in a shopping mode, in some embodiments of the SNAP. With reference to FIG. 8A, some embodiments of the virtual wallet mobile app facilitate and greatly enhance the shopping experience of consumers. A variety of shopping modes, as shown in FIG. 8A, may be available for a consumer to peruse. In one implementation, for example, a user may launch the shopping mode by selecting the shop icon 810 at the bottom of the user interface. A user may type in an item in the search field 812 to search and/or add an item to a cart 811. A user may also use a voice activated shopping mode by saying the name or description of an item to be searched and/or added to the cart into a microphone 813. In a further implementation, a user may also select other shopping options 814 such as current items 815, bills 816, address book 817, merchants 818 and local proximity 819.

In one embodiment, for example, a user may select the option current items 815, as shown in the left most user interface of FIG. 8A. When the current items 815 option is selected, the middle user interface may be displayed. As shown, the middle user interface may provide a current list of items 815*a-h* in a user's shopping cart 811. A user may select an item, for example item 815*a*, to view product description 815*j* of the selected item and/or other items from the same merchant. The price and total payable information may also be displayed, along with a QR code 815*k* that captures the information necessary to effect a snap mobile purchase transaction.

With reference to FIG. 8B, in another embodiment, a user may select the bills 816 option. Upon selecting the bills 816 option, the user interface may display a list of bills and/or receipts 816*a-h* from one or more merchants. Next to each of the bills, additional information such as date of visit, whether items from multiple stores are present, last bill payment date, auto-payment, number of items, and/or the like may be displayed. In one example, the wallet shop bill 816*a* dated Jan. 20, 2011 may be selected. The wallet shop bill selection may display a user interface that provides a variety of information regarding the selected bill. For example, the user interface may display a list of items 816*k* purchased, <<816*i*>>, a total number of items and the corresponding value. For example, 7 items worth $102.54 were in the selected wallet shop bill. A user may now select any of the items and select buy again to add purchase the items. The user may also refresh offers 816*j* to clear any invalid offers from last time and/or search for new offers that may be applicable for the current purchase. As shown in FIG. 8B, a user may select two items for repeat purchase. Upon addition, a message 816*l* may be displayed to confirm the addition of the two items, which makes the total number of items in the cart 14.

Figure 8C:
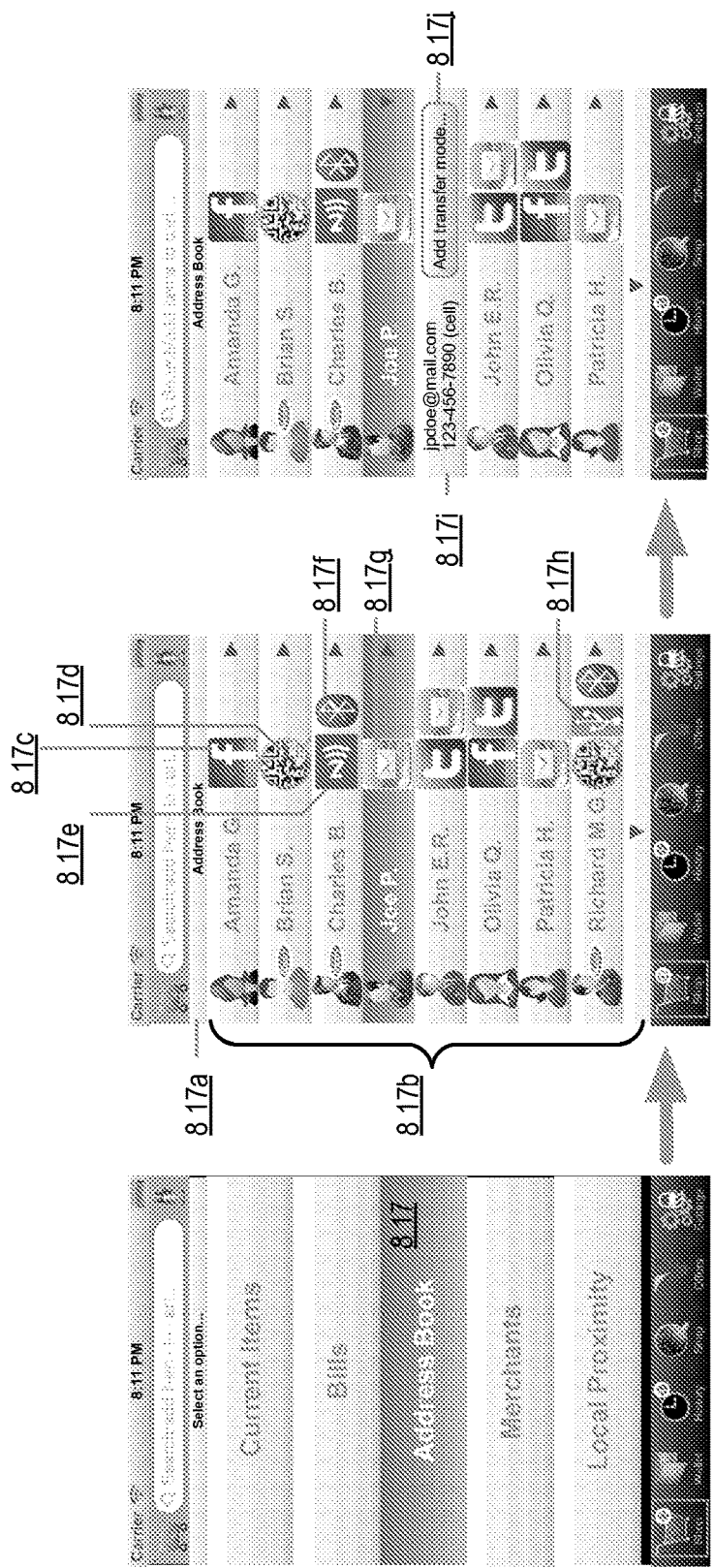

With reference to FIG. 8C, in yet another embodiment, a user may select the address book option 817 to view the address book 817*a* which includes a list of contacts 817*b* and make any money transfers or payments. In one embodiment, the address book may identify each contact using their names and available and/or preferred modes of payment. For example, a contact Amanda G. may be paid via social pay (e.g., via FACEBOOK) as indicated by the icon 817*c*. In another example, money may be transferred to Brian S. via QR code as indicated by the QR code icon 817*d*. In yet another example, Charles B. may accept payment via near field communication 817*e*, Bluetooth 817*f* and email 817*g*. Payment may also be made via USB 817*h* (e.g., by physically connecting two mobile devices) as well as other social channels such as TWITTER.

Figure 8D:
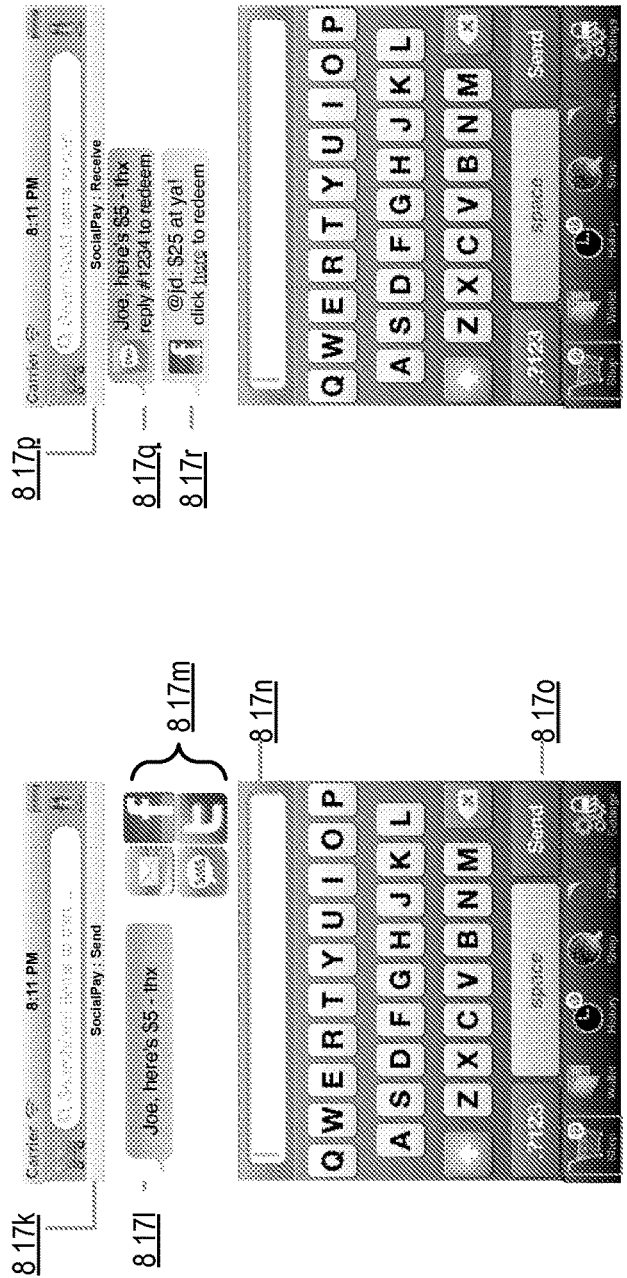

In one implementation, a user may select Joe P. for payment. Joe P., as shown in the user interface, has an email icon 817*g* next to his name indicating that Joe P. accepts payment via email. When his name is selected, the user interface may display his contact information such as email, phone, etc. If a user wishes to make a payment to Joe P. by a method other than email, the user may add another transfer mode 817*j* to his contact information and make a payment transfer. With reference to FIG. 8D, the user may be provided with a screen 817*k* where the user can enter an amount to send Joe, as well as add other text to provide Joe with context for the payment transaction 817*l*. The user can choose modes (e.g., SMS, email, social networking) via which Joe may be contacted via graphical user interface elements, 817*m*. As the user types, the text entered may be provided for review within a GUI element 817*n*. When the user has completed entering in the necessary information, the user can press the send button 817*o* to send the social message to Joe. If Joe also has a virtual wallet application, Joe may be able to review 817*p* social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 8D, the SMS 817*q* Joe received indicates that Joe can redeem the $5 obtained via SMS by replying to the SMS and entering the hash tag value '#1234'. In the same illustration, Joe has also received a message 817*r* via Facebook®, which includes a URL link that Joe can activate to initiate redemption of the $25 payment.

Figure 8E:

With reference to FIG. 8E, in some other embodiments, a user may select merchants 818 from the list of options in the shopping mode to view a select list of merchants 818*a-e*. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 818a for example. The user may then navigate through the merchant's listings to find items of interest such as 818f-j. Directly through the wallet and without visiting the merchant site from a separate page, the user may make a selection of an item 818j from the catalog of Amazon 818a. As shown in the right most user interface of FIG. 8D, the selected item may then be added to cart. The message 818k indicates that the selected item has been added to the cart, and updated number of items in the cart is now 13.

Figure 8F:

With reference to FIG. 8F, in one embodiment, there may be a local proximity option 819 which may be selected by a user to view a list of merchants that are geographically in close proximity to the user. For example, the list of merchants 819a-e may be the merchants that are located close to the user. In one implementation, the mobile application may further identify when the user in a store based on the user's location. For example, position icon 819d may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 819f-j available on aisle 5 of Walgreens. In one implementation, the user may select corn 819i from his or her mobile application to add to cart 819k.

Figure 8G:
Figure 8G:
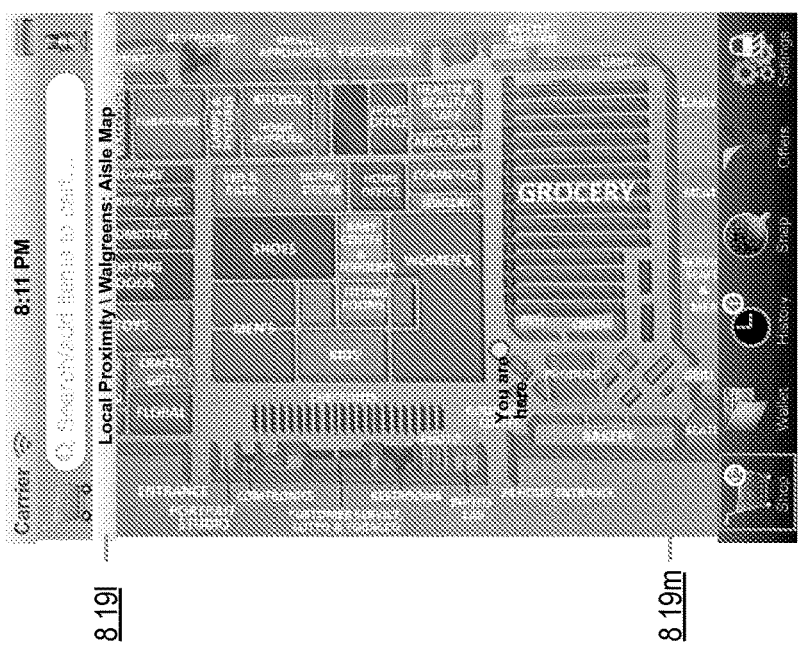
Figure 9A:
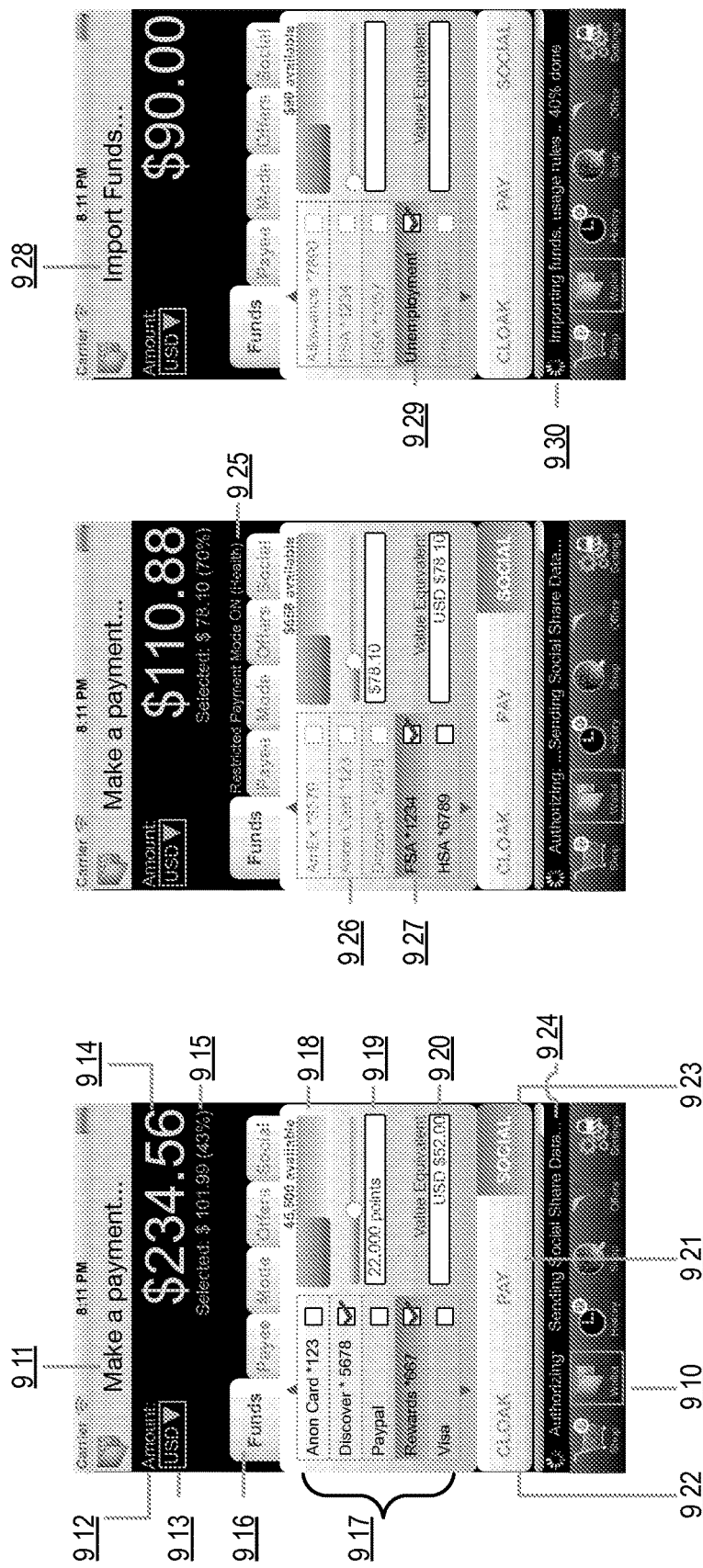
FIGS. 9A-F show user interface diagrams illustrating example features of virtual wallet applications in a payment mode, in some embodiments of the SNAP.

With reference to FIG. 8G, in another embodiment, the local proximity option 819 may include a store map and a real time map features among others. For example, upon selecting the Walgreens store, the user may launch an aisle map 819l which displays a map 819m showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 819n may display images/video of the user's surrounding. For example, if the user is about to enter aisle 5, the store view map may show the view of aisle 5. Further the user may manipulate the orientation of the map using the navigation tool 819o to move the store view forwards, backwards, right, left as well clockwise and counterclockwise rotation FIGS. 9A-F show user interface diagrams illustrating example features of virtual wallet applications in a payment mode, in some embodiments of the SNAP. With reference to FIG. 9A, in one embodiment, the wallet mobile application may provide a user with a number of options for paying for a transaction via the wallet mode 910. In one implementation, an example user interface 911 for making a payment is shown. The user interface may clearly identify the amount 912 and the currency 913 for the transaction. The amount may be the amount payable and the currency may include real currencies such as dollars and euros, as well as virtual currencies such as reward points. The amount of the transaction 914 may also be prominently displayed on the user interface. The user may select the funds tab 916 to select one or more forms of payment 917, which may include various credit, debit, gift, rewards and/or prepaid cards. The user may also have the option of paying, wholly or in part, with reward points. For example, the graphical indicator 918 on the user interface shows the number of points available, the graphical indicator 919 shows the number of points to be used towards the amount due 234.56 and the equivalent 920 of the number of points in a selected currency (USD, for example).

In one implementation, the user may combine funds from multiple sources to pay for the transaction. The amount 915 displayed on the user interface may provide an indication of the amount of total funds covered so far by the selected forms of payment (e.g., Discover card and rewards points). The user may choose another form of payment or adjust the amount to be debited from one or more forms of payment until the amount 915 matches the amount payable 914. Once the amounts to be debited from one or more forms of payment are finalized by the user, payment authorization may begin.

In one implementation, the user may select a secure authorization of the transaction by selecting the cloak button 922 to effectively cloak or anonymize some (e.g., pre-configured) or all identifying information such that when the user selects pay button 921, the transaction authorization is conducted in a secure and anonymous manner. In another implementation, the user may select the pay button 921 which may use standard authorization techniques for transaction processing. In yet another implementation, when the user selects the social button 923, a message regarding the transaction may be communicated to one of more social networks (set up by the user) which may post or announce the purchase transaction in a social forum such as a wall post or a tweet. In one implementation, the user may select a social payment processing option 923. The indicator 924 may show the authorizing and sending social share data in progress.

In another implementation, a restricted payment mode 925 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 926 under the funds tab to select specialized accounts such as a flexible spending account (FSA) 927, health savings account (HAS), and/or the like and amounts to be debited to the selected accounts. In one implementation, such restricted payment mode 1925 processing may disable social sharing of purchase information.

In one embodiment, the wallet mobile application may facilitate importing of funds via the import funds user interface 928. For example, a user who is unemployed may obtain unemployment benefit fund 929 via the wallet mobile application. In one implementation, the entity providing the funds may also configure rules for using the fund as shown by the processing indicator message 930. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 9B:
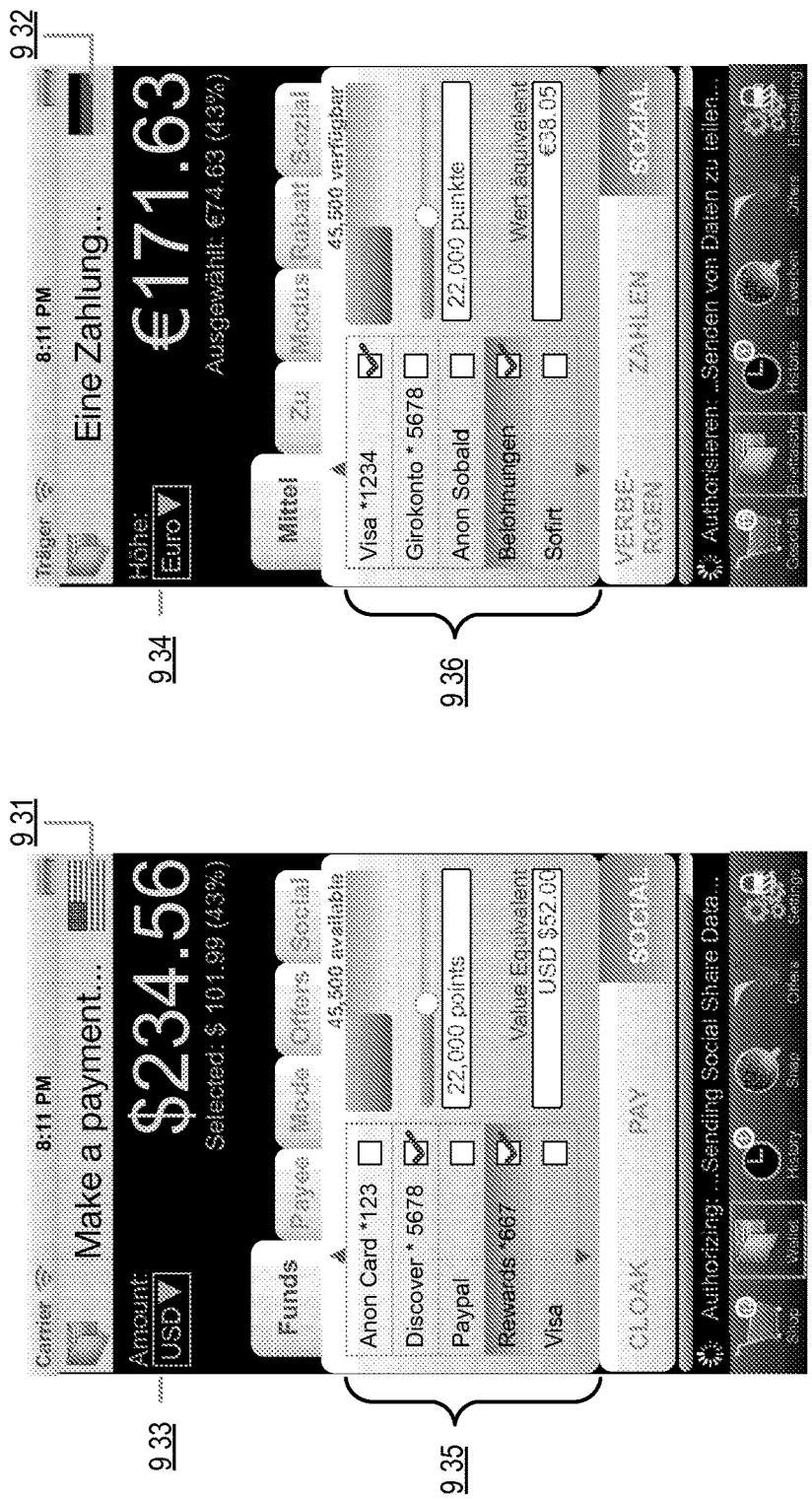

With reference to FIG. 9B, in one embodiment, the wallet mobile application may facilitate dynamic payment optimization based on factors such as user location, preferences and currency value preferences among others. For example, when a user is in the United States, the country indicator 931 may display a flag of the United States and may set the currency 933 to the United States. In a further implementation, the wallet mobile application may automatically rearrange the order in which the forms of payments 935 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 932 and the currency 934. In a further implementation, the wallet application may rearrange the order in which different forms of payment 936 are listed based on their acceptance level in that country. Of course, the order of these forms of payments may be modified by the user to suit his or her own preferences.

Figure 9C:
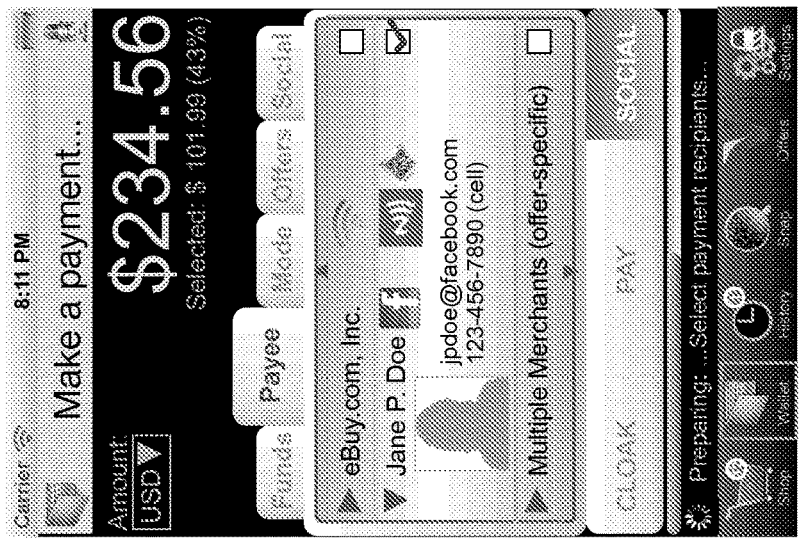
Figure 9C:
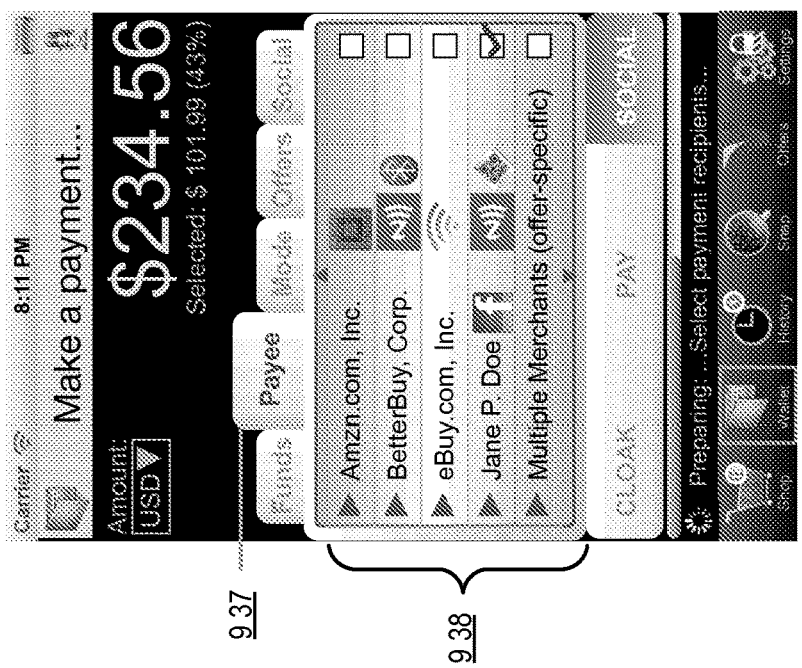

With reference to FIG. 9C, in one embodiment, the payee tab 937 in the wallet mobile application user interface may facilitate user selection of one or more payees receiving the funds selected in the funds tab. In one implementation, the user interface may show a list of all payees 938 with whom the user has previously transacted or available to transact. The user may then select one or more payees. The payees 938 may include larger merchants such as Amazon.com Inc., and individuals such as Jane P. Doe. Next to each payee name, a list of accepted payment modes for the payee may be displayed. In one implementation, the user may select the payee Jane P. Doe 939 for receiving payment. Upon selection, the user interface may display additional identifying information relating to the payee.

Figure 9D:
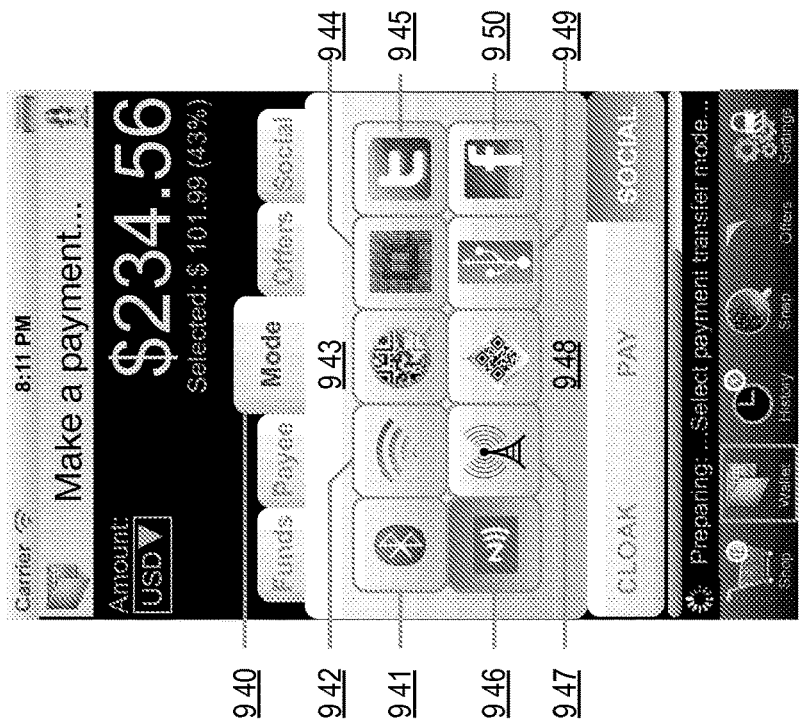

With reference to FIG. 9D, in one embodiment, the mode tab 1940 may facilitate selection of a payment mode accepted by the payee. A number of payment modes may be available for selection. Example modes include, blue tooth 941, wireless 942, snap mobile by user-obtained QR code 943, secure chip 944, TWITTER 945, near-field communication (NFC) 946, cellular 947, snap mobile by user-provided QR code 948, USB 949 and FACEBOOK 950, among others. In one implementation, only the payment modes that are accepted by the payee may be selectable by the user. Other non-accepted payment modes may be disabled.

Figure 9E:
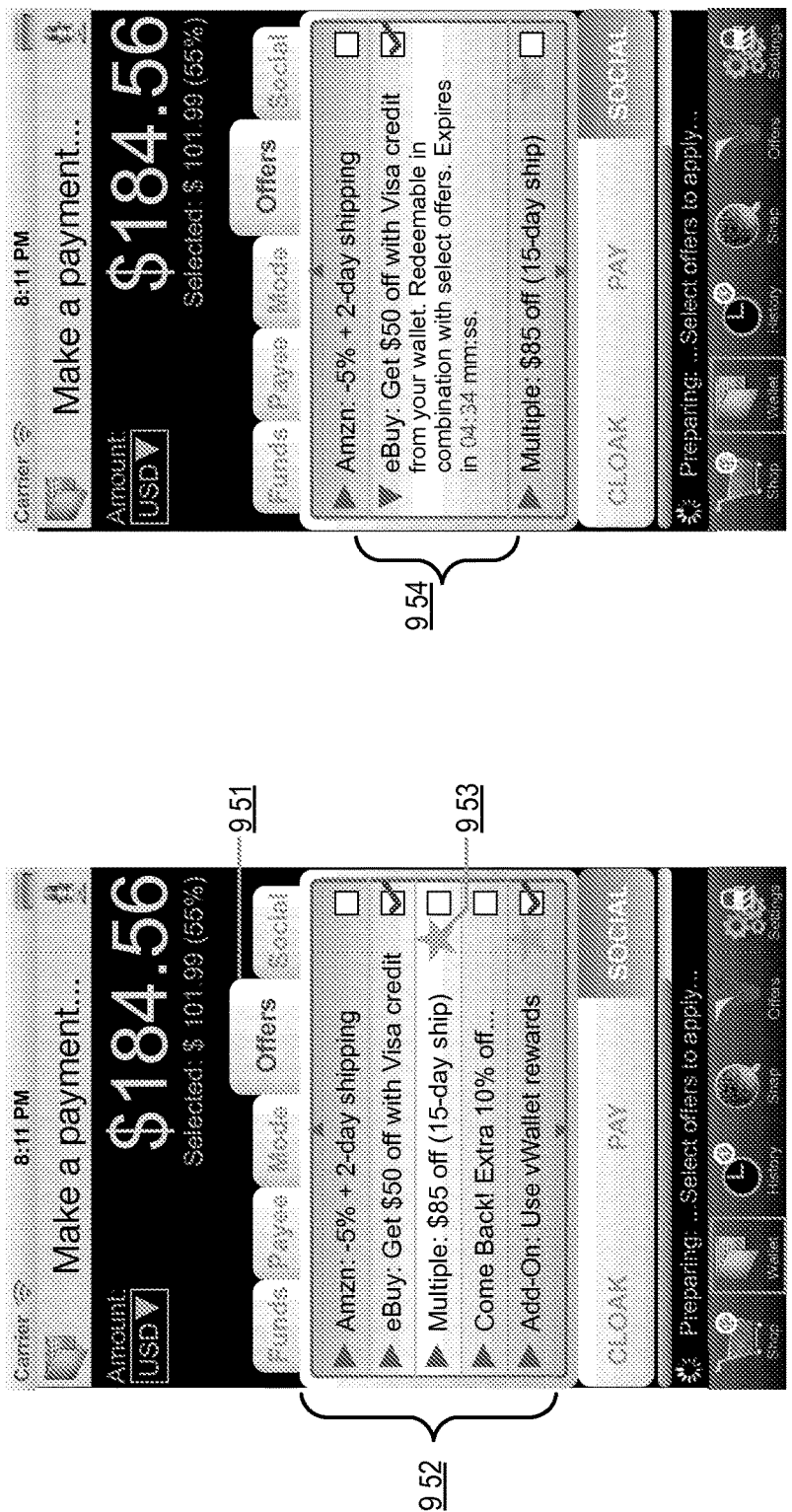

With reference to FIG. 9E, in one embodiment, the offers tab 951 may provide real-time offers that are relevant to items in a user's cart for selection by the user. The user may select one or more offers from the list of applicable offers 952 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 953. In a further implementation, the user may read the details of the offer by expanding the offer row as shown by 954 in the user interface.

Figure 9F:
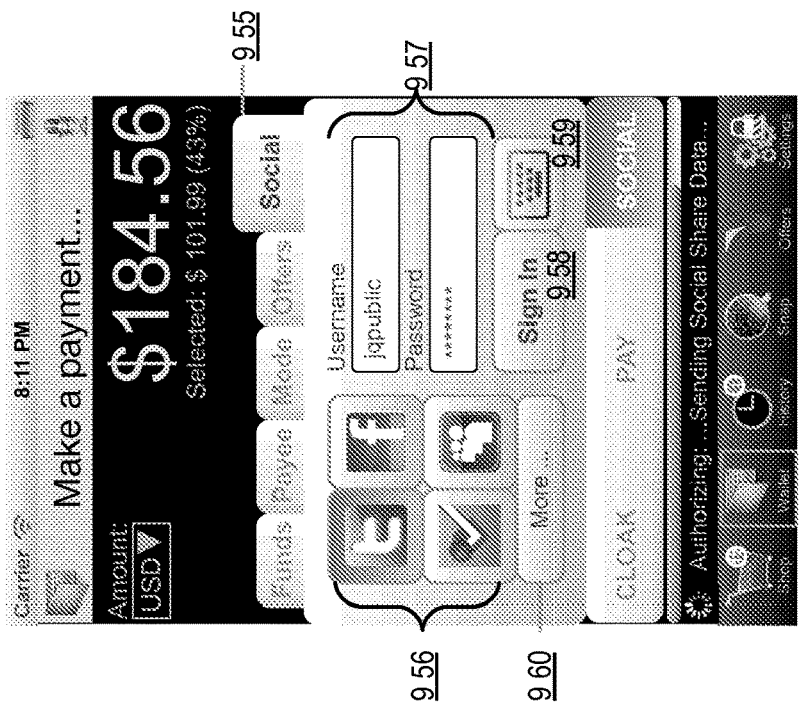

With reference to FIG. 9F, in one embodiment, the social tab 955 may facilitate integration of the wallet application with social channels 956. In one implementation, a user may select one or more social channels 956 and may sign in to the selected social channel from the wallet application by providing to the wallet application the social channel user name and password 957 and signing in 958. The user may then use the social button 959 to send or receive money through the integrated social channels. In a further implementation, the user may send social share data such as purchase information or links through integrated social channels. In another embodiment, the user supplied login credentials may allow SNAP to engage in interception parsing.

Figure 10:
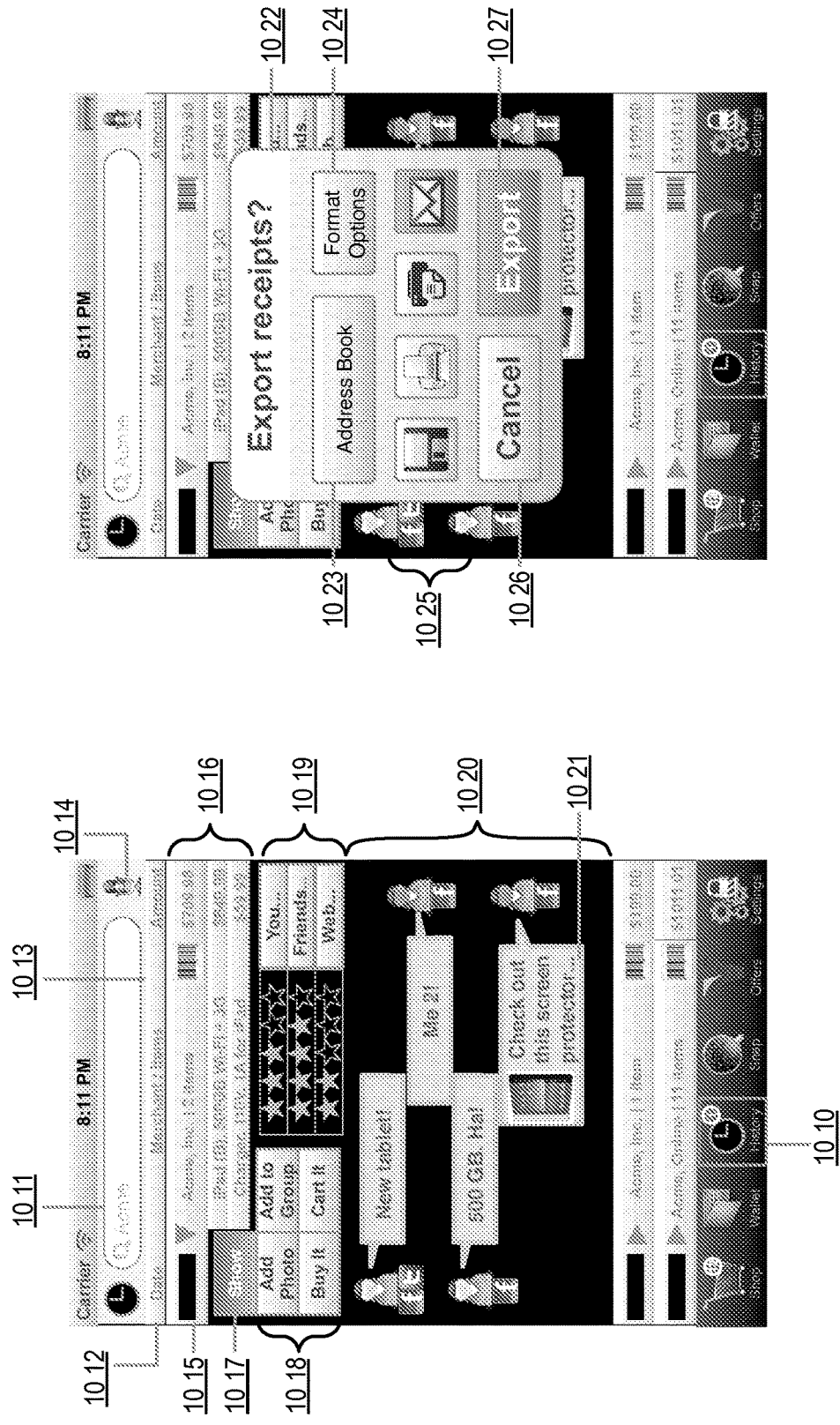
FIG. 10 shows a user interface diagram illustrating example features of virtual wallet applications, in a history mode, in some embodiments of the SNAP.

FIG. 10 shows a user interface diagram illustrating example features of virtual wallet applications, in a history mode, in some embodiments of the SNAP. In one embodiment, a user may select the history mode 1010 to view a history of prior purchases and perform various actions on those prior purchases. For example, a user may enter a merchant identifying information such as name, product, MCC, and/or the like in the search bar 1011. In another implementation, the user may use voice activated search feature by clicking on the microphone icon 1014. The wallet application may query the storage areas in the mobile device or elsewhere (e.g., one or more databases and/or tables remote from the mobile device) for transactions matching the search keywords. The user interface may then display the results of the query such as transaction 1015. The user interface may also identify the date 1012 of the transaction, the merchants and items 1013 relating to the transaction, a barcode of the receipt confirming that a transaction was made, the amount of the transaction and any other relevant information.

In one implementation, the user may select a transaction, for example transaction 1015, to view the details of the transaction. For example, the user may view the details of the items associated with the transaction and the amounts 1016 of each item. In a further implementation, the user may select the show option 1017 to view actions 1018 that the user may take in regards to the transaction or the items in the transaction. For example, the user may add a photo to the transaction (e.g., a picture of the user and the iPad the user bought). In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 1019 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 1020 shows FACEBOOK message exchanges between two users. In one implementation, a user may share a link via a message 1021. Selection of such a message having embedded link to a product may allow the user to view a description of the product and/or purchase the product directly from the history mode.

In one embodiment, the history mode may also include facilities for exporting receipts. The export receipts pop up 1022 may provide a number of options for exporting the receipts of transactions in the history. For example, a user may use one or more of the options 1025, which include save (to local mobile memory, to server, to a cloud account, and/or the like), print to a printer, fax, email, and/or the like. The user may utilize his or her address book 1023 to look up email or fax number for exporting. The user may also specify format options 1024 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 1027 to initiate export of receipts.

Figure 11A:
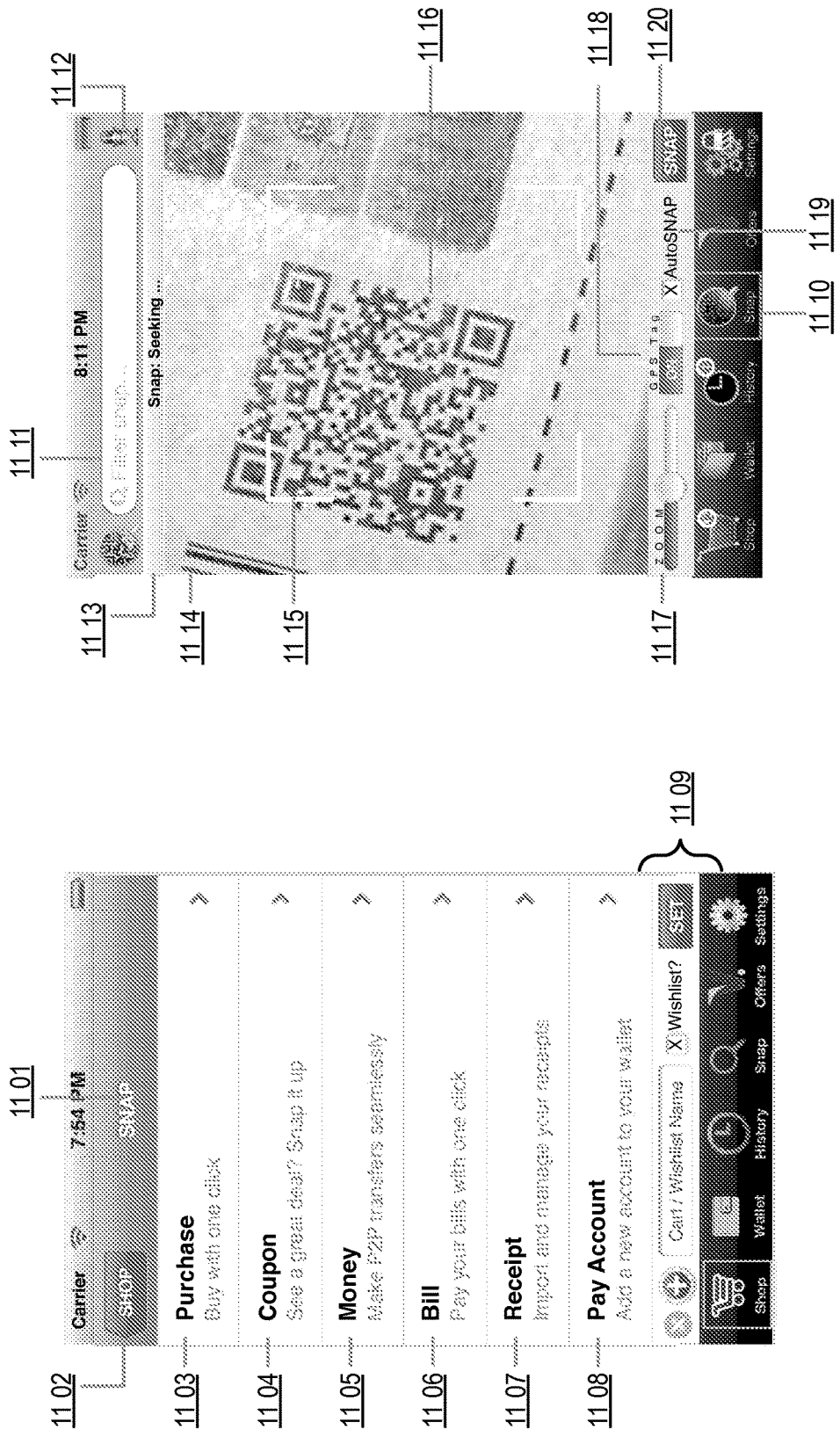

FIGS. 11A-F show user interface diagrams illustrating example features of virtual wallet applications in a snap mode, in some embodiments of the SNAP. With reference to FIG. 11A, in some embodiments, a user may select a snap mode 1101 to access snap features. In various embodiments, the virtual wallet application may able to snap and identify a variety of items. For example, the virtual wallet application may be able to snap and identify a purchase invoice 1103, a coupon 104, money (e.g., sent in a person-to-person transfer) 1105, a bill (e.g., utilities, etc.) 1106, a receipt (e.g., for storing, expense reporting, etc.) 1107, a pay account (e.g., to add a new credit/debit/prepaid card to the virtual wallet application) 1108. The user may be able to return to a shopping screen at any time by activating a graphical user interface element 1102. In some embodiments, the user may be able to set a name of a cart or wishlist stored within the user's virtual wallet application to which the item snapped should be sent (see 1109). In some embodiments, the virtual wallet application may allow a user to create a new cart or wishlist to which the snapped items should be added.

In one embodiment, a user may select the snap mode 1110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 11A. A user may use his or her mobile phone to take a picture of a QR code 1115 and/or a barcode 1114. In one implementation, the bar 1113 and snap frame 1115 may assist the user in snapping codes properly. For example, the snap frame 1115, as shown, does not capture the entirety of the code 1116. As such, the code captured in this view may not be resolvable as information in the code may be incomplete. This is indicated by the message on the bar 1113 that indicates that the snap mode is still seeking the code. The user may modify the zoom level 1117 of the camera to facilitate snapping the QR code. When the code 1116 is completely framed by the snap frame 1115, the bar message may be updated to, for example, "snap found." Upon finding the code, in one implementation, the user may initiate code capture using the mobile device camera (see 1120). In another implementation, the snap mode may automatically snap the code using the mobile device camera (see 1119). In some implementations, the virtual wallet application may optionally apply a Global Positioning System tag (see 1118) to the QR code before storing it, or utilizing it in a transaction.

With reference to FIG. 11B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 1122 the receipt 1123 the user wants to reallocate. Alternatively, the user may directly snap a picture of a barcode on a receipt, and the snap mode may generate and display a receipt 1123 using information from the barcode. The user may now reallocate 1125. In some implementations, the user may also dispute the transaction 1124 or archive the receipt 1126.

In one implementation, when the reallocate button 1125 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 1127 may be generated after the completion of the reallocation process. As discussed, the receipt shows that some charges have been moved from the Visa account to the FSA.

Figure 11C:
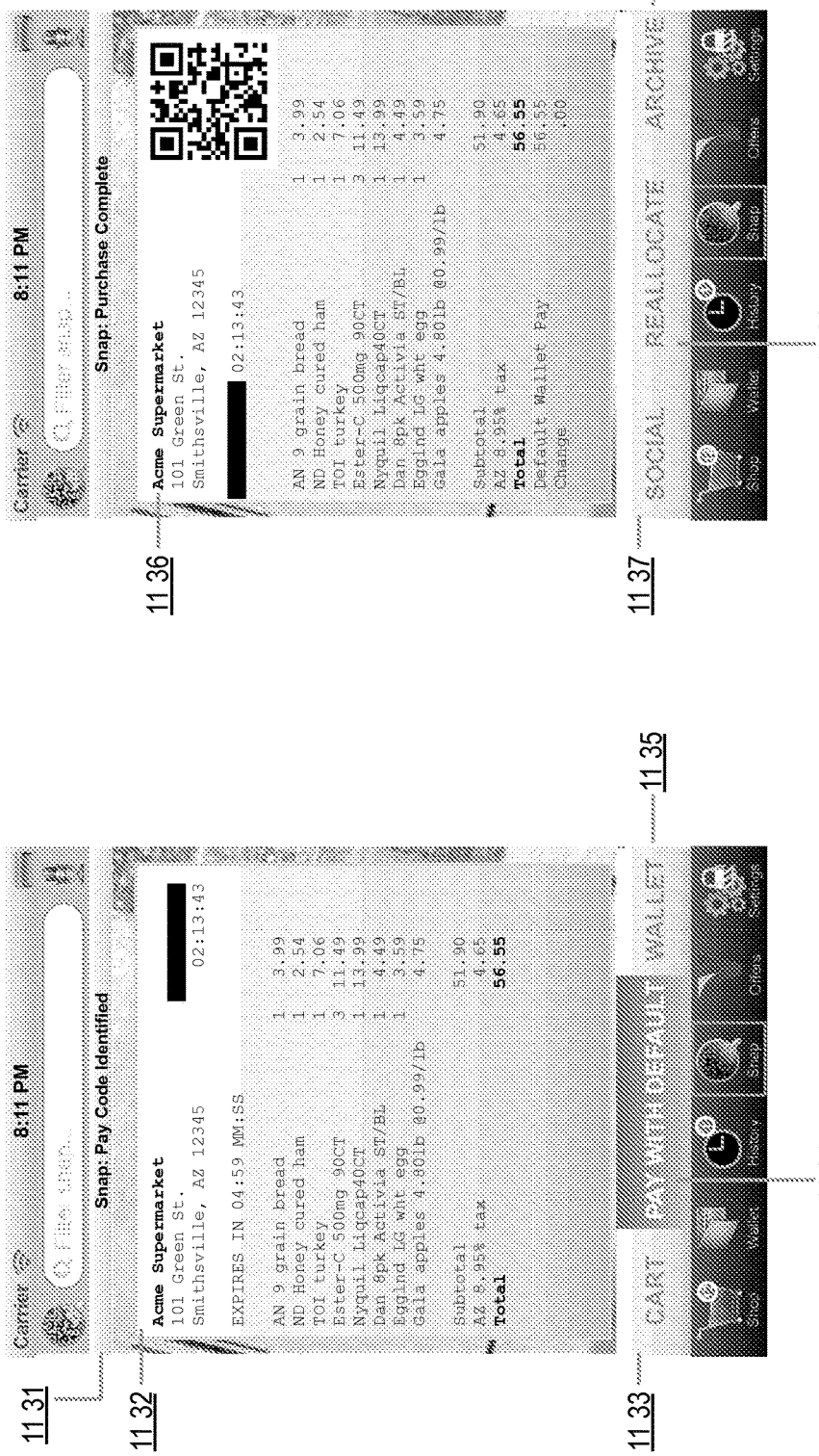

With reference to FIG. 11C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 1132. Once the QR code is identified, the navigation bar 1131 may indicate that the pay code is identified. The user may now have an option to add to cart 1133, pay with a default payment account 1134 or pay with wallet 1135.

In one implementation, the user may decide to pay with default 1134. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 1137 to share purchase information with others, reallocate 1138 as discussed with regard to FIG. 11B, and archive 1139 to store the receipt.

Figure 11D:

With reference to FIG. 11D, in one embodiment, the snap mode may also facilitate offer identification, application and storage for future use. For example, in one implementation, a user may snap an offer code 1141 (e.g., a bar code, a QR code, and/or the like). The wallet application may then generate an offer text 1142 from the information encoded in the offer code. The user may perform a number of actions on the offer code. For example, the user use the find button 1143 to find all merchants who accept the offer code, merchants in the proximity who accept the offer code, products from merchants that qualify for the offer code, and/or the like. The user may also apply the offer code to items that are currently in the cart using the add to cart button 1144. Furthermore, the user may also save the offer for future use by selecting the save button 1145.

In one implementation, after the offer or coupon 1146 is applied, the user may have the option to find qualifying merchants and/or products using find, the user may go to the wallet using 1148, and the user may also save the offer or coupon 1146 for later use.

With reference to FIG. 11E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 1151 and may display the textual information 1152 encoded in the pay card. The user may then perform verification of the information 1152 by selecting the verify button 1153. In one implementation, the verification may include contacting the issuer of the pay card for confirmation of the decoded information 1152 and any other relevant information. In one implementation, the user may add the pay card to the wallet by selecting the 'add to wallet' button 1154. The instruction to add the pay card to the wallet may cause the pay card to appear as one of the forms of payment under the funds tab 916 discussed in FIG. 9A. The user may also cancel importing of the pay card as a funding source by selecting the cancel button 1155. When the pay card has been added to the wallet, the user interface may be updated to indicate that the importing is complete via the notification display 1156. The user may then access the wallet 1157 to begin using the added pay card as a funding source.

Figure 11F:
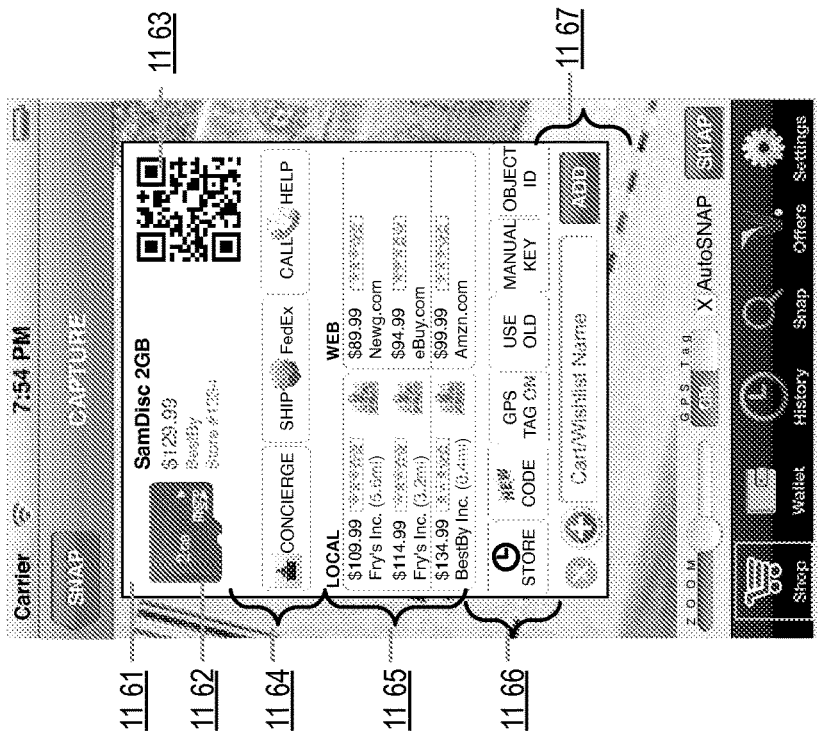

With reference to FIG. 11F, in some implementations, the virtual wallet application may identify a product from processing the QR code, and may provide information about the product, as well as information about options for buying the product, assistive services, and/or the like. For example, the virtual wallet application may provide a window 1161, wherein the virtual wallet application may display images, product specification, prices, merchant information, and/or the like (see 1162). In some implementations, the virtual wallet application may provide a QR code including the displayed information, so that another user may quickly snap the information to import it into another virtual wallet application. In some implementations, the virtual wallet application may provide features so that a user may request concierge services (e.g., assistance while shopping), shipping services (e.g., so the user may leave a store without carrying the items out), 1164. In some implementations, the virtual wallet application may provide competitive prices of local merchants (e.g., using the GPS location of the user device) or merchants on the Internet (see 1165). In some implementations, the virtual wallet application may provide the user with features including, but not limited to: viewing prior snaps, snapping a new code, adding GPS tags to codes, retrieving a previously snapped code for use, entering manual information about a QR code, attribute the QR code to an object (e.g., so that QR codes for home furniture products may be grouped into a "bedroom furniture" object, for organization purposes), etc. (see 1166). In some embodiments, the user may be able to set a name of a cart or wishlist stored within the user's virtual wallet application to which the item snapped should be sent (see 1167). In some embodiments, the virtual wallet application may allow a user to create a new cart or wishlist to which the snapped items should be added.

Figure 12:
FIG. 12 shows a user interface diagram illustrating example features of virtual wallet applications, in an offers mode, in some embodiments of the SNAP.

FIG. 12 shows a user interface diagram illustrating example features of virtual wallet applications, in an offers mode, in some embodiments of the SNAP. In some implementations, the SNAP may allow a user to search for offers for products and/or services from within the virtual wallet mobile application. For example, the user may enter text into a graphical user interface ("GUI") element 1211, or issue voice commands by activating GUI element 1212 and speaking commands into the device. In some implementations, the SNAP may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 1213. For example, the offer may provide a discount, and may include an expiry time. In some implementations, other users may provide gifts (e.g., 1214) to the user, which the user may redeem. In some implementations, the offers section may include alerts as to payment of funds outstanding to other users (e.g., 1215). In some implementations, the offers section may include alerts as to requesting receipt of funds from other users (e.g., 1216). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the SNAP, e.g., 1217-1219, 1220. These offers may sometimes be assembled using a combination of participating merchants, e.g., 1217. In some implementations, the SNAP itself may provide offers for users contingent on the user utilizing particular payment forms from within the virtual wallet application, e.g., 1220.

Figure 13A:
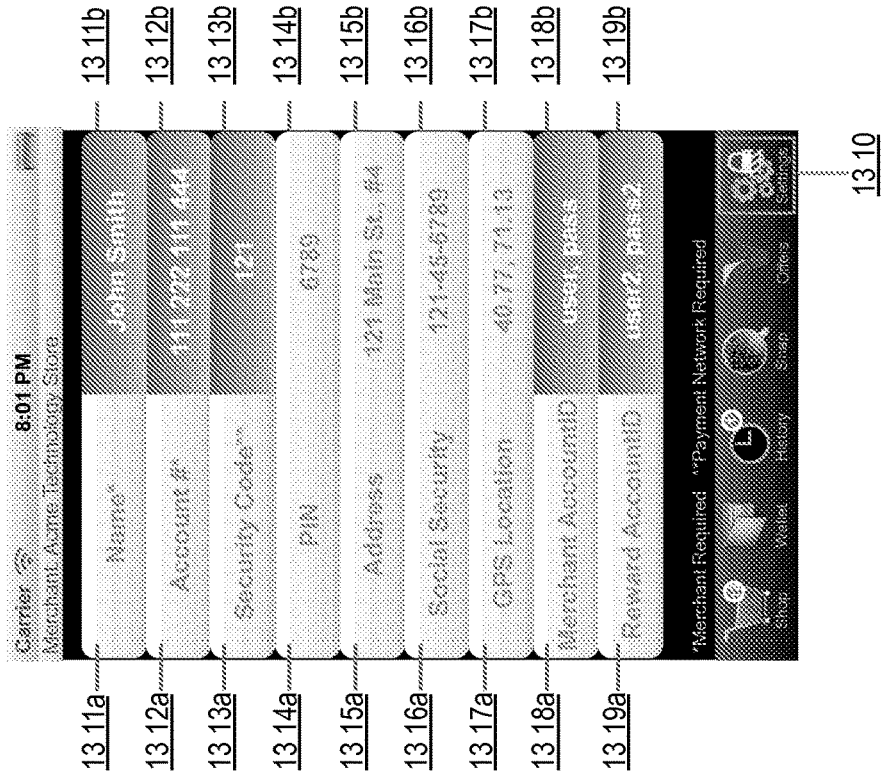
FIGS. 13A-B show user interface diagrams illustrating example features of virtual wallet applications, in a security and privacy mode, in some embodiments of the SNAP.
Figure 13B:
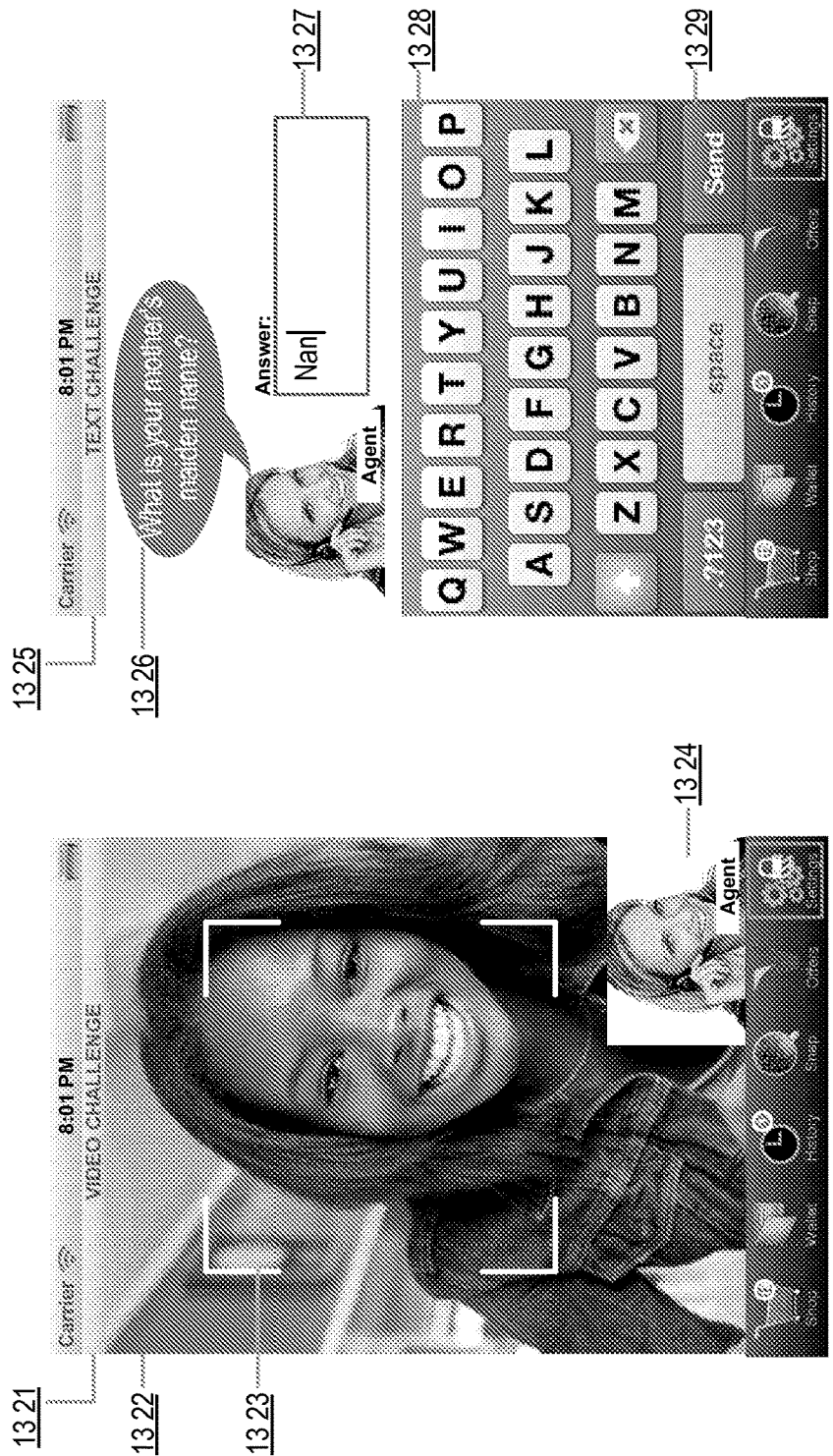

FIGS. 13A-B show user interface diagrams illustrating example features of virtual wallet applications, in a security and privacy mode, in some embodiments of the SNAP. With reference to FIG. 13A, in some implementations, the user may be able to view and/or modify the user profile and/or settings of the user, e.g., by activating a user interface element. For example, the user may be able to view/modify a user name (e.g., 1311a-b), account number (e.g., 1312a-b), user security access code (e.g., 1313-b), user pin (e.g., 1314-b), user address (e.g., 1315-b), social security number associated with the user (e.g., 1316-b), current device GPS location (e.g., 1317-b), user account of the merchant in whose store the user currently is (e.g., 121318-b), the user's rewards accounts (e.g., 1319-b), and/or the like. In some implementations, the user may be able to select which of the data fields and their associated values should be transmitted to facilitate the purchase transaction, thus providing enhanced data security for the user. For example, in the example illustration in FIG. 13A, the user has selected the name 1311a, account number 1312a, security code 1313a, merchant account ID 1318a and rewards account ID 1319a as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the SNAP with the GPS location of the user. Based on the GPS location of the user, the SNAP may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 13B, in some implementations, the app executing on the user's device may provide a "Verify-Chat" feature for fraud prevention. For example, the SNAP may detect an unusual and/or suspicious transaction. The SNAP may utilize the VerifyChat feature to communicate with the user, and verify the authenticity of the originator of the purchase transaction. In various implementations, the SNAP may send electronic mail message, text (SMS) messages, Facebook® messages, Twitter™ tweets, text chat, voice chat, video chat (e.g., Apple FaceTime), and/or the like to communicate with the user. For example, the SNAP may initiate a video challenge for the user, e.g., 1321. For example, the user may need to present him/her-self via a video chat, e.g., 1322. In some implementations, a customer service representative, e.g., agent 1324, may manually determine the authenticity of the user using the video of the user. In some implementations, the SNAP may utilize face, biometric and/or like recognition (e.g., using pattern classification techniques) to determine the identity of the user. In some implementations, the app may provide reference marker (e.g., cross-hairs, target box, etc.), e.g., 1323, so that the user may the video to facilitate the SNAP's automated recognition of the user. In some implementations, the user may not have initiated the transaction, e.g., the transaction is fraudulent. In such implementations, the user may cancel the challenge. The SNAP may then cancel the transaction, and/or initiate fraud investigation procedures on behalf of the user.

In some implementations, the SNAP may utilize a text challenge procedure to verify the authenticity of the user, e.g., 1325. For example, the SNAP may communicate with the user via text chat, SMS messages, electronic mail, Facebook® messages, Twitter™ tweets, and/or the like. The SNAP may pose a challenge question, e.g., 1326, for the user. The app may provide a user input interface element(s) (e.g., virtual keyboard 1328) to answer the challenge question posed by the SNAP. In some implementations, the challenge question may be randomly selected by the SNAP automatically; in some implementations, a customer service representative may manually communicate with the user. In some implementations, the user may not have initiated the transaction, e.g., the transaction is fraudulent. In such implementations, the user may cancel the text challenge. The SNAP may cancel the transaction, and/or initiate fraud investigation on behalf of the user.

SNAP Controller

Figure 14:
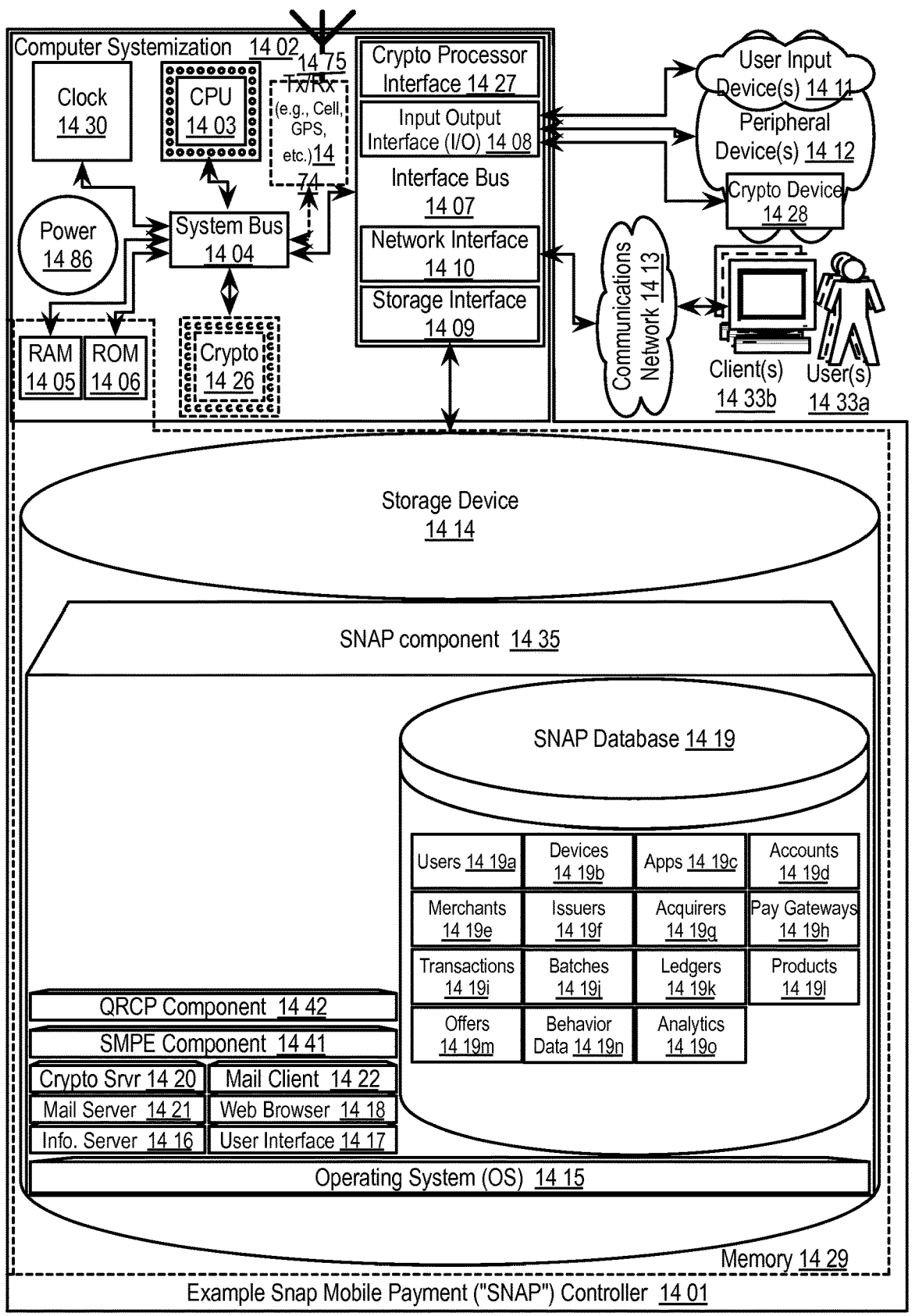
FIG. 14 shows a block diagram illustrating embodiments of a SNAP controller.

FIG. 14 shows a block diagram illustrating embodiments of a SNAP controller 1401. In this embodiment, the SNAP controller 1401 may serve to aggregate, process, store, search, serve, identify, instruct, generate, match, and/or facilitate interactions with a computer through various technologies, and/or other related data.

Typically, users, e.g., 1433a, which may be people and/or other systems, may engage information technology systems (e.g., computers) to facilitate information processing. In turn, computers employ processors to process information; such processors 1403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SNAP controller 1401 may be connected to and/or communicate with entities such as, but not limited to: one or more users from user input devices 1411; peripheral devices 1412; an optional cryptographic processor device 1428; and/or a communications network 1413. For example, the SNAP controller 1401 may be connected to and/or communicate with users, e.g., 1433a, operating client device(s), e.g., 1433b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SNAP controller 1401 may be based on computer systems that may comprise, but are not limited to, components such as: a computer systemization 1402 connected to memory 1429.

Computer Systemization

A computer systemization 1402 may comprise a clock 1430, central processing unit ("CPU(s)" and/or "processor(s)" (these terms are used interchangeable throughout the disclosure unless noted to the contrary)) 1403, a memory 1429 (e.g., a read only memory (ROM) 1406, a random access memory (RAM) 1405, etc.), and/or an interface bus 1407, and most frequently, although not necessarily, are all interconnected and/or communicating through a system bus 1404 on one or more (mother)board(s) 1402 having conductive and/or otherwise transportive circuit pathways through which instructions (e.g., binary encoded signals) may travel to effectuate communications, operations, storage, etc. The computer systemization may be connected to a power source 1486; e.g., optionally the power source may be internal. Optionally, a cryptographic processor 1426 and/or transceivers (e.g., ICs) 1474 may be connected to the system bus. In another embodiment, the cryptographic processor and/or transceivers may be connected as either internal and/or external peripheral devices 1412 via the interface bus I/O. In turn, the transceivers may be connected to antenna(s) 1475, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing SNAP controller to determine its location)); Broadcom BCM4329FKUBG transceiver chip (e.g., providing 802.11n, Bluetooth 2.1+EDR, FM, etc.); a Broadcom BCM4750 IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SNAP controller and beyond through various interfaces. Should processing requirements dictate a greater amount speed and/or capacity, distributed processors (e.g., Distributed SNAP), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the SNAP may be achieved by implementing a microcontroller such as CAST's R8051 XC2 microcontroller; Intel's MCS 51 (i.e., 8051 microcontroller); and/or the like. Also, to implement certain features of the SNAP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SNAP component collection (distributed or otherwise) and/or features may be implemented via the microprocessor and/or via embedded components; e.g., via ASIC, coprocessor, DSP, FPGA, and/or the like. Alternately, some implementations of the SNAP may be implemented with embedded components that are configured and used to achieve a variety of features or signal processing.

Depending on the particular implementation, the embedded components may include software solutions, hardware solutions, and/or some combination of both hardware/software solutions. For example, SNAP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SNAP features. A hierarchy of programmable interconnects allow logic blocks to be interconnected as needed by the SNAP system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the SNAP may be developed on regular FPGAs and then migrated into a fixed version that more resembles ASIC implementations. Alternate or coordinating implementations may migrate SNAP controller features to a final ASIC instead of or in addition to FPGAs. Depending on the implementation all of the aforementioned embedded components and microprocessors may be considered the "CPU" and/or "processor" for the SNAP.

Power Source

The power source 1486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1486 is connected to at least one of the interconnected subsequent components of the SNAP thereby providing an electric current to all subsequent components. In one example, the power source 1486 is connected to the system bus component 1404. In an alternative embodiment, an outside power source 1486 is provided through a connection across the I/O 1408 interface. For example, a USB and/or IEEE 1394 connection carries both data and power across the connection and is therefore a suitable source of power.

Interface Adapters

Interface bus(ses) 1407 may accept, connect, and/or communicate to a number of interface adapters, conventionally although not necessarily in the form of adapter cards, such as but not limited to: input output interfaces (I/O) 1408, storage interfaces 1409, network interfaces 1410, and/or the like. Optionally, cryptographic processor interfaces 1427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1409 may accept, communicate, and/or connect to a number of storage devices such as, but not limited to: storage devices 1414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1410 may accept, communicate, and/or connect to a communications network 1413. Through a communications network 1413, the SNAP controller is accessible through remote clients 1433b (e.g., computers with web browsers) by users 1433a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SNAP), architectures may similarly be employed to pool, load balance, and/or otherwise increase the communicative bandwidth required by the SNAP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1410 may be used to engage with various communications network types 1413. For example, multiple network interfaces may be employed to allow for the communication over broadcast, multicast, and/or unicast networks.

Input Output interfaces (I/O) 1408 may accept, communicate, and/or connect to user input devices 1411, peripheral devices 1412, cryptographic processor devices 1428, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1411 often are a type of peripheral device 1412 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1412 may be connected and/or communicate to I/O and/or other facilities of the like such as network interfaces, storage interfaces, directly to the interface bus, system bus, the CPU, and/or the like. Peripheral devices may be external, internal and/or part of the SNAP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1428), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the SNAP controller may be embodied as an embedded, dedicated, and/or monitor-less (i.e., headless) device, wherein access would be provided over a network interface connection.

Cryptographic units such as, but not limited to, microcontrollers, processors 1426, interfaces 1427, and/or devices 1428 may be attached, and/or communicate with the SNAP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1429. However, memory is a fungible technology and resource, thus, any number of memory embodiments may be employed in lieu of or in concert with one another. It is to be understood that the SNAP controller and/or a computer systemization may employ various forms of memory 1429. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1429 will include ROM 1406, RAM 1405, and a storage device 1414. A storage device 1414 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1429 may contain a collection of program and/or database components and/or data such as, but not limited to: operating system component(s) 1415 (operating system); information server component(s) 1416 (information server); user interface component(s) 1417 (user interface); Web browser component(s) 1418 (Web browser); database(s) 1419; mail server component(s) 1421; mail client component(s) 1422; cryptographic server component(s) 1420 (cryptographic server); the SNAP component(s) 1435; and/or the like (i.e., collectively a component collection). These components may be stored and accessed from the storage devices and/or from storage devices accessible through an interface bus. Although non-conventional program components such as those in the component collection, typically, are stored in a local storage device 1414, they may also be loaded and/or stored in memory such as: peripheral devices, RAM, remote storage facilities through a communications network, ROM, various forms of memory, and/or the like.

Operating System

The operating system component 1415 is an executable program component facilitating the operation of the SNAP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SNAP controller to communicate with other entities through a communications network 1413. Various communication protocols may be used by the SNAP controller as a subcarrier transport mechanism for interaction, such as, but not limited to: multicast, TCP/IP, UDP, unicast, and/or the like.

Information Server

An information server component 1416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SNAP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SNAP database 1419, operating systems, other program components, user interfaces, Web browsers, and/or the like.

Access to the SNAP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SNAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SNAP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1417 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SNAP enabled nodes. The combined application may be nugatory on systems employing standard Web browsers.

Mail Server

A mail server component 1421 is a stored program component that is executed by a CPU 1403. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SNAP.

Access to the SNAP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1422 is a stored program component that is executed by a CPU 1403. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1420 is a stored program component that is executed by a CPU 1403, cryptographic processor 1426, cryptographic processor interface 1427, cryptographic processor device 1428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SNAP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SNAP component to engage in secure transactions if so desired. The cryptographic component facilitates the secure accessing of resources on the SNAP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SNAP Database

The SNAP database component 1419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SNAP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SNAP database is implemented as a data-structure, the use of the SNAP database 1419 may be integrated into another component such as the SNAP component 1435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1419 includes several tables 1419a-o. A Users table 1419a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a SNAP. A Devices table 1419b may include fields such as, but not limited to: device_ID, device_name, device_IP, device_MAC, device_type, device_model, device_version, device_OS, device_apps_list, device_securekey, wallet_app_installed_flag, and/or the like. An Apps table 1419c may include fields such as, but not limited to: app_ID, app_name, app_type, app_dependencies, and/or the like. An Accounts table 1419d may include fields such as, but not limited to: account_number, account_security_code, account_name, issuer_acquirer_flag, issuer_name, acquirer_name, account_address, routing_number, access_API_call, linked_wallets_list, and/or the like. A Merchants table 1419e may include fields such as, but not limited to: merchant_id, merchant_name, merchant_address, ip_address, mac_address, auth_key, port_num, security_settings_list, and/or the like. An Issuers table 1419f may include fields such as, but not limited to: issuer_id, issuer_name, issuer_address, ip_address, mac_address, auth_key, port_num, security_settings_list, and/or the like. An Acquirers table 1419g may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 1419h may include fields such as, but not limited to: gateway_ID, gateway_IP, gateway_MAC, gateway_secure_key, gateway_access_list, gateway_API_call_list, gateway_services_list, and/or the like. A Transactions table 1419i may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping__zipcode, shipping_state, merchant_id, merchant_name, merchant_auth_key, and/or the like. A Batches table 1419j may include fields such as, but not limited to: batch_id, transaction_id_list, timestamp_list, cleared_flag_list, clearance_trigger_settings, and/or the like. A Ledgers table 1419k may include fields such as, but not limited to: request_id, timestamp, deposit_amount, batch_id, transaction_id, clear_flag, deposit_account, transaction_summary, payor_name, payor_account, and/or the like. A Products table 1419l may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 1419m may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 1419n may include fields such as, but not limited to: user_id, timestamp, activity_type, activity_location, activity_attribute_list, activity_attribute_values_list, and/or the like. An Analytics table 1419o may include fields such as, but not limited to: report_id, user_id, report_type, report_algorithm_id, report_destination_address, and/or the like.

In one embodiment, the SNAP database may interact with other database systems. For example, employing a distributed database system, queries and data access by search SNAP component may treat the combination of the SNAP database, an integrated data security layer database as a single database entity.

In one embodiment, user programs may contain various user interface primitives, which may serve to update the SNAP. Also, various accounts may require custom database tables depending upon the environments and the types of clients the SNAP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1419*a-o*. The SNAP may be configured to keep track of various settings, inputs, and parameters via database controllers.

The SNAP database may communicate to and/or with other components in a component collection, including itself, and/or facilities of the like. Most frequently, the SNAP database communicates with the SNAP component, other program components, and/or the like. The database may contain, retain, and provide information regarding other nodes and data.

The SNAPs

The SNAP component 1435 is a stored program component that is executed by a CPU. In one embodiment, the SNAP component incorporates any and/or all combinations of the aspects of the SNAP discussed in the previous figures. As such, the SNAP affects accessing, obtaining and the provision of information, services, transactions, and/or the like across various communications networks.

The SNAP component may transform real-time-generated merchant-product Quick Response codes via SNAP components into virtual wallet card-based transaction purchase notifications, and/or the like and use of the SNAP. In one embodiment, the SNAP component 1435 takes inputs (e.g., checkout input 411; product data 414; payment input 419; issuer server data 423; user data 427*a-n*; and/or the like), and transforms the inputs via SNAP components (e.g., SMPE 1441; QRCP 1442; and/or the like), into outputs (e.g., QR pay code 417; card authorization request 421; authorization response 429*a-n*; authorization success message 433*a-b*; batch append data 435; purchase receipt 436; and/or the like).

The SNAP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SNAP server employs a cryptographic server to encrypt and decrypt communications. The SNAP component may communicate to and/or with other components in a component collection, including itself, and/or facilities of the like. Most frequently, the SNAP component communicates with the SNAP database, operating systems, other program components, and/or the like. The SNAP may contain, communicate, generate, obtain, and/or provide program component, system, user, and/or data communications, requests, and/or responses.

Distributed SNAPs

The structure and/or operation of any of the SNAP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SNAP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SNAP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept
    incoming communication
$sock = socket_create(AF_INET, SOCK_STREAM, 0);
socket_bind($sock, $address, $port) or die ('Could not bind
    to address');
socket_listen($sock);
$client = socket_accept($sock);
// read input data from client device in 1024 byte blocks
    until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); //
    access database server
mysql_select("CLIENT_DB.SQL"); // select database to append
mysql_query("INSERT INTO UserTable (transmission)
    VALUED ($data)"); // add data to UserTable table in a
    CLIENT database
mysql_close("CLIENT_DB.SQL"); // close connection to
    database
?>
```

Also, the following resources may be used to provide example embodiments regarding SOAP parser implementation:

```
http://www.xav.com/perl/site/lib/SOAP/Parser.html
http://publib.boulder.ibm.com/infocenter/tivihelp/v2r1/inde
    x.jsp?topic=/com.ibm.IBMDI.doc/referenceguide295.htm
``` and other parser implementations:

```
http://publib.boulder.ibm.com/infocenter/tivihelp/v2r1/inde
    x.jsp?topic=/com.ibm.IBMDI.doc/referenceguide259.htm
``` all of which are hereby expressly incorporated by reference herein.

Figure 15:
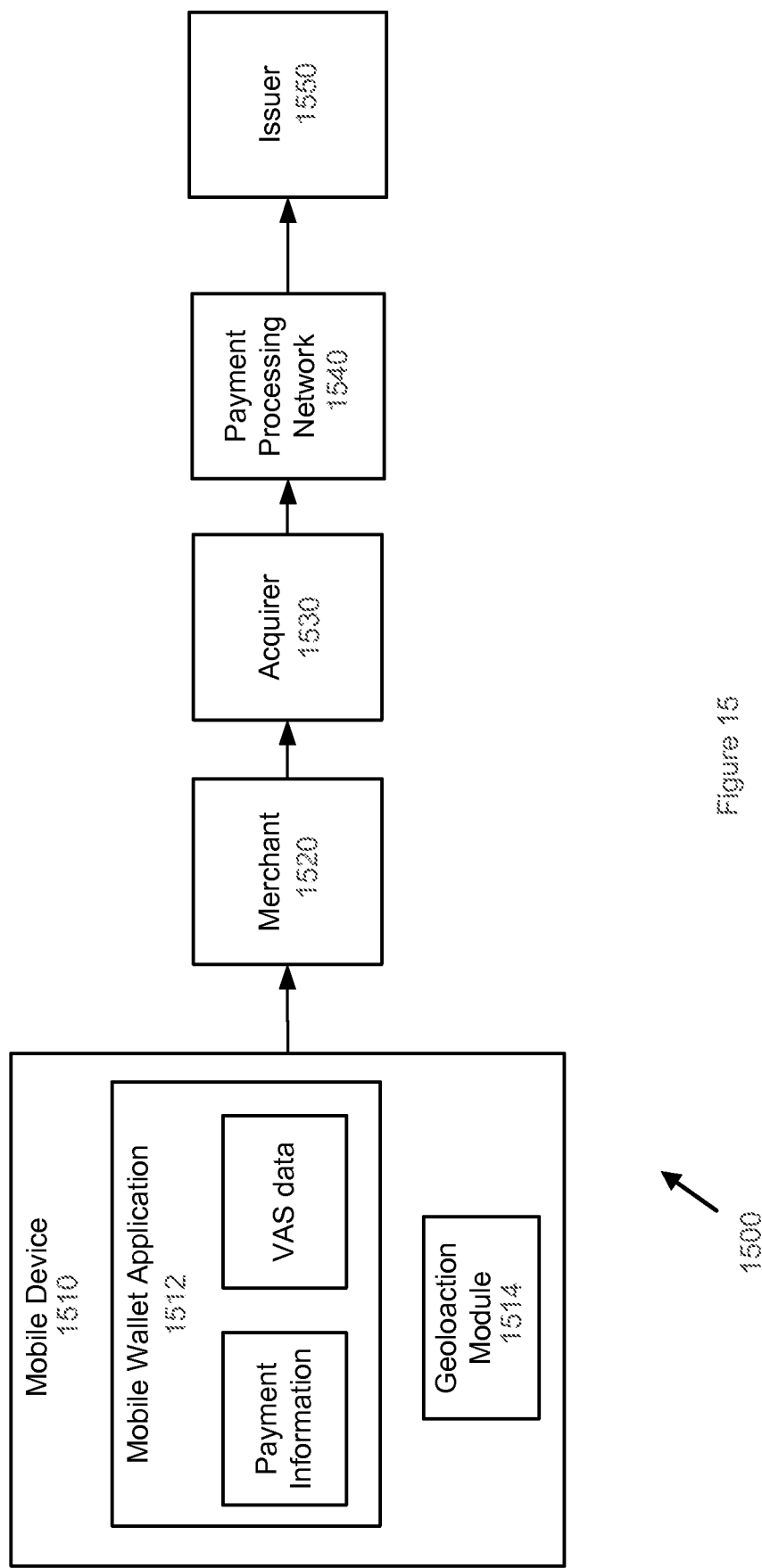
FIG. 15 shows a block diagram of a system overview for providing information to a merchant via a QR code according to an embodiment of the invention.

FIG. 15 shows additional embodiments of the invention. In FIG. 15, a system 1500 is depicted comprising a number of components. The system 1500 comprises a mobile device 1510 that may include a mobile wallet application 1512 and a geolocation module 1514. The mobile wallet application 1512 may include payment information (e.g. payment identifiers associated with a payment account) and/or non-payment identifiers (e.g. VAS data). The system 1500 may further comprise a merchant 1520, an acquirer 1530, a payment processing network 1540, and an issuer 1550. For simplicity of illustration, a certain number of components are shown in FIG. 15. It is understood, however, that embodiments of the invention may include more than one of each component. In addition, some embodiments of the invention may include fewer or greater than all of the components shown in FIG. 15. In addition, the components in FIG. 15 may communicate via any suitable communication medium (including the internet), using any suitable communications protocol.

The mobile device 1510 may be in any suitable form. Examples of mobile devices 1510 may include any device capable of accessing the Internet, such as a personal computer, portable computers, cellular phones, personal digital assistants (PDAs), tablet PCs, and handheld specialized readers. In other embodiments, suitable mobile devices 1510 can be hand-held and compact so that it can fit into a user's wallet and/or pocket (e.g., pocket-sized). The mobile device 1510 can include a processor, and memory, input devices, and output devices, operatively coupled to the processor. Other examples of mobile devices 1510 include cellular or mobile phones, pagers, smart cards, and other devices with messaging capabilities.

The mobile device 1510 may be associated with a consumer. The consumer (e.g., cardholder or user) may be any person in possession of the mobile device 1510, or any person using the mobile device 1510 during a transaction.

The geolocation module 1514 may be associated with the mobile device 1510. The geolocation module 1514 may provide geo-location services (e.g. GPS), and may be able to determine the location of the mobile device 1510. For example, the geolocation module 1514 may determine a set of coordinates or an address associated with the position of the mobile device 1510. In some embodiments, the geolocation module 1514 may locate or communicate with one or more satellites in a GPS network. The geolocation module 1514 may determine the position of the mobile device 1510 based on the relative positions of one or more satellites (e.g. using triangulation), or it may receive information about the position of the mobile device 1510 from the GPS system (e.g. from a GPS satellite). In some embodiments, the geolocation module 1514 may store positioning information associated with one or more satellites, and it may determine the position of the mobile device 1510 based on communications with the one or more satellites. For example, the geolocation module 1514 may determine the distance between the mobile device 1510 and one or more satellites, and may use the distance information to triangulate the position of the mobile device 1510. In some embodiments, the geolocation module 1514 may determine the position of the mobile device 1510 based on communications with other systems, such as a cellular tower network or another network of local positioning beacons.

In some embodiments, the geolocation module 1514 may be able to determine if the consumer and mobile device 1510 are within or near a merchant 1520 location. For example, the geolocation module 1514 may store information about one or more merchant 1520 locations, such as one or more sets of coordinates or addresses associated with one or more merchant 1520 locations. The geolocation module 1514 may determine the position of the mobile device 1510, and then compare the position of the mobile device 1510 with the information about one or more merchant 1520 locations. If the mobile device 1510 has the same position as a merchant 1520 location, or if it is within a predetermined distance of a merchant 1520 location (e.g. within 10, 20, 50, or 100 feet), then the geolocation module 1514 may determine that the consumer and mobile device are within or near the merchant 1520 location. For example, the consumer may be shopping at a certain merchant 1520. In some embodiments, the geolocation module 1514 may be in communication with a GPS system (or another location system), and the GPS system may inform the geolocation module 1514 when the mobile device 1510 is at or near a certain merchant 1520 location.

The geolocation module 1518 may be in communication with the mobile wallet application 1512, and it may inform the mobile wallet application 1512 of the current mobile device 1510 location, as well as whether the mobile device 1510 is at a certain merchant 1520. The geolocation module 1514 may also display the information about the mobile device 1510 location to the consumer.

The mobile wallet application 1512 may enable the consumer to use the mobile device 1510 for mobile payments. It may be able to operate the mobile device 1510 to provide payment information and/or nonpayment information (e.g. VAS data) to the merchant 1520 for a transaction. For example, the mobile wallet application 1512 may cause the mobile device 1510 to transmit payment information and/or VAS data to a merchant access device via NFC, Bluetooth™, RFID, or any other suitable form of data transmission. In some embodiments, the mobile wallet application 1512 may generate a QR code containing payment information and/or VAS data, and the mobile device 1510 may display the QR code so that it can be read by an access device.

The mobile wallet application 1512 may be able to store payment information and/or VAS data. For example, the mobile wallet application 1512 may store payment account information, such as a PAN, an expiration date, a security code, a PIN, and/or any other suitable payment identifier associated with one or more payment accounts. VAS data may also be stored, such as one or more coupons, rewards, special offers, loyalty information, and/or any other suitable non-payment identifiers. In some embodiments, the mobile wallet application 1512 may receive payment identifiers and/or non-payment identifiers (e.g. VAS data) from a server. In some embodiments, the mobile wallet application 1512 may be able to provide a payment identifier such as token representing payment information, as well as a non-payment identifier such as a non-payment token representing VAS data. For example, the mobile wallet application 1512 may be able to generate tokens, or may be able to request and receive tokens.

The consumer may be able to open the mobile wallet application 1512 and select certain payment information or VAS data for use in a transaction. For example, icons or other information representing one or more payment accounts and/or VAS data may be displayed, and the consumer may indicate which information to use for the transaction.

In some embodiments, the mobile wallet application 1512 may automatically select and provide suitable payment information and/or VAS data for a payment. For example, the consumer may indicate a desire to provide payment for a transaction at a certain merchant 1520, and the mobile wallet application 1512 may provide payment information and/or nonpayment information (e.g. VAS data) that is suitable for purchases at that merchant 1520. For example, the mobile wallet application 1520 may automatically select a credit card associated with the merchant 1520, a coupon for a discount at the merchant 1520, loyalty points associated with the merchant 1520, a gift card associated with the merchant 1520, a loyalty account identifier associated with the merchant 1520, or any other suitable information. The payment information and/or VAS data may automatically be provided to the merchant during checkout via QR code, NFC, Bluetooth™, RFID, or any other suitable form of data transmission.

In some embodiments, the geolocation module 1514 may inform the mobile wallet application 1512 of the current mobile device 1510 location, and of a merchant 1520 associated with that location. In some embodiments, the mobile wallet application 1512 may store information about one or more merchant 1520 locations, receive information about the current mobile device 1510 location from the geolocation module 1514, and then may determine a merchant 1520 associated with that the mobile device 1510 location. In some embodiments, the consumer may instead enter information identifying the merchant 1520 into the mobile wallet application 1512. In any case, the mobile wallet application 1512 may then know the identity of merchant 1520 at which the consumer is shopping, and may thus be able to determine the applicable and/or preferable payment information and/or VAS data.

A "merchant" is typically an entity that engages in transactions and can sell goods or services, or provide access to goods or services. In some cases, the merchant may be associated with a transit provider or other access provider. In some cases, the issuer and merchant may be the same entity. For example, a transit provider may both maintain transit accounts for users and operate access devices used to conduct transactions.

The merchant 1520 may include a local VAS module. The local VAS module may be able to receive VAS data and provide associated services. For example, the merchant 1520 may receive a coupon from a consumer during a purchase, and the local VAS module may apply the coupon to the purchase price. In some embodiments, the merchant 1520 may forward VAS data to the acquirer 1530, payment processing network 1540, issuer 1550, or any other suitable entity, and another entity may provide a service to the consumer based on the VAS data.

The acquirer 1530 may be associated with the merchant 1520, and may manage authorization requests on behalf of the merchant 1520. The acquirer 1530 may forward an authorization request from the merchant 1520 to the payment processing network 1540. The acquirer 1530 may also receive an authorization response and forward it to the merchant 1520.

The payment processing network 1540 may be disposed between an acquirer 1530 and an issuer 1550. The payment processing network 1540 may include data processing subsystems, networks, and operations used to support and deliver authorization services, exception file services, and clearing and settlement services. For example, the payment processing network 1520 may comprise a server computer, coupled to a network interface (e.g. by an external communication interface), and a database(s) of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 1540 may use any suitable wired or wireless network, including the Internet.

As used herein, an "issuer" may typically refer to a business entity (e.g., a bank) that maintains an account for a user and often issues a portable user device such as a credit or debit card to the user. An issuer may also issue a token and a token certificate to the cardholder.

Each of the entities may comprise one or more computer apparatuses (e.g., merchant 1520, acquirer 1530, payment processing network 1540, and issuer 1550 to enable communications, or to perform one or more of the functions described herein.

Figure 16:
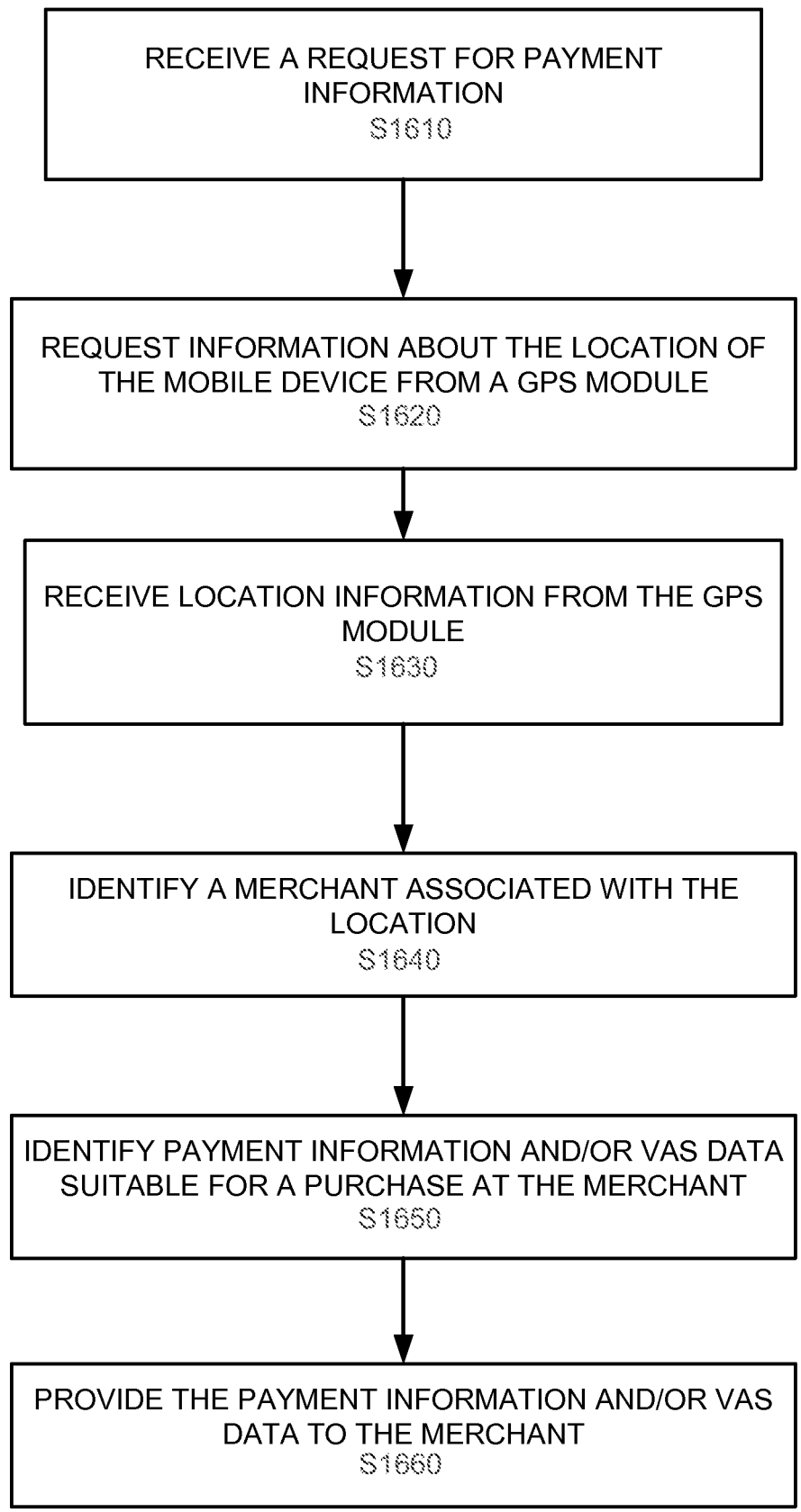
FIG. 16 shows a method for providing payment information and/or VAS data to a merchant via a QR code according to an embodiment of the invention.

An operational scenario according to embodiments of the invention can be described with respect to FIG. 16. In this scenario, a consumer may choose to make a purchase at a merchant 1520. The consumer may initiate the mobile wallet application 1512 and may instruct the mobile wallet application 1512 to provide payment information for the purchase.

At step S1610, the mobile wallet application 1512 may receive the consumer's request for payment information. For example, the consumer may select an icon or enter a command associated with providing payment information to an access device. The mobile wallet application 1512 may present several command options to the consumer, and the consumer may select a command associated with providing payment information.

At step S1620, mobile wallet application 1512 may request information about the current location of the mobile device 1510 from the geolocation module 1514. The geolocation module 1514 may then determine the current location of the mobile device 1510. For example, the geolocation module 1514 may determine a set of coordinates or an address associated with the position of the mobile device 1510. In some embodiments, the geolocation module 1514 may locate or communicate with one or more satellites in a GPS network. The geolocation module 1514 may determine the position of the mobile device 1510 based on the relative positions of one or more satellites (e.g. using triangulation), or it may receive information about the position of the mobile device 1510 from the GPS system (e.g. from a GPS satellite). The geolocation module 1514 may then send information about the position of the mobile device 1510 to the mobile wallet application 1512.

At step S1630, the mobile wallet application 1512 may receive the location information from the geolocation module 1514.

At step S1640, the mobile wallet application 1512 may identify a merchant 1520 associated with the location information. For example, the mobile wallet application 1512 may store location information associated with one or more merchants 1520. The mobile wallet application 1512 may compare the position of the mobile device 1510 with the merchant 1520 location information. If the mobile device 1510 has the same position as a merchant 1520 location, or if it is within a predetermined distance of a merchant 1520 location (e.g. within 10, 20, 50, or 100 feet), then the mobile wallet application 1512 may determine that the consumer and mobile device are at the merchant 1520 location. In some embodiments, the geolocation module 1514 may identify a merchant 1520 location associated with the current position of the mobile device 1510 in step S1620, and may provide information about the merchant 1520 to the mobile wallet application 1512 in step S1630.

At step S1650, the mobile wallet application 1512 may identify payment information and/or VAS data for use in the transaction. For example, the mobile wallet application 1512 may automatically select a payment identifier and/or a non-payment identifier (e.g. VAS data) appropriate for a purchase at the merchant 1520, such as a PAN, loyalty points, and/or a coupon associated with the merchant 1520.

At step S1660, the mobile wallet application 1512 may provide the payment identifier and/or non-payment identifier to the merchant 1520. For example, the mobile wallet application 1512 may transmit the payment identifier and/or non-payment identifier to an access device associated with the merchant 1520 via QR code, NFC, Bluetooth™, RFID, or any other suitable form of data transmission.

A local VAS module associated with the merchant 1520 may receive the non-payment identifier, which may include VAS data, and it may perform any indicated value added services. For example, if the VAS data includes a coupon or loyalty points, the local VAS module may apply them to the purchase price, possibly reducing the total price. The merchant 1520 may then send the payment information and/or transaction information to the acquirer 1530. In some embodiments, the VAS data may be associated with an external VAS module, and the merchant 1520 may also send the VAS data to the acquirer 1530.

The acquirer 1530 may then send an authorization request including the payment identifier and/or transaction information to the payment processing network 1540, which may forward the request to the issuer 1550. The issuer may authorize the transaction, and may return an authorization response to the merchant 1520.

Figure 17:
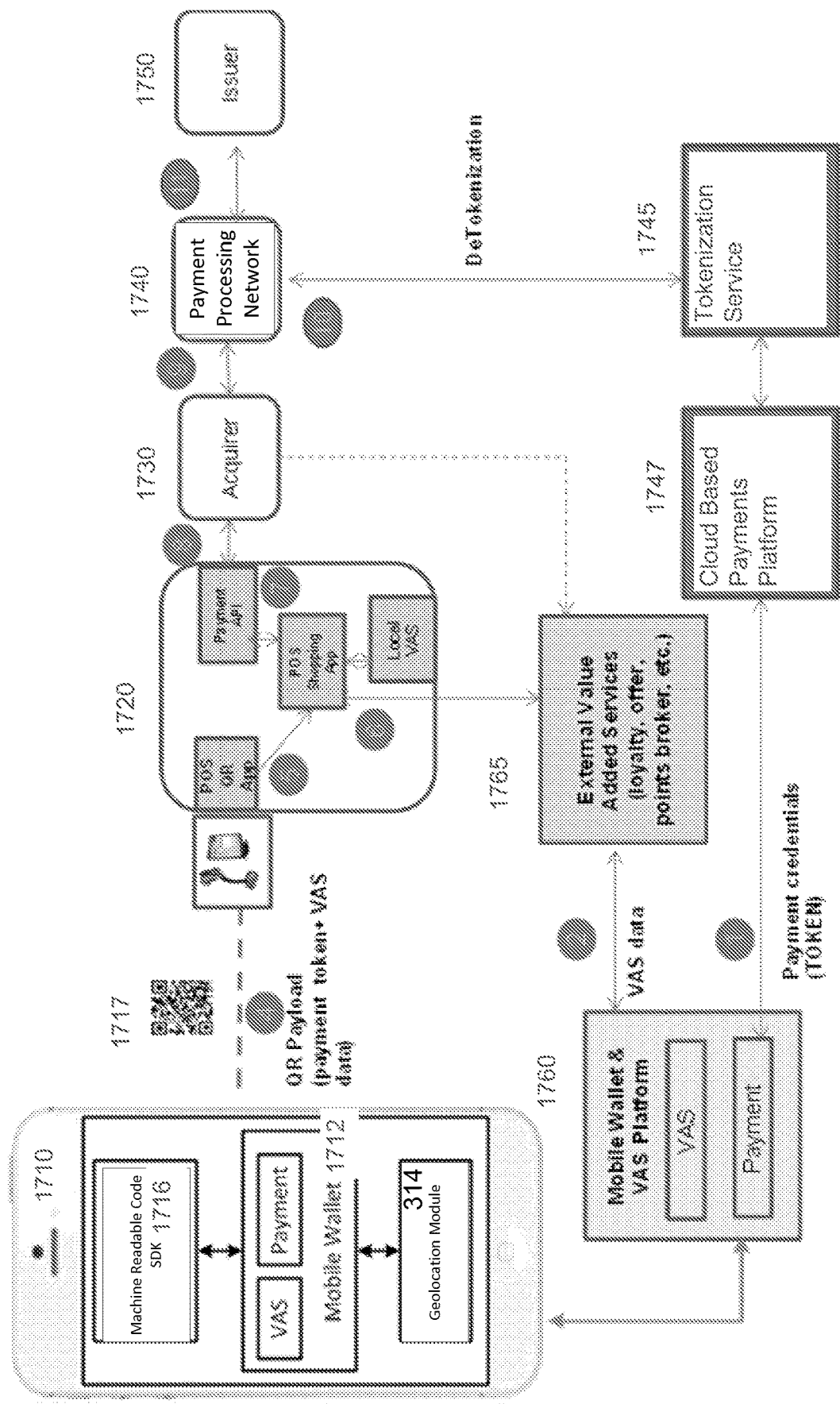
FIG. 17 shows a block diagram of a system for providing payment information and/or VAS data to a merchant via a QR code according to an embodiment of the invention.

FIG. 17 illustrates an exemplary system 1700 with at least some of the components for implementing embodiments of the invention. The system 1700 allows the mobile wallet application to provide payment information and VAS data to an access device 1720 via a QR code.

A consumer can initiate a transaction using a mobile device 1710. The mobile device 1710 may be in any suitable form. Some non-limiting examples of the mobile device 1710 may include cellular phones, keychain devices, personal digital assistants (PDAs), pagers, notebooks, laptops, notepads, etc. The mobile device 1710 may also be configured to communicate with one or more cellular networks.

The mobile device 1710 may include a mobile wallet application 1712, a geolocation module 1714, and a machine readable code software development kit (SDK) 1716.

The mobile wallet application 1712 may store payment information and/or VAS data, or it may receive payment information (such as a token) and/or VAS data from a mobile wallet and VAS platform 1760. In some embodiments, the mobile wallet application 1712 may be able to receive a request for payment information from a consumer.

The mobile wallet application 1712 may be associated with a mobile wallet and a VAS (value added service) platform 1760. In some embodiments, the mobile wallet and VAS platform 1760 may communicate with an external VAS server 1765 for VAS data. For example, the VAS data may include non-payment data that the consumers may provide at the time of a payment transaction, such as a consumer score, special offers, coupons, loyalty points, additional consumer identification information, or any other suitable data. The external VAS server 1765 may be associated with a third party server or a broker and may be configured to provide and/or process some of the value added services.

In some embodiments, the platform 1760 may communicate with a cloud based payments platform 1747 to receive payment credentials such as a token for the transaction. In some embodiments, the token may be a random number representing the payment account number for the transaction. The cloud based payments platform 1747 may be communicatively coupled to a tokenization service 1745 that may be associated with a payment processing network 1740 or an issuer 1750 that may have issued the consumer account. The tokenization service 1745 may be configured to provide tokenization of a payment account number or de-tokenization of a payment token. In some embodiments, the tokenization service 1745 may be communicatively coupled to a token vault or other token database configured to store the tokens and the token-to-account mappings.

The platform 1760 may include any server computer that may manage, facilitate, and otherwise interact with mobile devices, mobile wallets, and a payment processing network in order to manage the use and maintenance of a wallet system. For example, the wallet provider 1520 may comprise a secure element trusted service manager (SE TSM) for devices associated with the wallet provider and wallet provider management functions.

The geolocation module 1714 may be able to determine the location of the mobile device 1710 via, for example, GPS systems.

The mobile wallet application 1712 may request and receive location information from the geolocation module 1714. In some embodiments, the mobile wallet application 1712 may identify a merchant associated with location. In some embodiments, the geolocation module 1714 may determine a merchant associated with the location and inform the mobile wallet application 1712.

In some embodiments, the mobile wallet application 1712 may be able to provide suitable payment information and/or VAS data to an access device, such as POS terminal 1720. For example, the consumer may indicate a desire to provide payment for a transaction at a certain merchant, and the mobile wallet application 1712 may provide payment information and/or nonpayment information (e.g. VAS data) that is appropriate and/or preferable for purchases at that merchant. For example, the mobile wallet application 1712 may automatically select a credit card associated with the merchant, a coupon for a discount at the merchant, loyalty points associated with the merchant, a gift card associated with the merchant 1520, or any other suitable payment information. The mobile wallet application 1712 may generate a token that represents the selected payment information, or receive a token from the platform 1760.

The machine readable code software development kit (SDK) 1716 associated with the mobile device 1710 may be configured to integrate the payment token and the VAS data in a generated machine readable code 1717. For example, the machine readable code 1717 may represent a QR payload that includes both the payment token and the VAS data.

The mobile wallet application 1712 may be able to request that the machine readable code software development kit (SDK) 1716 generate a QR code with payment token and the VAS data. The mobile wallet application 1712 may then receive the QR code and present it to the POS terminal 1720 for a payment.

The machine readable code 1717 may be scanned by a POS terminal 1720. In some embodiments, the POS terminal 1720 may include a POS machine readable code app, a POS shopping app and a local VAS module. For example, the POS machine readable code app may be configured to decode the machine readable code 1717 and provide the VAS data and the payment data to a POS shopping app. The POS shopping app may communicate with a local VAS module for VAS data that may be associated with that merchant, for example, the VAS data including merchant loyalty identifier, email, order confirmation number, offer code, employee identifier and any other relevant information. The POS shopping app may also be configured to communicate with the external VAS server 1765 depending upon the value added service elements. For example, if the VAS data includes a partner loyalty identifier the shopping app may contact the external VAS server for the associated information with the partner loyalty identifier. In another example, the shopping app may contact the external VAS server 1765 if a consumer has indicated intent to redeem card linked offers.

In some embodiments, the payment processing network may be configured to request de-tokenization of a token received during a transaction by the tokenization service and receive the payment account information associated with the token from the tokenization service for the transaction.

Embodiments of the invention have a number of advantages. Providing payment information and VAS data based on location can create an efficient and easy way to make payments. For example, a consumer may not need to remember multiple forms of payment and VAS data, as the mobile wallet application 1512 can automatically select information that is applicable and/or the best suited for a present transaction. Thus, coupons, gift cards, loyalty rewards, etc. may be used at a suitable opportunity, and fewer coupons may go unused due to consumer forgetfulness and expiration dates. Also, the consumer may not need to carry multiple cards or documents, as the information can all be stored on the mobile device 1510 or the mobile wallet and VAS platform 1760.

In order to address various issues and advance the art, the entirety of this application for SNAP MOBILE PAYMENT APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SNAP individual and/or enterprise user, database configuration and/or relational model, data type, data transmission and/or network framework, syntax structure, and/or the like, various embodiments of the SNAP may be implemented that enable a great deal of flexibility and customization. For example, aspects of the SNAP may be adapted for restaurant dining, online shopping, shopping in brick-and-mortar stores, secure information processing, healthcare information systems, and/or the like. While various embodiments and discussions of the SNAP have been directed to electronic purchase transactions, however, it is to be understood that the embodiments described herein may be readily configured and/or customized for a wide variety of other applications and/or implementations.

What is claimed is:

1. A snap payment processor-implemented method, comprising:
    determining, by a processor executing a digital wallet application at a user mobile computing device, a location information of the user device indicative of a consumer location, said location information comprising at least geographical information and local proximity information;
    providing, by a digital camera of the user device to the digital wallet application executing at the user device, product information for a purchase transaction;
    determining, based on the location information, a merchant for the purchase transaction and a non-payment identifier for the merchant, the non-payment identifier including one or more of data for a loyalty card for the merchant or data for a coupon code for the merchant;
    automatically selecting, via the processor executing the digital wallet application, a payment identifier from the digital wallet application and the non-payment identifier for the merchant based on the location information;
    generating, via the processor executing the digital wallet application, a Quick Response ("QR") code based on the payment identifier and the non-payment identifier, wherein the QR code comprises a purchase transaction request for the purchase transaction; and
    providing, via the processor executing the digital wallet application, the QR code to a point of sale terminal for payment processing by a payment processing network connected to the user device for the purchase transaction;
    wherein the payment identifier includes a personal account number corresponding to a credit card account and the non-payment identifier includes one or more of data for the loyalty card for the merchant or data for the coupon code for the merchant for the purchase transaction.

2. A snap payment computer-implemented method, comprising:
    obtaining, by a processor executing a digital wallet application at a user device, a user input to initiate a purchase transaction on the user device;
    acquiring, by a digital camera of the user device via the processor executing the digital wallet application at the user device, objects within an image frame operatively connected to the user device;
    determining, by the processor of the user device, a location of a consumer, the location information comprising at least geographical information and local proximity information;
    determining, based on the location information, a merchant for the purchase transaction and a non-payment identifier for the merchant, the non-payment identifier including one or more of data for a loyalty card for the merchant or data for a coupon code for the merchant;
    automatically selecting, via the processor executing the digital wallet application, a payment identifier from the digital wallet application executing at the user device and the non-payment identifier based on the location information;
    identifying, via the processor executing the wallet application at the user device, a payment code depicted within the acquired image frame;
    generating, via the processor executing the digital wallet application, a Quick Response ("QR") code representing the objects based on the payment identifier and the at least one non-payment identifier; and providing, via the processor executing the digital wallet application, the QR code to a point of sale terminal for payment processing by the payment processing network connected to the user device;

generating, via the processor executing the wallet application at the user device, a purchase transaction request using the QR code;

providing, via the processor executing the wallet application, the purchase transaction request for payment processing from the user device to a payment processing network; and obtaining, via the processor executing the wallet application, a purchase receipt from the payment processing network for the purchase transaction;

wherein a portion of the acquired image frame including the depiction of the payment code is provided, via the processor, to a server;

wherein the payment identifier includes a personal account number corresponding to a credit card account and the non-payment identifier includes one or more of value added service data, loyalty points, and a coupon associated with the purchase transaction; and wherein purchase session data is obtained from the server, via the processor, in response to providing the portion of the acquired image frame.

3. The method of claim 2, further comprising: determining a merchant associated with the location information.

4. The method of claim 3, wherein the payment identifier and the at least one non-payment identifier are associated with the merchant.

5. The method of claim 2, wherein the payment identifier comprises a payment token.

6. The method of claim 2,
wherein acquiring, by a digital camera of the user device via the processor executing the digital wallet application at the user device, objects within an image frame operatively connected to the user device includes acquiring video including the image frame via the image acquisition device operatively connected to the user device; and the method further comprises
extracting the image frame from the acquired video; and
analyzing the image frame to determine whether the image frame includes the depicted payment code.

7. The method of claim 2, wherein the user input is a touchscreen gesture on a touchscreen operatively connected to the user device.

8. The method of claim 2, wherein the payment code is a two-dimensional barcode.

9. The method of claim 2, further comprising:
extracting purchase session data from the payment code; and
wherein the purchase transaction request is generated, via the user device, using the extracted purchase session data.

10. The method of claim 9, wherein the purchase session data varies based on user shopping activity with a merchant.

11. The method of claim 10, wherein the merchant is an online merchant.

12. A snap payment apparatus, comprising:
a processor of a user device executing a digital wallet application from a memory of the user device, the memory disposed in communication with the processor, the digital wallet application including processor-executable instructions to:

obtain, by the processor executing a digital wallet application at the user device, a user input to initiate a purchase transaction on the user device;

acquire, by a digital camera of the user device via the processor executing the digital wallet application at the user device, objects within an image frame operatively connected to the user device;

determine, by the processor of the user device, a location of a consumer, the location information comprising at least geographical information and local proximity information;

determine, based on the location information, a merchant for the purchase transaction and a non-payment identifier for the merchant, the non-payment identifier including one or more of data for a loyalty card for the merchant or data for a coupon code for the merchant;

automatically select, via the processor executing the digital wallet application, a payment identifier from the digital wallet application executing at the user device and the non-payment identifier based on the location information;

identify, via the processor executing the wallet application at the user device, a payment code depicted within the acquired image frame;

generate, via the processor executing the digital wallet application, a Quick Response ("QR") code representing the objects based on the payment identifier and the at least one non-payment identifier; and provide, via the processor executing the digital wallet application, the QR code to a point of sale terminal for payment processing by the payment processing network connected to the user device;

generate, via the processor executing the wallet application at the user device, a purchase transaction request using the QR code;

provide, via the processor executing the wallet application, the purchase transaction request for payment processing from the user device to a payment processing network; and obtain, via the processor executing the wallet application, a purchase receipt from the payment processing network for the purchase transaction;

wherein purchase session data is obtained from a server, via the processor, in response to providing the portion of the acquired image frame;

wherein a portion of the acquired image frame including the depiction of the payment code is provided to the server;

wherein the payment identifier includes a personal account number corresponding to a credit card account and the non-payment identifier includes one or more of value added service data, loyalty points, and a coupon associated with the purchase transaction; and wherein purchase session data is obtained from the server in response to providing the portion of the acquired image frame.

13. The apparatus of claim 12, further comprising processor-executable instructions to:
determine a merchant associated with the location information.

14. The apparatus of claim 13, wherein the payment identifier and the at least one non-payment identifier are associated with the merchant.

15. The apparatus of claim 12, wherein the payment identifier comprises a payment token.

16. The apparatus of claim 12,
wherein the instruction to acquire, by a digital camera of the user device via the processor executing the digital wallet application at the user device, objects within an image frame operatively connected to the user device includes processor executable instructions to:
acquire video including the image frame via the digital camera operatively connected to the user device;
extract the image frame from the acquired video; and
analyze the image frame to determine whether the image frame includes the depicted payment code.

17. The apparatus of claim 12, wherein the user input is a touchscreen gesture on a touchscreen operatively connected to the user device.

18. The apparatus of claim 12, wherein the payment code is a two-dimensional barcode.

19. The apparatus of claim 12, further comprising processor-executable instructions to:
extract purchase session data from the payment code; and
wherein the purchase transaction request is generated, via the user device, using the extracted purchase session data.

20. The apparatus of claim 19, wherein the purchase session data varies based on user shopping activity with a merchant.

21. The apparatus of claim 20, wherein the merchant is an online merchant.

* * * * *